US011932540B2

(12) United States Patent
Cota-Sanchez

(10) Patent No.: US 11,932,540 B2
(45) Date of Patent: Mar. 19, 2024

(54) SINGLE WALLED CARBON NANOTUBE-BASED SLURRY FOR IMPROVED NUCLEAR FUEL CLADDING COATINGS AND METHOD OF FABRICATION OF SAME

(71) Applicant: ATOMIC ENERGY OF CANADA LIMITED/ÉNERGIE ATOMIQUE DU CANADA LIMITÉE, Chalk River (CA)

(72) Inventor: German Cota-Sanchez, Deep River (CA)

(73) Assignee: ATOMIC ENERGY OF CANADA LIMITED/ÉNERGIE ATOMIQUE DU CANADA LIMITÉE, Ontario (CA)

( * ) Notice: Subject to any disclaimer, the term of this patent is extended or adjusted under 35 U.S.C. 154(b) by 549 days.

(21) Appl. No.: 16/765,987

(22) PCT Filed: Nov. 28, 2018

(86) PCT No.: PCT/CA2018/051510
§ 371 (c)(1),
(2) Date: May 21, 2020

(87) PCT Pub. No.: WO2019/104424
PCT Pub. Date: Jun. 6, 2019

(65) Prior Publication Data
US 2021/0363014 A1    Nov. 25, 2021

Related U.S. Application Data

(60) Provisional application No. 62/591,494, filed on Nov. 28, 2017.

(51) Int. Cl.
*B32B 9/00* (2006.01)
*C01B 32/159* (2017.01)
(Continued)

(52) U.S. Cl.
CPC .......... *C01B 32/159* (2017.08); *C01B 32/166* (2017.08); *G21C 3/07* (2013.01);
(Continued)

(58) Field of Classification Search
CPC ....... Y10T 428/30; B82Y 30/00; B82Y 40/00; C01B 32/159; C01B 2202/02; C01B 2202/36; G21C 3/17; G21C 3/20
(Continued)

(56) References Cited

U.S. PATENT DOCUMENTS 8,623,495 B2 * 1/2014 Hata ...................... B82Y 30/00
                                                    428/161
8,651,451 B2   2/2014 Hong et al.
(Continued)

FOREIGN PATENT DOCUMENTS

JP    2010145235 A      7/2010
KR    20050119246    * 12/2005    ............... G21C 3/20
(Continued)

OTHER PUBLICATIONS

Search Report for European application No. 18882885.9, dated Nov. 16, 2021.
(Continued)

*Primary Examiner* — Daniel H Miller
(74) *Attorney, Agent, or Firm* — Joseph C. Zucchero; Carolyn S. Elmore; Elmore Patent Law Group, P.C.

(57) ABSTRACT

A nuclear fuel element for use in a nuclear reactor may include a plurality of metal fuel sheaths extending along a longitudinal fuel element axis and spaced apart from each other, the plurality of fuel sheaths comprising a first fuel sheath having an inner surface, an opposing outer surface and a hollow interior configured to receive nuclear fuel material. A carbon coating may be on the inner surface of the first fuel sheath. The carbon coating may include more than
(Continued)

99.0% wt of a carbon material including more than 20% wt of carbon nanotubes and less than about 0.01% wt of organic contaminants.

20 Claims, 60 Drawing Sheets

(51) Int. Cl.
    *C01B 32/166*      (2017.01)
    *G21C 3/07*      (2006.01)
    *G21C 3/17*      (2006.01)
    *G21C 3/20*      (2006.01)

(52) U.S. Cl.
    CPC ............... *G21C 3/17* (2013.01); *G21C 3/20* (2013.01); *C01B 2202/02* (2013.01); *C01B 2202/36* (2013.01); *C01P 2002/72* (2013.01); *C01P 2002/82* (2013.01); *C01P 2002/84* (2013.01); *C01P 2002/88* (2013.01); *C01P 2002/89* (2013.01); *C01P 2004/03* (2013.01); *C01P 2004/04* (2013.01); *C01P 2006/10* (2013.01); *Y10T 428/30* (2015.01)

(58) Field of Classification Search
    USPC ......................................................... 428/408
    See application file for complete search history.

(56) References Cited

U.S. PATENT DOCUMENTS

| | | |
|---|---|---|
| 8,951,451 B2 | 2/2015 | Muramatsu et al. |
| 2010/0296621 A1 | 11/2010 | Broli et al. |

FOREIGN PATENT DOCUMENTS

| | | |
|---|---|---|
| KR | 100562359 B1 | 3/2006 |
| WO | 2006096964 A1 | 9/2006 |
| WO | 2015039636 A1 | 3/2015 |

OTHER PUBLICATIONS

Material Safety Data Sheet, Product Name DAG154N, Acheson, 7 pages, Issue Date Feb. 11, 2009.
Mineralogy Database—Mineral Collecting, Localities, Mineral Photos And Data, Website: www.Mindata.Org C/O Internet Archive Wayback Machine, Aug. 29, 2017, URL <https://web.archive.org/web/20170829213033/https://www.mindat.org/>.
Adams, et al., The Nanoetube Site, Website Https://Nanotube.Msu.Edu C/O Internet Archive Wayback Machine, Sep. 28, 2017, URL <https://web.archive.org/web/20170928143758/https://nanotube.msu.edu/.
Bergeron, E., et al., "Production de carbone par pyrolyse du methane dans un plasma thermique", M.SC.A. Thesis, Departement de genie chimique, Universite de Sherbrooke, Canada.
Buelow, M. T, et al., "The Transition State For Metal-Catalyzed Dehalogenation: C-I Bond Cleavage On Ag(111)", J. Am. Chem. Soc., 123, 10.1021/ja002819i, 2001, 1440-1448.
Clegg, L. J, et al., "Radioactive Decay Properties Of Candu Fuell. vol. 1: The Natural Uranium Fuel Cycle. Part 1: Starting Materials: Uranium Ore, Separated Uranium And Uranium Mill Tailing, Part 2: Irradited Fuel", Atomic Energy Of Canada Limited, Jan. 1977, URL<https://inis.iaea.org/collection/NCLCollectionStore/_Public/09/360/9360932.pdf?r=1>, 381 pgs.
Cota-Sanchez, G., et al., "Effect Of Iron Catalyst On The Synthesis Of Fullerenes And Carbon Nanotubes In Induction Plasma", J. Phys. Chem. B, 108(50), 19210-19217.
Cota-Sanchez, G., et al., "Induction Plasma Synthesis Of Fullerenes And Nanotubes Using Carbon Black - Nickel Particles", Carbon, 43(15), doi: 10.1016/j.carbon.2005.06.018, 3153-3166.
Da Ros, T., et al., "Medicinal Chemistry With Fullerenes And Fullerene Derivatives", Chem. Comm., 663-669.
Donnet, J., et al., "Carbon Black: Science and Technology", Science and Technology Second Edition, Revised and Expanded, Marcel Dekker,, Inc., New York, USA, 987 pgs.
Dresselhaus, M. S, et al., "Raman Spectroscopy Of Carbon Nanotubes", Phys.S Rep., 409(2), doi:10.1016/j.physrep.2004.10.006, 2005, 47-99.
Fulcheri, L., "Plasma Processing: A Step Towards The Production Of New Grades Of Carbon Black", Carbon, 40, 169-176.
Glowa, G. A, et al., "Containement Iodine Behaviour: The Behaviour Of Iodine Project", Atomic Energy Of Canada Limited, Jun. 23-25, 2014, URL :< https://inis.iaea.org/collection/NCLCollectionStore/_Public/49/101/49101499.pdf?r=1>, 6 pgs.
Grigorian, L., et al., "Reversible Intercalation Of Charged Iodine Chains Into Carbon Nanotube Ropes", Phys. Rev. Lett., 80(25), 5560-5563.
Guo, T., et al., "Catalytic Growth Of Single- Walled Nanotubes By Laser Vaporization", Chem. Phys. Lett., 243, 49-54.
Hahn, J, et al., "New Continuous Gas-Phase Synthesis Of High Purity Carbon Nanotubes By A Thermal Plasma Jet", Carbon, 42, doi:10.1016/j.carbon.2004.01.073, 877-883.
Harbec, D., et al., "Carbon Nanotubes From The Dissociation Of C2CI4 Using A DC Thermal Plasma Torch", J. Phys. D: Appl. Phys., 37, 2121-2126.
Hirai, H., et al., "Transparent Nanocrystalline Diamond Ceramics Fabricated From C60 Fullerene By Shock Compression", App. Phys. Lett., 71(20), doi: 10.1063/1.120248, 3016-3018.
Hocking, W. H, et al., "Characterization Of The Microchemistry At The Fuel- Sheath Interface In A Low-Void Reactivity Fuel By Imaging X-Ray Photoelectron Spectroscopy", Candu Fuel : Leading The Renaissance 10th International Conference On Candu Fuel, Oct. 5-8, 2008, Canada: Canadian Nuclear Society, URL: < https://inis.iaea.org/search/searchsinglerecord.aspx?recordsFor=SingleRecord&RN=41046718 >, 14 pgs.
Iijima, S., "Helical Microtubules Of Graphitic Carbon", Nature, 354, 56-58.
Journet, C., et al., "Large-Scale Production Of Single-Walled Carbon Nanotubes By The Electric-Arc Technique", Nature, 388, 756-758.
Kang, E. T, et al., "XPS Studies Of Iodine Complexes Of Pyrrole - N-Methylpyrrole Copolymer", Polymer Bulletin, 21, 1989, 53-57.
Keun, S. K, et al., "Large-Scale Production Of Single-Walled Carbon Nanotubes By Induction Thermal Plasma", J. Phys. D: Appl. Phys., 40, doi:10.1088/0022-3727/40/8/S17, 2007, 2375-2387.
Kim, K. S, et al., "Large-Scale Production Of Single-Walled Carbon Nanotubes By Induction Thermal Plasma", J. Phys. D, App. Phys., 40, doi: 10.1088/0022-3727/40/8/S17, Apr. 4, 2007, 2375-2387.
Kingston, C. T, et al., "Efficient Laser Synthesis Of Single- Walled Carbon Nanotubes Through Laser Heating Of The Condensing Vaporization Plume", Carbon, 42, doi:10.1016/j.carbon.2004.02.020, 2004, 1657-1664.
Kroto, H. W, et al., "C60: Buckminsterfullerene", Nature, 318, Nov. 14, 1985, 162-163.
Lee, Y. W, et al., "Iodine Vapor Doped Polyaniline Nanoparticles Counter Electrodes For Dye-Sensitized Solar Cells", Synth. Met., 174, http://dx.doi.org/10.1016/j.synthmet.2013.04.009, 2013, 6-13.
Li, W. Z, et al., "Large-Scale Synthesis Of Aligned Carbon Nanotubes", Science, 274, Dec. 6, 1996, 1701-1703.
Merlo-Sosa, L., et al., "Dodecane Decomposition In A Radio-Frequency (RF) Plasma Reactor", Int. J. Chem. Reac. Eng., 3, Art. A4, 25 pgs.
Meyyappan, M., et al., "Carbon Nanotube Growth By PECVD: A Review", Plasma Sources Sci. Tech., 12, 205-216.
Ngenefeme, F. T, et al., "A One Pot Green Synthesis And Characterisation Of Iron Oxide-Pectin Hybrid Nanocomposite", Open J. Comp. Mat., 3, http://dx.doi.org/10.4236/ojcm.2013.32005, 2013, 30-37.
Nikolaev, P., et al., "Gas-Phase Catalytic Growth Of Single-Walled Carbon Nanotubes From Carbon Monoxide", Chem. Phys. Lett., 313, 91-97.
Rao, C., et al., "Nanotubes", ChemPhysChem., 2, 78-105.
Reiller, P., et al., "Iodination Of Humic Acid Samples From Different Origins", Radiochimca Acta, 94, DOI 10.1524/ract.2006.94.9.739, 739-745.

(56) References Cited

OTHER PUBLICATIONS

Rudling, P., et al., "High Burnup Fuel Issues", Nuc. Eng. Tech., 40(1).
Ruoff, R. S, et al., "Solubility Of C60 In A Variety Of Solvents", J. Phys. Chem., 97(13), 1993, 3379-3383.
Saito, R., et al., "Raman Spectroscopy Of Graphene And Carbon Nanotubes", Ad. Phys., 60(3), http://www.tandfonline.com/loi/tadp20, 413-550.
Schlegel, M. L, et al., "Molecular Environment Of Iodine In Naturally Iodinated Humic Substances: Insight From X-Ray Absorption Spectroscopy", Geochimica et Cosmochimica Acta, 70, doi:10.1016/j.gca.2006.08.026, 2006, 5536-5551.
Schunk Kohlenstofftechnik, "Manufacturing Process And Material Properties Of Carbon And Graphite Materials", http://www.schunkgraphite.com/sixcms/media.php/1698/Kohlenstoff-Broschuere_GB.pdf, accessed on Jan. 7, 2015.
Singh, H., et al., "Fullerenes: Synthesis, Separation, Characterization, Reaction Chemistry, And Applications—A Review", Ener. Sour., 17(6), DOI: 10.1080/00908319508946108, 615-640.
Subramoney, S., "Novel Nanocarbons—Structure, Properties, And Potential Applications", Adv. Mat., 10(15), 1157-1171.
Tjandra, S., et al., "Determination Of The Activation Energy For The Dissociation Of The Carbon-Iodine Bond In Methyl Iodine Adsorbed On Ni(100) Surfaces", J. Vac. Sc. Tech. A, 10(2), doi: 10.1116/1.578064, 404-405.
Wochnowski, C., et al., "UV-Laser-Assisted Synthesis Of Iodine-Doped Electrical Conductive Polythiophene", App. Surf. Sc., 186, 34-39.

\* cited by examiner

SINGLE WALLED CARBON NANOTUBE-BASED SLURRY FOR IMPROVED NUCLEAR FUEL CLADDING COATINGS AND METHOD OF FABRICATION OF SAME

CROSS-REFERENCE TO RELATED APPLICATIONS

This application claims the benefit U.S. Provisional Application No. 62/591,494 filed Nov. 28, 2017 and entitled Single Walled Carbon Nanotube-Based Slurry For Improved Nuclear Fuel Cladding Coatings And Method Of Fabrication Of Same, the entirety of which is incorporated herein by reference.

FIELD

The disclosure relates to a carbon nanotube-based slurry. More specifically, the disclosure relates to a carbon nanotube-based slurry that may be used for coatings.

INTRODUCTION

Carbon is widely distributed in nature and it has uses in the nuclear industry. For example, carbon-based coatings can be used in the fuel for Pressurized Heavy Water Reactors (PHWR) to help improve fuel performance and mitigate Stress-Corrosion Cracking (SCC).

While PHWRs have been shown to offer unique fuel-cycle flexibility because of their exceptional neutron economy, the Advanced Pressurized Heavy Water Reactors (APHWR) may place more severe demands on the fuel than the current fleet of operating power reactors. Reliable fuel performance to expanded operating conditions (high burnup, high power and large power ramps) may be helpful to facilitate the success of APHWRs using advanced fuels, such as low enriched uranium (LEU), Mixed Oxide (MOX) and thoria-based fuels.

When nuclear fuel is irradiated in a reactor, many fission products can be created, which may diffuse through the fuel to the fuel sheath. Studies have shown that the thin-walled Zircaloy-4 fuel sheath can be susceptible to SCC, which may be due at least in part to the fission products iodine, cesium and cadmium. As new reactor designs have more demanding operating conditions, there is a need for an improved carbon layer which may help mitigate SCC.

PCT Publication No. WO2015/039636 discloses a layer of protecting the surface of zirconium alloys used as materials for nuclear reactors formed by a homogenous polycrystalline diamond layer prepared by chemical vapor disposition method. This diamond layer is 100 nm to 50 μm thick and the size of the crystalline cores in the layer ranges from 10 nm to 500 nm. Maximum content of non-diamond carbon is 25 mol %, total content of non-carbon impurities is maximum up to 0.5 mol %, RMS surface roughness of the polycrystalline diamond layer has a value less than 40 nm and thermal conductivity of the layer ranges from 1000 to 1900 $Wm^{-1}K^{-1}$. Coating of the zirconium alloys surface with the described polycrystalline diamond layer serves as a zirconium alloys surface protection against undesirable changes and processes in the nuclear reactor environment.

SUMMARY

In accordance with some aspects of the teaching described herein, a carbon nanotube slurry may include between about 0.1% wt and about 16.0% wt of a carbon material including carbon nanotubes, between about 0.1% wt and about 4.0% wt of a binder material, at least about 80% wt of a solvent, and between about 0.05% wt and about 6.0% wt of a dilutent.

The carbon nanotube slurry may include between about 0.1% wt and about 2.4% wt of the carbon material.

The carbon nanotube slurry may include between about 0.1% wt and about 1.0% wt of the binder material.

The carbon nanotube slurry may include at least about 95% wt of the solvent.

The carbon nanotube slurry may include between about 0.05% wt and about 1.5% wt of a dilutent.

The carbon material may include at least about 20% wt nanotubes.

The carbon material may include about 20-45% wt of carbon nanotubes, about 3-6 wt % fullerenes ($C_{60}+C_{70}$), 1-4 wt % nano-onions and graphene.

The carbon nanotube slurry may include about 0.8% wt carbon nanotubes.

The carbon nanotubes may be single walled carbon nanotubes.

The single walled carbon nanotubes may have an average diameter of between about 1.2-1.4 nm.

The solvent may be isopropanol.

The dilutent may include at least one of n-butanol, hexylene glycol and propylene glycol.

The dilutent may include a mixture of n-butanol, hexylene glycol and propylene glycol.

The carbon nanotube slurry may include between about 0.05% wt and about 2% wt of each of n-butanol, hexylene glycol and propylene glycol.

The carbon nanotube slurry may include between about 0.5% wt of each of n-butanol, hexylene glycol and propylene glycol.

The carbon material may have a density of between about 1.25 $g/cm^3$ and about 1.45 $g/cm^3$.

The viscosity of the slurry may be between about 17 and about 27 mPas, and may be between 18 and 22 mPas.

A ratio of the carbon material to the solvent may be between about 0.005 and about 0.2.

A ratio of the binder material to the solvent may be between about 0.002 and about 0.05.

A ratio of the dilutent to the solvent may be between about 0.005 and about 0.08.

In accordance with another broad aspect of the teachings here, that may be used with any other aspects, a method of producing a carbon slurry may include the steps of:
a) dispersing a powdered carbon material into a first solvent to form a first interim-mixture;
b) dissolving a binder material into a second solvent to form a second interim-mixture;
c) combining the first interim-mixture with the second interim-mixture to form a third-interim mixture; and
d) after performing step c) adding at least one of a dilutent, a surfactant and an emulsion stabilizer to the third-interim mixture to form the carbon slurry.

The carbon slurry may include between about 0.1% wt and 16% wt of the carbon material.

The carbon slurry may include about 0.8% wt of the carbon material.

The carbon material may include carbon nanotubes.

The carbon material may include about 20-45% wt of carbon nanotubes, 3-6 wt % fullerenes ($C_{60}+C_{70}$), 1-4 wt % nano-onions and graphene (graphitic particles) and 45-60% wt carbon black and catalyst.

The carbon nanotubes may be single walled carbon nanotubes.

The single walled carbon nanotubes may have an average diameter of between about 1.2-1.4 nm.

The carbon material may have a density of between about 1.25 g/cm$^3$ and about 1.45 g/cm$^3$.

The method may include coating at least a portion of the carbon material with a surfactant prior to step a).

The binder material may include between 0.1% wt and 4.0% wt of the carbon nanotube slurry.

The binder material may include about 0.3% wt of the carbon nanotube slurry.

The binder material may be formed substantially of ethyl cellulose.

The first solvent may be the same as the second solvent.

The first solvent may include about 60% wt of a combined weight of the first and second solvents.

The first solvent and second solvent may be isopropanol.

The carbon nanotube slurry may include more than 80% wt isopropanol.

The carbon nanotube slurry may include between 95% wt and 99.5% wt isopropanol.

The carbon nanotube slurry may include between 98% wt and 99% wt iso-propanol.

The carbon nanotube slurry may include between 98.3% wt and 98.6% wt iso-propanol.

The dilutent may include at least one of n-butanol, hexylene glycol and propylene glycol.

The dilutent may include a mixture of n-butanol, hexylene glycol and propylene glycol.

The carbon nanotube slurry may include between 0.05% wt and 6.0% wt of the dilutent.

The carbon nanotube slurry may include between about 0.05% wt and about 2.0% wt of each of n-butanol, hexylene glycol and propylene glycol.

The carbon nanotube slurry may include between about 0.5% wt of each of n-butanol, hexylene glycol and propylene glycol.

The method may include mixing the n-butanol, hexylene glycol and propylene glycol together prior to adding the dilutent to the third-interim mixture in step d).

The method may include separately adding the n-butanol, hexylene glycol and propylene glycol to the third-interim mixture in step d).

Step a) may include dispersing the carbon material in the solution of alcohol using an ultrasonic bath.

The ultrasonic bath may include operated for between about 5 minutes and about 20 minutes.

Step b) may include stirring the second solvent while dissolving the binder material.

Step c) may be performed while stirring.

Step d) may performed while stirring.

Step c) may be performed by adding the first interim-mixture into a vessel containing the second interim-mixture.

The first solvent may be heated to a first mixing temperature that is greater than 30 deg. C. prior to or during step a).

The first mixing temperature may be about 50 deg. C.

The second solvent may be heated to a second mixing temperature that is greater than 30 deg. C. prior to or during step b).

The second mixing temperature may be about 50 deg. C.

Step c) may be performed while the first interim mixture and second interim mixture are heated to a third mixing temperature that is greater than 30 deg. C.

The third mixing temperature may be about 50 deg. C.

Step d) may be performed while the third interim mixture is at the third mixing temperature.

The method may include the step of cooling the carbon slurry formed in step d) from the third mixing temperature to less than 30 deg. C.

In accordance with another broad aspect of the teachings described herein, that may be used in combination with any other aspects, a dried material may be formed by applying, drying and/or baking a carbon slurry as described herein to a condition in which the dried and/or baked carbon nanotube coating material has more than 99.0% wt of the carbon material.

The dried material may include more than 20% wt of carbon nanotubes.

The carbon nanotubes may be single walled carbon nanotubes.

The dried material may include less than about 0.01% wt organic contaminants

The total hydrogen gas content in the dried material may be less than 1.0 mg/element.

The carbon material may include at least one of carbon nanotubes, fullerenes ($C_{60}+C_{70}$), nano-onions, graphene (graphitic particles) and amorphous carbon.

The carbon material may include a mixture of carbon nanotubes, fullerenes ($C_{60}+C_{70}$), nano-onions, graphene (graphitic particles) and amorphous carbon.

The fullerenes may include at least one of $C_{60}$ and $C_{70}$.

The carbon material may have an iodine absorption capacity of at least $4.77 \times 10^{-3}$ g $I_2$/g carbon material.

The carbon material may have an iodine absorption capacity of at least about at least 0.5% wt of the carbon material.

In accordance with another broad aspect of the teachings described herein, that may be used with any other aspect, a nuclear fuel element for use in a nuclear reactor, may include a plurality of metal fuel sheaths extending along a longitudinal fuel element axis and spaced apart from each other. The plurality of fuel sheaths may include a first fuel sheath having an inner surface, an opposing outer surface and a hollow interior configured to receive nuclear fuel material. A carbon coating may be provided on the inner surface of the first fuel sheath and may include more than 99.0% wt of a carbon material including more than 20% wt of carbon nanotubes and less than about 0.01% wt of organic contaminants.

The carbon nanotubes may be single walled carbon nanotubes.

The carbon material may include more than 20% wt of single walled carbon nanotubes.

The carbon material may include at least one of carbon nanotubes, fullerenes ($C_{60}+C_{70}$), nano-onions, graphene (graphitic particles) and amorphous carbon.

The carbon material may include a mix of carbon nanotubes, fullerenes ($C_{60}+C_{70}$), nano-onions, graphene (graphitic particles) and amorphous carbon.

The carbon coating may have a thickness of between 1 μm to 30 μm.

The carbon material may have an iodine absorption capacity of at least $4.77 \times 10^{-3}$ g $I_2$/g carbon material.

The carbon material may have an iodine absorption capacity of at least about at least 0.5% wt of the carbon material.

The carbon coating may include more than 99.0% wt of the carbon material.

The carbon coating may include more than 20% wt of carbon nanotubes.

The carbon coating may include at least one of carbon nanotubes, fullerenes ($C_{60}+C_{70}$), nano-onions, graphene (graphitic particles) and amorphous carbon.

The carbon coating may include a mix of carbon nanotubes, fullerenes ($C_{60}+C_{70}$), nano-onions, graphene (graphitic particles) and amorphous carbon.

The fullerenes may include at least one or $C_{60}$ and $C_{70}$.

The carbon nanotubes may be single walled carbon nanotubes.

DRAWINGS

These and other advantages of the instant invention will be more fully and completely understood in conjunction with the following detailed description of the preferred aspect of the present invention with reference to the following drawings, in which:

FIG. 1, in a photograph, illustrates preliminary carbon coatings on Zircaloy using carbon black, graphite (synthetic) and SWNT in an experiment of preparing Zircaloy coatings with different carbon-based slurries;

FIG. 2, in a photograph, illustrates optical micrograph of Zircaloy coating with carbon black slurry through a second exemplary method in the experiment of preparing Zircaloy coatings with different carbon-based slurries;

FIG. 3, in a photograph, illustrates optical micrograph of Zircaloy coating with graphite (synthetic) slurry through a third exemplary method in the experiment of preparing Zircaloy coatings with different carbon-based slurries;

FIG. 4, in a photograph, illustrates optical micrograph of Zircaloy coating with carbon black slurry through a fourth exemplary method in the experiment of preparing Zircaloy coatings with different carbon-based slurries;

FIG. 5, in a photograph, illustrates optical micrograph of Zircaloy coating with SWNT through a fifth exemplary method in the experiment of preparing Zircaloy coatings with different carbon-based slurries;

FIG. 6, in a photograph, illustrates optical micrograph of Zircaloy coating with $C_{60}$ through a sixth exemplary method in the experiment of preparing Zircaloy coatings with different carbon-based slurries;

FIG. 7, in a photograph, illustrates optical micrograph of Zircaloy coating with $C_{60}$ through a seventh exemplary method in the experiment of preparing Zircaloy coatings with different carbon-based slurries;

FIG. 8, in a photograph, illustrates optical micrograph of Zircaloy coating with ethyl cellulose (EC) slurry through an eighth exemplary method in the experiment of preparing Zircaloy coatings with different carbon-based slurries;

FIG. 9, in a photograph, illustrates optical micrograph of Zircaloy coating with a specially processed colloidal graphite dry film lubricant (DAG-154) slurry in the experiment of preparing Zircaloy coatings with different carbon-based slurries;

FIG. 10, in a graph, illustrates X-ray diffraction (XRD) patterns of M-280, $C_{60}$, DAG-154, graphite (synthetic) and nuclear grade graphite carbon powders used in the experiment of preparing Zircaloy coatings with different carbon-based slurries;

FIG. 11, in a graph, illustrates XRD spectrum of carbon black BP-290 used in the experiment of preparing Zircaloy coatings with different carbon-based slurries;

FIG. 12, in a graph, illustrates XRD spectrum of DAG-154 soot used in the experiment of preparing Zircaloy coatings with different carbon-based slurries;

FIG. 13, in a graph, illustrates XRD spectrum of graphite (synthetic) used in the experiment of preparing Zircaloy coatings with different carbon-based slurries;

FIG. 14, in a graph, illustrates XRD spectrum of nuclear grade graphite used in the experiment of preparing Zircaloy coatings with different carbon-based slurries;

FIG. 15, in a graph, illustrates XRD spectrum of $C_{60}$ used in the experiment of preparing Zircaloy coatings with different carbon-based slurries;

FIG. 16, in a graph, illustrates Raman spectrum of (single walled carbon nanotubes) SWNT used in the experiment of preparing Zircaloy coatings with different carbon-based slurries;

FIG. 17, in a graph, illustrates ultraviolet-visible (UV-Vis) spectrum of a $C_{60}$ standard solution used in the experiment of preparing Zircaloy coatings with different carbon-based slurries;

FIG. 18, in a graph, illustrates UV-Vis spectrum of $C_{60}$ extractions used in the experiment of preparing Zircaloy coatings with different carbon-based slurries;

FIG. 19, in a graph, illustrates gas chromatography-mass spectrometry (GC-MS) spectrum of a Toluene extraction of pure M-280 soot used in the experiment of preparing Zircaloy coatings with different carbon-based slurries;

FIG. 20, in a graph, illustrates GC-MS spectrum of a Toluene extraction of M-280 coating soot used in the experiment of preparing Zircaloy coatings with different carbon-based slurries;

FIG. 21, in a graph, illustrates GC-MS spectrum of a Toluene extraction of pure graphite (synthetic) soot used in the experiment of preparing Zircaloy coatings with different carbon-based slurries;

FIG. 22, in a graph, illustrates GC-MS spectrum of a Toluene extraction of graphite (synthetic) coating soot used in the experiment of preparing Zircaloy coatings with different carbon-based slurries;

FIG. 23, in a graph, illustrates GC-MS spectrum of a Toluene extraction of pure $C_{60}$ soot used in the experiment of preparing Zircaloy coatings with different carbon-based slurries;

FIG. 24, in a graph, illustrates GC-MS spectrum of a Toluene extraction of $C_{60}$ coating soot used in the experiment of preparing Zircaloy coatings with different carbon-based slurries;

FIG. 25, in a graph, illustrates GC-MS spectrum of a Toluene extraction of pure SWNT soot used in the experiment of preparing Zircaloy coatings with different carbon-based slurries;

FIG. 26, in a graph, illustrates GC-MS spectrum of a Toluene extraction of SWNT coating soot used in the experiment of preparing Zircaloy coatings with different carbon-based slurries;

FIG. 27, in a graph, illustrates GC-MS spectrum of a Toluene extraction of DAG-154 coating soot used in the experiment of preparing Zircaloy coatings with different carbon-based slurries;

FIG. 28, in a graph, illustrates GC-MS spectrum of a Toluene extraction of EC coating soot used in the experiment of preparing Zircaloy coatings with different carbon-based slurries;

FIG. 29, in a photograph, illustrates a low magnification scanning electron microscopy (SEM) micrograph of graphite (synthetic) coating used in the experiment of preparing Zircaloy coatings with different carbon-based slurries;

FIG. 30, in a photograph, illustrates a high magnification SEM micrograph of graphite (synthetic) coating used in the experiment of preparing Zircaloy coatings with different carbon-based slurries;

FIG. 31, in a photograph, illustrates a low magnification SEM micrograph of CM280 coating (though the fourth method) used in the experiment of preparing Zircaloy coatings with different carbon-based slurries;

FIG. 32, in a photograph, illustrates a high magnification SEM micrograph of CM280 coating (though the fourth method) used in the experiment of preparing Zircaloy coatings with different carbon-based slurries;

FIG. 33, in a photograph, illustrates a low magnification SEM micrograph of SWNT coating (though the fifth method) used in the experiment of preparing Zircaloy coatings with different carbon-based slurries;

FIG. 34, in a photograph, illustrates a high magnification SEM micrograph of SWNT coating (though the fifth method) used in the experiment of preparing Zircaloy coatings with different carbon-based slurries;

FIG. 35, in a photograph, illustrates a low magnification SEM micrograph of $C_{60}$ coating (though the seventh method) used in the experiment of preparing Zircaloy coatings with different carbon-based slurries;

FIG. 36, in a photograph, illustrates a high magnification SEM micrograph of $C_{60}$ coating (though the seventh method) used in preparing experimental coatings;

FIG. 37, in a photograph, illustrates a low magnification SEM micrograph of EC coating (though the eighths method) used in the experiment of preparing Zircaloy coatings with different carbon-based slurries;

FIG. 38, in a photograph, illustrates a high magnification SEM micrograph of EC coating (though the eighth method) used in the experiment of preparing Zircaloy coatings with different carbon-based slurries;

FIG. 39, in a photograph, illustrates a low magnification SEM micrograph of DAG-154 coating used in the experiment of preparing Zircaloy coatings with different carbon-based slurries;

FIG. 40, in a photograph, illustrates a high magnification SEM micrograph of DAG-154 coating used in the experiment of preparing Zircaloy coatings with different carbon-based slurries;

FIG. 41, in a photograph, illustrates low magnification transmission electron microscopy (TEM) micrograph of soot from DAG-154 coating used in the experiment of preparing Zircaloy coatings with different carbon-based slurries;

FIG. 42, in a photograph, illustrates high magnification TEM micrograph of soot from DAG-154 coating, used in the experiment of preparing Zircaloy coatings with different carbon-based slurries, along with an electron diffraction pattern obtained from the center of a flake-like carbon particle;

FIG. 43, in a photograph, illustrates low magnification TEM micrograph of soot from SWNT coating used in the experiment of preparing Zircaloy coatings with different carbon-based slurries;

FIG. 44, in a photograph, illustrates high magnification TEM micrograph of soot from SWNT coating, used in the experiment of preparing Zircaloy coatings with different carbon-based slurries, along with an electron diffraction pattern obtained when the beam was pointed directly at the center of a SWNT bundle;

FIG. 45, in a schematic, illustrates equipment for a preliminary iodine adsorption experiment for determining iodine adsorption of prepared experimental coatings;

FIG. 46, in a photograph, illustrates equipment for the preliminary iodine adsorption experiment;

FIG. 47, in a graph, illustrates thermogravimetric analysis and derivative weight loss (TGA-DTG) curves of pure carbon black powder, as function of temperature, in the preliminary iodine adsorption experiment;

FIG. 48, in a graph, illustrates TGA-DTG curves of carbon black containing 50 weight percent of solid iodine, as function of temperature, in the preliminary iodine adsorption experiment;

FIG. 49, in a graph, illustrates TGA-DTG curves of $I_2$ adsorption using DAG-154, for adsorption time of 2 hours, as function of temperature, in the preliminary iodine adsorption experiment;

FIG. 50, in a graph, illustrates TGA-DTG curves of $I_2$ adsorption using DAG-154, for adsorption time of 4 hours, as function of temperature, in the preliminary iodine adsorption experiment;

FIG. 51, in a graph, illustrates TGA-DTG curves of $I_2$ adsorption using SWNT, for adsorption time of 3 hours, as function of temperature;

FIG. 52, in a graph, illustrates TGA-DTG curves of $I_2$ adsorption using SWNT, for adsorption time of 4 hours, as function of temperature, in the preliminary iodine adsorption experiment;

FIG. 53, in a graph, illustrates X-ray photoelectron spectroscopy (XPS) survey spectra for unexposed and $I_2$-exposed DAG-154 soot samples in the preliminary iodine adsorption experiment;

FIG. 54, in a graph, illustrates XPS survey spectra for unexposed and $I_2$-exposed SWNT soot samples in the preliminary iodine adsorption experiment;

FIG. 55, in a graph, illustrates high resolution I 3d spectra for $I_2$-exposed DAG 154 and SWNT soot samples in the preliminary iodine adsorption experiment;

FIG. 56, in a graph, illustrates deconvolution of the I $3d_{5/2}$ spectrum by curve-fitting for $I_2$-exposed DAG-154 and SWNT soot samples in the preliminary iodine adsorption experiment;

FIG. 57, in a graph, illustrates progression of total $I_2$ adsorption/desorption, as function of time, for SWNT and DAG-154, in terms of total $I_2$ in an advanced iodine adsorption experiment for determining iodine adsorption of prepared experimental coatings;

FIG. 58, in a graph, illustrates progression of total $I_2$ adsorption/desorption, as function of time, for SWNT and DAG-154, in terms of $I_2$ weight percent, in the advanced iodine adsorption experiment;

DESCRIPTION OF VARIOUS EMBODIMENTS

Figure 1:
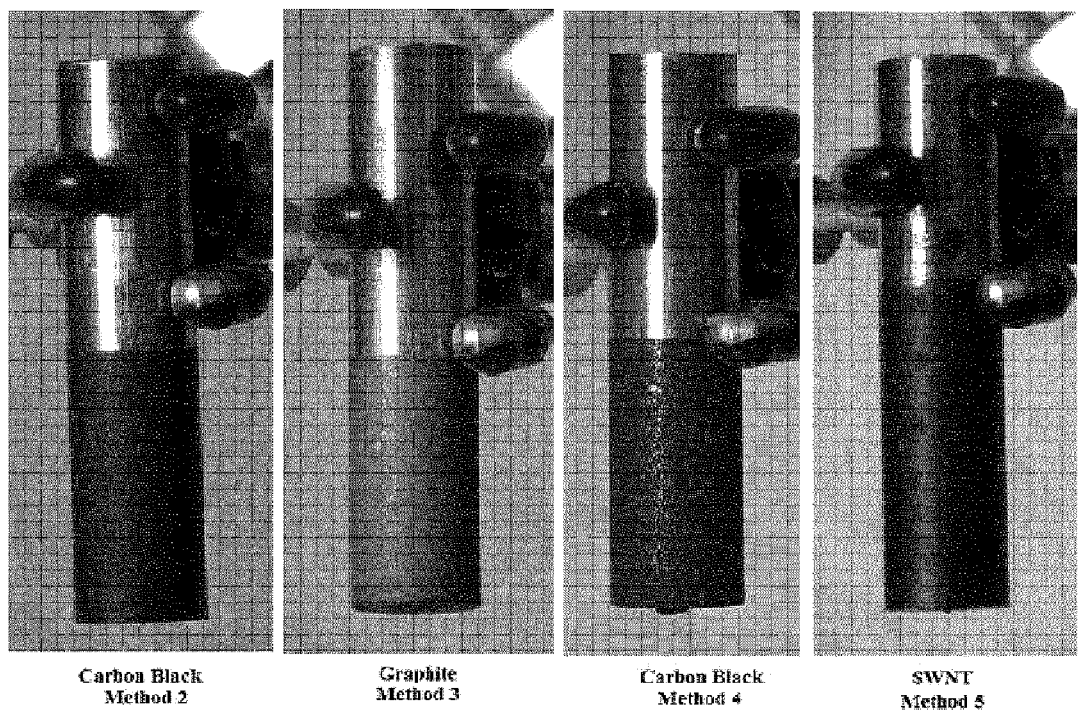

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

SCC problems for natural uranium fuels in current Pressurized Heavy Water Reactors (PHWR) may be reduced by the use of carbon-based thin coatings on the interior sheath surface. Although the exact SCC mitigation mechanism of the carbon coating may still not be known, the coating used has been shown to act as both a pellet lubricant as well as a fission-product chemical barrier. The carbon layer has been shown to provide additional margin against SCC during power ramps. The thickness of the current carbon layer used in PHWR can be several micrometers, with an average thickness in the range of 5-15 µm. However, a significantly thicker carbon layer, may be beneficial to help accommodate fission products produced at the extended operating conditions (high burnup, high power and large power ramps) that may be used in Advanced Pressurized Heavy Water Reactors (APHWR).

One approach to help provide a thicker carbon layer is to build up a thicker deposit of carbon by repeated coating and baking cycles using the current carbon coating technology. However, there may be some drawbacks associated with the present technology for producing a thicker carbon layer. These drawbacks may include, in some instances: an increase in the degradation of the Zircaloy fuel sheath that may be caused and/or exacerbated by the repeating baking cycles; an increase of the carbon content in the fuel element; and an increase in the amount of organic contaminants in the carbon coating due to the fact that organic contaminants may be produced during the baking process of the carbon coating (so that repeated baking cycles may introduce higher amounts of contaminants). An increase in the amounts of organic contaminants may, amongst other things, contribute to an increase of the free hydrogen inventory in the fuel element. To help provide a desired carbon coating, a new carbon coating material has been developed.

Elemental carbon can be found in various allotropic forms, each exhibiting different physical-chemical behaviors, such as carbon black, graphite, diamond, fullerenes and nanotubes.

Carbon black is the name given to a range of products that may not have any crystalline structure and may be simply composed of colloidal sized, spherical particles of elemental carbon, coalesced into particle aggregates and agglomerates. According to the I.U.P.A.C. definition, carbon black can be an industrially manufactured carbon material composed of spheres and aggregates with particle sizes ranging between 10 and 1000 nm. In carbon black, the interplanar distance of hexagonal ring sheets may be larger than that observed for graphite. Because of the random planar orientation of hexagonal rings sheets (turbostratic arrangement), the interplanar distance in carbon black can be in the range from 0.350 to 0.365 nm. The specific gravity of commercial carbon blacks can range from 1.76 to 1.90, depending on the grade. Amorphous carbon may present localized $\pi$ electrons and may contain a high concentration of dangling bonds, which can cause deviations in the C—C distances, as well as deviations in the bond angles (IUPAC Compendium of Chemical Terminology (2nd ed.). International Union of Pure and Applied Chemistry. 1997).

Graphite is a crystalline form of carbon. The crystal structure of graphite consists of hexagonal and rhombohedral arrays of carbon atoms grouped in planar graphene layers. While these layers are composed of strongly bonded carbon atoms at the network vertices, they are weakly bonded to each other. The interplanar distance of graphite was evaluated to be about 0.335 nm, while the interatomic distance in the graphite rings was evaluated to be 0.142 nm. In graphite, each carbon atom uses only 3 of its 4 outer energy level electrons to covalently bond to three other carbon atoms in a plane. Therefore, each carbon atom can contribute one electron to a delocalized system of electrons that can also be a part of the chemical bonding. Because these electrons may be free to move throughout the plane, graphite can conduct electricity. However, the electricity tends to be conducted along the plane of the layers and not in the direction perpendicular to the plane. The specific gravity of graphite has been calculated to be about 2.26.

Fullerene is the generic name given to a family of carbon structures having pentagons and hexagons in their configuration. They are usually referred to as the third carbon allotrope. By definition, a fullerene is a carbon cluster composed of an even number, greater than 20, of carbon atoms. These carbon atoms can form a convex closed-cage with only hexagonal and pentagonal faces.

Carbon Nanotubes (CNT) are relatively new microporous carbon macromolecules, a derivative of carbon fibers and fullerenes. A CNT can be visualized as a graphitic sheet, a hexagonal lattice of carbon atoms, rolled into a cylinder. Two types of CNT may exist: Single Walled Carbon Nanotubes (SWNT) with an average diameter ranging from 1 to 2 nm and Multi Walled Carbon Nanotubes (MWNT), which can be composed of two or more concentric cylindrical shells with a constant separation of 0.345 nm. Owing to van der Waals attractive forces between them, SWNT can usually form bundles during their synthesis.

This description is generally directed to a new approach to providing carbon layers/coatings on objects, including possibly components in an APHWR, such as a providing a coating on a nuclear fuel bundle or other such component. This may help improve some aspects of the carbon layer performance on nuclear fuel sheaths that are used under the generally more demanding operating conditions (high burnup, high power and large power ramps) expected in the APHWR. This approach may include the use of carbon nanostructures, such as carbon nanotubes as a substitute for at least some of the graphite powder used to form conventional carbon layers.

For example, in accordance with the teachings described herein, a carbon layer may be created by applying a carbonaceous slurry containing carbon nanotubes to a surface, and then drying the slurry. Optionally, the carbon nanotubes used may be single-walled carbon nanotubes (SWNT). The present teachings are therefore generally directed to one or more of a new composition for a SWNT-based slurry, a method of preparation of the SWNT-based slurry, a coating procedure of the SWNT-based slurry, and a use for the SWNT-based slurry.

As discussed, fullerenes ($C_{60}$) and SWNT are microporous carbon macromolecules. Thanks to their hollow structure, the inventors believe that these structures may help improve fission product capture when used in place of the current carbon layer in nuclear fuel sheaths. In particular, SWNT-based carbon layer might present one or more of the following advantages under severe reactor operating conditions (or alternatively may not).

In some circumstances, a SWNT-based carbon layer may help improve the fission-product chemical barrier function of the current carbon layer by reducing fission product migration to the Zircaloy sheath. High gas absorption rates have been demonstrated in SWNT bundles, owing to various binding sites available. These binding sites may include: (a)

the space between the individual nanotubes at the interior of the bundle, (b) the empty cavity (which is accessible provided the ends are uncapped and unblocked), (c) the cylindrical outer surface of the individual nanotubes that lie at the external surface of the bundles (or outer surface sites), and (d) active sites formed in the cylindrical outer surface of the individual nanotubes due to the radiolytic degradation of the SWNT-based coating. Optionally, it may reduce the carbon content in the fuel element while maintaining the same layer thickness of current coatings used in PHWR reactors.

SWNT-based carbon layer may, in some circumstances, reduce the content of organic contaminants produced during the baking process of the carbon coating and consequently, reduce the free hydrogen inventory in the fuel element by maintaining the same layer thickness of current coatings used in PHWR reactors. In fact, SWNT have received considerable interest as a hydrogen-storage material thanks to their ability of adsorbing H2 in the interior of the individual nanotubes.

A SWNT-based carbon layer may, in some applications, help improve the heat transfer between fuel pellets and Zircaloy sheaths. SWNT present a remarkable thermal conductivity (2000 W/m/K (axially) compared with graphite (from 60 ($\perp$) to 1950 ($\parallel$) W/m/K).

In some embodiments, a SWNT-based carbon layer may improve the mechanical properties of the current carbon coatings used in PHWR reactors to help reduce and/or avoid local stresses in the sheath caused by the cracks in the pellets and friction between pellet and sheath. (Young's Modulus of SWNT~1 TPa and Tensile Strength~100 GPa).

In accordance with the teachings described herein, the inventors have developed a carbon nanotube slurry that includes a mixture of a carbon material containing carbon nanotubes, a binder material, a solvent and a diluent. In some examples, the slurry can contain between about 0.1% by weight (wt) and 16.0% wt of a carbon material comprising carbon nanotubes, between about 0.1% wt and about 4.0% wt of the binder material, at least about 80.0% wt of the solvent; and between about 0.05% wt and about 6.0% wt of the dilutent. In some embodiments, the resulting carbon nanotubes slurry may include between about 0.1% wt and 2.0% wt of a carbon material comprising carbon nanotubes, between about 0.1% wt and about 1.0% wt of the binder material, at least about 90% wt of the solvent; and between about 0.05% wt and about 0.5% wt of the diluent The slurry can be configured to have any desired, suitable viscosity when mixed. In the examples described herein, the carbon nanotube slurry can be prepared so that the viscosity of the slurry is between about 17 and about 27 mPas, and optionally, may be between 18 and 22 mPas.

Carbon Material

In some preferred embodiments, the slurry may include about 0.8% wt of the carbon material. Optionally, the carbon material itself may include at least about 20% by weight of carbon nanotubes, with the rest of the material being a mixture of other carbon material forms, such as carbon black, fullerenes, graphitic particles (carbon nano-onions, graphene). In some embodiments, the carbon material may include between 20 and about 100% wt of carbon nanotubes, and may, for example, contain about 25-45% wt of SWNT (nanotubes), about 3-6 wt % fullerenes ($C_{60}+C_{70}$), about 1-3 wt % graphitic particles (nano-onions, graphene) and the balance of the material may be carbon black (amorphous).

In some embodiments, the carbon nanotubes may be single walled carbon nanotubes and may be selected so as to have an average diameter of between about 1 nm to 2 nm, and optionally about 1.2-1.4 nm, or alternatively may have a different configuration.

Optionally, the carbon material used to form the nanotube slurry of can have any suitable density, and in the examples described herein has a density of between about 1.25 g/cm³ and about 1.45 g/cm³.

Optionally, the carbon material may have an iodine absorption capacity of at least $4.77 \times 10^{-3}$ g $I_2$/g carbon material (about at least 0.5% wt). This value was measured after the slurry was applied, dried and baked. It is based on the % wt of the total soot generated after baking which may include the different carbons concentrations of the as-produced nanotubes (SWNT) used as raw material and soot produced by the ethyl cellulose during the baking step.

Solvent

The solvent material used to form the slurry may be any suitable solvent, such as isopropanol, ethanol, methanol, acetone and toluene, and in the examples described herein is isopropanol. Optionally, the solvent may account for more than 75.0% wt of the slurry, and optionally may be between about 90.0% wt and 99.5% wt, or between 95.0% wt and 99.0% wt or optionally between about 98.0% wt and 99.0% wt of the total slurry weight. In some embodiments, isopropanol may be used to dissolve ethyl cellulose. In some embodiments, isopropanol may be heated to a mixing temperature that is greater than 30 deg. C., and may about 50° C., which may help dissolve the ethyl cellulose and disperse carbon nanotubes.

Optionally, butanol may also serve to dissolve ethyl cellulose, and propylene glycol and hexylene glycol may be used as surfactants and emulsion stabilizers.

Dilutent

The dilutent used to form the slurry may act as surfactants and emulsion stabilizers and may be any suitable dilutant that is compatible with the carbon material, solvent and other slurry components. Some examples of suitable dilutent material include n-butanol, hexylene glycol, propylene glycol, pentanol, fatty alcohols, cetyl alcohol, stearyl alcohol, cetostearyl alcohol, cetearyl alcohol and optionally may include at least one of n-butanol, hexylene glycol and propylene glycol. Preferably, the dilutent may include a mixture of n-butanol, hexylene glycol and propylene glycol, and in some examples the mixture may be between about 0.05% wt and 2.0% wt of each of n-butanol, hexylene glycol and propylene glycol, between about 0.05% wt and about 1% wt of each of n-butanol, hexylene glycol and propylene glycol. In some embodiments, the resulting slurry may include about 0.5% wt of each of n-butanol, hexylene glycol and propylene glycol.

The binder material may be any suitable material that is compatible with the rest of the slurry components, and optionally may be formed substantially of ethyl cellulose or the like. In some examples, the binder material may provide between about 0.1% wt and 4.0% wt of the carbon nanotube slurry, between about 0.1% wt and about 0.7% wt of the carbon nanotube slurry. In some embodiments, the resulting slurry may include about 0.3% wt and 0.5% of the carbon nanotube slurry. Other possibly binder materials may include polyethylene glycol (PEG), polyvinyl alcohol (PVA), PEG-PVA, polymethylolcarbamide, ethylene/vinyl acetate.

Optionally, some embodiments of the slurry can be formulated to that a ratio of the carbon material to the solvent is between about 0.005 and about 0.2, a ratio of the binder material to the solvent is between about 0.002 and about 0.05, and/or so that a ratio of the dilutent to the solvent is between about 0.005 and about 0.08.

Method of Making a Slurry

A slurry having the composition and properties described herein may be formed using any suitable method. However, when attempting to prepare the slurry for testing, the inventors discovered that conventional preparation techniques, such as those for forming a slurry using non-nanotube carbon materials, such as a slurry based on graphite or carbon black, were not effective at producing a slurry using the carbon nanotube materials described herein. Instead, the inventors had to develop a new method of forming the slurry, examples of which are described herein.

Figure 60:
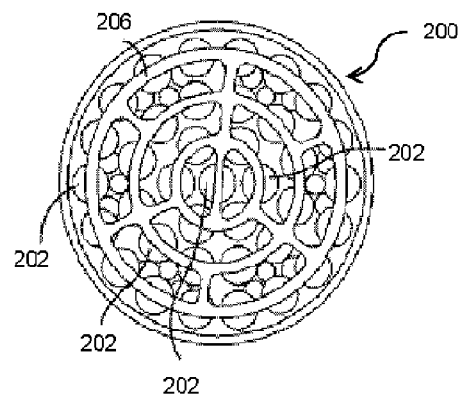
FIG. 60 is an end view of the fuel bundle of FIG. 59.
Figure 61:
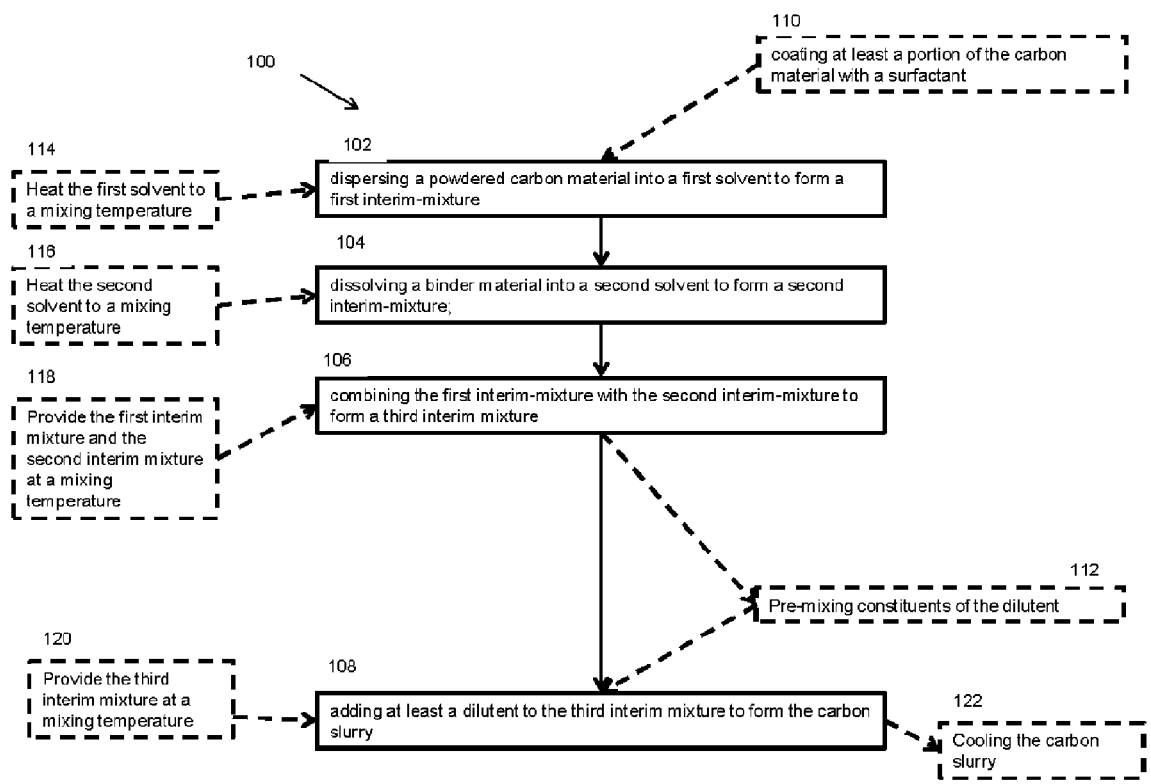
FIG. 61 is one example of a method of making a slurry.

In one example, a method 100 of producing a carbon slurry is shown in FIG. 60 and can include the steps of:
a) dispersing a powdered carbon material into a first solvent to form a first interim-mixture (step 102);
b) dissolving a binder material into a second solvent to form a second interim-mixture (step 104);
c) combining the first interim-mixture with the second interim-mixture to form a third-interim mixture (step 106); and
d) after performing step c) adding at least a dilutent to the third-interim mixture to form the carbon slurry (step 108).

The carbon material, binder material, solvent and diluent used in this method can be any combination of those described herein, and can be provided in suitable amounts such that the slurry formed using this process will have the desired composition/concentrations described herein. The slurry formed using this method at approximately room temperature (i.e. less than about 30 deg. C.) may include 0.1% wt and 8.0% wt of the carbon material, an optionally may include between about 0.8% wt and 2.4% wt of the carbon material when the method is complete.

Optionally, prior to dispersing the carbon material in step a) above at least a portion of the carbon material to be used in the slurry may be coated with any suitable surfactant material (step 110). Examples of suitable surfactants can include Triton X-100 ((C14H22O(C2H4O)n) an hydrophilic polyethylene oxide and an aromatic hydrocarbon lipophilic group, polypropylene glycol, tridecanol, octyl thioglucoside, octyl glucoside, dodecyl maltoside. This may help improve the wettability of the carbon material and/or provide a desired surface energy for the carbon material particles.

Optionally, the first solvent used in the method can be the same as the second solvent. For example, both solvents may be iso-propanol, but alternatively, different solvents may be used in the different method steps in some examples.

Optionally, whether the first and second solvent are the same or different, the first solvent used in step a) may be selected such that it accounts for about 60% wt of the combined weight of the first and second solvents in the finished slurry. When the slurry has been completed, the first and second solvents together may account for more than 75.0% wt of the slurry, and optionally may be between about 90.0% wt and 99.5% wt, or between 95.0% wt and 99.0% wt or optionally between about 98.0% wt and 99.0% wt of the total slurry weight.

Optionally, the dilutent may include at least one of n-butanol, hexylene glycol and propylene glycol, and may include a mixture of n-butanol, hexylene glycol and propylene glycol, pentanol, and cetostearyl alcohol. The dilutent materials may be added so that the slurry includes between about 0.05% wt and about 2% wt of each of n-butanol, hexylene glycol and propylene glycol, and/or between about 0.5% wt of each of n-butanol, hexylene glycol and propylene glycol.

Optionally, the constituents of the dilutent may be pre-mixed together, for example in a separate container (step 112), prior to adding the dilutent mixture to the slurry at step 108. For example, in the illustrated examples the method can include the step of mixing the n-butanol, hexylene glycol and propylene glycol together to form the dilutent, prior to adding the dilutent to the third-interim mixture in step d).

Alternatively, the constituents of dilutent can be individually added into the third-interim mixture in pre-determine amounts. For example, the method can include separately adding the n-butanol, hexylene glycol and propylene glycol to the third-interim mixture in step d).

Optionally, the carbon material can be dispersed into the first solvent (e.g. a solution of alcohol) using an ultrasonic bath which, in some examples can be operated for between about 5 minutes and about 20 minutes and/or until a desired level of mixing has been achieved.

Optionally, the step of dissolving the binder material into the second solvent can be performed while stirring the second solvent. Alternatively, and/or in addition to stirring in step b), the combinations of steps c) and/or d) may also optionally be performed while stirring the slurry.

Optionally, in some examples the first and second interim-mixtures can be combined together by adding the first interim-mixture into a vessel containing the second interim-mixture.

Optionally, the method 100 may be conducted at approximately room temperature, such that the solvents utilized in steps 102 and 104 are at a temperature of between about 15 deg. C. and about 30 deg. C., and optionally between about 18 deg. C. and about 35 deg. C. The mixing in step 106, 108 and optional step 112 may also be performed at generally room temperatures.

Alternatively, prior to performing at least some of the steps in the method 100, such as steps 102, 104, 106 and 108, the solvents may be heated to a mixing temperature that is higher than room temperature. Heating the solvents in this manner may help improve the dispersion of the powdered carbon material in the solvent, and/or may help facilitate the mixing of the first and second interim-mixtures with each other. This may help provide a more homogeneous slurry. The mixing temperature may be any suitable temperature, and may be between about 30 deg. C. and about 60 deg. C. or more, and may be between about 45 deg. C. and about 55 deg. C., and may be about 50 deg. C.

The solvent(s) may be pre-heated to the mixing temperature (i.e. heated to the mixing temperature prior to dispersing the powdered carbon material and/or binder material into the first and second solvents. Alternatively, the solvents may be heated during the dispersing/mixing steps, such that the temperature of the mixture is raised from an initial temperature to the mixing temperature during the mixing process. The interim mixtures created by various steps in the method 100 may be heated to the same mixing temperature or different mixing temperatures. The interim mixtures created may also be held at the elevated mixing temperature after the initial mixing step has been completed, so that the interim mixtures will remain at the desired temperature until they are mixed with each other, and optionally during the mixing process itself.

In such examples, the method 100 may include the optional step 114 of heating the first solvent that is utilized in step 102. Step 114 may be performed prior to step 102, and in some embodiments steps 114 and 102 may be performed simultaneously. Similarly, the method 100 may include an optional step 116 of heating the second solvent that is utilized in step 104. Step 116 may be performed prior to step 104, and in some embodiments steps 116 and 104 may be performed simultaneously. Optionally, the method 100 may include the optional step 118 of providing the first interim mixture and the second interim mixture at a suitable mixing temperature when they are utilized in step 106. This may be done by heating the first interim mixture and the second interim mixture to the mixing temperature in step 118, and/or by keeping the first and second interim mixtures at their relatively elevated mixing temperatures at the conclusion of steps 102 and 104. Step 118 may be performed prior to step 106, and in some embodiments steps 118 and 106 may be performed simultaneously.

The mixing temperatures used in steps 114, 116, 118 and 120 may be substantially the same, or alternatively, may be different.

If the carbon slurry, and/or some or all of the interim mixtures were heated during the formulation process, the resulting carbon slurry may be cooled (either actively or passively) at the conclusion of step 108, as shown via optional step 122. A carbon slurry that was mixed at relatively higher temperatures, and then cooled after mixing (for example to approximately room temperature) may be more homogenous than a slurry formed when then entirety of method 100 is performed at about room temperature.

Material Formed by Drying the Slurry.

Optionally, a dried material may be formed by at least partially drying the slurry described herein. For example, the slurry may be applied to a surface and then dried, thereby providing a carbonaceous coating or film on the surface. This technique may be used to coat a surface or object with the carbon nanotube material.

The relative carbon nanotube concentration in the dried material (coating) may depend on how the slurry is applied and dried, and how much of the solvent and other volatile elements are removed by the drying process. In some examples, a dried, carbon nanotube coating material can be formed by drying and/or baking any version of the carbon slurry described herein to a condition in which the dried and/or baked carbon nanotube coating material comprises more than 99.0% wt of carbon material including more than 20% wt of carbon nanotubes and only traces of organic contaminants. In some embodiments, the dried material may have less than about 0.01% wt (or about 100 ppm) organic contaminants.

The material may be dried using any suitable process, including those described in the examples and test results described herein. For example, the slurry can be dried at room temperature and/or under ambient environmental conditions and in a standard atmosphere. Alternatively, in some examples the slurry can be dried in a heated environment in a modified atmosphere (i.e. baked) at any suitable temperature, and optionally may be baked at temperatures from about 250 deg. C. to about 500 deg. C., and may be baked at temperatures between 300 and 400 deg. C., and optionally at about 350 deg. C. The specific temperature and modified atmosphere selected for a given application may be based on a variety of factors including the available drying time, the desired material dryness and the properties of the underlying object/surface to which the slurry has been applied. For example, it may be desirable to select a baking temperature that is below a melting temperature of the surface that is coated, below its annealing temperature or below other temperatures that may have unwanted effects on the underlying surface or the carbon nanotube coating itself.

Optionally, the slurry can be baked in a modified atmosphere, such as a low-oxygen environment and optionally under substantially vacuum-like conditions from about $10^{-1}$ torr to about $10^{-4}$ torr, and optionally at about $10^{-4}$ torr.

Drying/baking times can vary based on the properties of the slurry, the baking temperature and conditions, and the desired condition of the dried material, and can be between 1 hour and about 6 hours or more, and in some examples may be about 2 hours. Cooling times may be between 1 hour to 12 hours, and in some examples may be about 12 hours at vacuum-like conditions.

Fuel Element Including Slurry Carbon Coating.

The carbon nanotube slurry described herein may be used to coat a variety of different objects and/or surfaces. In one example, the slurry may be used to help provide a desired carbon layer on portions of a nuclear fuel bundle, such as providing a carbon nanotube layer on the interior surface of the nuclear fuel sheath portions.

Figure 59:
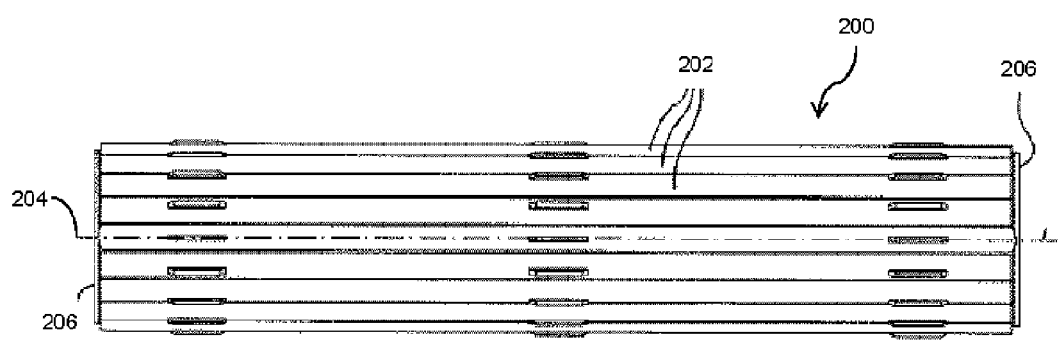
FIG. 59 is a side view of one example of a fuel bundle.

Referring to FIG. 59, one example of a nuclear fuel bundle 200 for use in a nuclear reactor includes a plurality of a metal fuel sheaths 202 that extend parallel to each other along a longitudinal fuel element axis 204. The sheaths 202 are spaced apart from each other and are configured as generally hollow conduits, having an interior surface and an opposing outer surface, and are sized and configured to receive and retain nuclear fuel material. The sheaths 202 are held in their desired locations by a pair of end plates 206. Optionally, the carbon slurry described herein can be applied to the inner surface of at least some of the fuel sheaths 202 (and preferably all of the sheaths 202). The sheaths 202 coated with the carbon nanotube slurry and the slurry can then be dried and baked using any suitable technique, thereby forming a carbon layer, including single-walled carbon nanotubes (SWNT) on the interior surface of the sheath 202. The slurry can be applied so that the carbon layer, once dried and baked is between about 1 μm and about 30 μm, and may have an iodine absorption capacity of at least $4.77 \times 10^{-3}$ g $I_2$/g carbon material (about at least 0.5% wt).

To investigate some of the features and properties that may be achieved by coating a nuclear fuel sheath (cladding) with SWNT, the inventor conducted experiments by using different types of carbon slurries prepared with different carbon nanostructures, including carbon black, graphite (synthetic), $C_{60}$ (fullerenes), SWNT and DAG-154, according to different exemplary methods, discussed below, to prepare samples of Zircaloy-4 coatings.

Soot samples were then obtained from the prepared sample coatings. Soot samples were characterized with a number of analytical techniques, including X-Ray Diffraction (XRD), Raman spectroscopy, ultraviolet-visible (UV-Vis) spectrometry, gas chromatography-mass spectrometry (GC-MS), scanning electron microscopy (SEM) and transmission electron microscopy (TEM). Preliminary experiments were also performed to compare the $I_2$ absorption capability of SWNT against DAG-154 (the standard carbon coating in PHWR fuel). $I_2$-absorbed samples were characterized using Thermogravimetric Analysis (TGA) and X-ray Photoelectron Spectroscopy (XPS).

Based on the conducted experiments, as discussed in more detail below, SWNT coatings may demonstrate high iodine adsorption rate. This high iodine adsorption rate and capability observed in SWNT coatings might help improve fuel performance and SCC mitigation at the expanded operating conditions (high burnup, high power and large power ramps) proposed for advanced fuels used in APHWR.

Methods of producing SWNT, preparation of the SWNT-based slurry and other carbon-based slurries, and application of the slurries to Zircaloy sheath as well as the experiments conducted to demonstrate the above-discussed advantages of SWNT-based slurry Zircaloy coating in comparison to other carbon-based slurry Zircaloy coatings are discussed in more detail below.

Methods of Producing SWNT

To date, a number of processes have been developed for the synthesis of SWNT, which can be classified into two groups according to the method applied to release carbon atoms from carbon-containing precursors: (i) solid carbon vaporization-condensation, such as the arc discharge and laser-ablation methods, (ii) gas-phase carbon decomposition, such as chemical vapor decomposition, plasma-enhanced chemical vapor decomposition and thermal pyrolysis.

Arc discharge methods have been shown to help provide of good quality SWNT with a high yield, but can produce significant amounts of impurities like amorphous carbon. Laser-ablation methods can produce a product of acceptable quality that consists predominantly of highly crystalline SWNT at rates around a few grams per day. Because of the significant capital costs for higher power, the scale-up of laser-ablation methods is generally not feasible. In addition, both arc discharge and laser-ablation methods are essentially batch processes with the operating time depending on the lifetime of the consumable catalyst-doped solid graphite electrode or target, respectively.

Chemical vapor decomposition (CVD) methods have gained a great interest for their ability to produce very clean SWNT. In catalytic CVD processes, the catalyst metals decompose the gas-phase carbon feedstock and at the same time, enhance the growth of SWNT from the feedstock. On the other hand, plasma-enhanced CVD processes involve the decomposition of the carbon feedstock via collisions with energetic electrons generated by nonequilibrium cold plasma. Most CVD methods incorporate a substrate-supported catalyst to produce either randomly oriented or aligned SWNT mats on the support surface.

Recently, direct current (dc) and radio frequency (RF) inductively coupled thermal plasmas have begun to be used for the production of good quality SWNT. Thermal plasma technology in general may be extraordinarily well suited to provide the physical and chemical phenomena that may be necessary for the efficient synthesis of SWNT owing to its high temperature (1000-15,000 K), high energy density and abundant content of reactive species (ions and neutrals), which may not be readily achievable by other methods. In addition, the design and geometry of the thermal plasma systems enable continuous operation and large production capacities (kg quantities).

SWNT-Based Slurry and Method of Preparing Carbon-Based Slurry

Typical carbon slurries used to coat Zircaloy sheaths can be prepared by mixing different ratios of DAG-154, a commercial carbon suspension, and iso-propanol. In the case of custom made carbon-based slurries, they can be prepared by mixing fine particles of carbon powder, an organic binder and commercial organic solvent. Typically, the following compounds may be used:
- Carbon—Fine particles of graphite;
- Organic Binder—Ethyl cellulose;
- Fluid Components—Isopropyl alcohol; and a
- Diluents—Hexylene glycol, n-butanol, and propylene glycol monomethyl ether.

Referring to Table 1, below, examples of typical compounds for the preparation of carbon-based slurries along with their approximate weights are shown.

TABLE 1

| Compounds | Weight (g) | Weight (%) | Total Weight (%) |
|---|---|---|---|
| Solids | | | |
| Carbon Material | 16 | 80.0 | 20 |
| Ethyl Cellulose | 4 | 20.0 | |
| Solvents | | | |
| Isopropanol | 74 | 92.5 | 80 |
| n-Butanol | 2 | 2.5 | |
| Hexylene Glycol | 2 | 2.5 | |
| Propylene Glycol Monomethyl Ether | 2 | 2.5 | |

Carbon-based slurries can also be prepared using different carbon nanostructures, including carbon black M280, synthetic graphite (synthetic), $C_{60}$ and SWNT.

In some exemplary embodiments, to improve both binder dissolution and carbon powder dispersion, the following slurry mixing procedure may be used (as discussed in more detail with reference to exemplary embodiments of Methods 2 to 6, below):

a) Dispersing the carbon powder in about 60% of the iso-propanol using an ultrasonic bath for 15 min;
b) Dissolving the ethyl cellulose in about 40% of the iso-propanol using a magnetic stirrer;
c) Blending slowly the carbon powder dispersion with ethyl cellulose dissolution by adding the carbon dispersion. Use a magnetic stirrer during blending; and
d) Adding and mixing the rest of the solvents (n-Butanol, Hexylene Glycol, Propylene Glycol Monomethyl Ether)—a magnetic stir can be used during mixing;

Referring to Table 2, below, the carbon material and amounts of different ingredients that may be used in preparation of carbon slurry according to exemplary Methods 2, 3 and 4 are shown.

TABLE 2

| | Carbon Black M280 (Method 2) | | Graphite (Synthetic) (Method 3) | | Carbon Black M280 (Method 4) | |
|---|---|---|---|---|---|---|
| Compounds | Weight (g) | Weight (%) | Weight (g) | Weight (%) | Weight (g) | Weight (%) |
| Solids | | | | | | |
| Carbon powder | 3.0 | 2.0 | 16.0 | 9.3 | 16.0 | 5.8 |
| Ethyl cellulose | 4.0 | 2.6 | 4.0 | 2.3 | 4.0 | 1.5 |
| Solvents | | | | | | |
| Iso-propanol | 145.0 | 91.8 | 145.0 | 84.8 | 250.0 | 90.6 |
| n-butanol | 2.0 | 1.2 | 2.0 | 1.2 | 2.0 | 0.7 |
| Hexylene glycol | 2.0 | 1.2 | 2.0 | 1.2 | 2.0 | 0.7 |
| Propylene glycol | 2.0 | 1.2 | 2.0 | 1.2 | 2.0 | 0.7 |

In the experiments conducted to demonstrate the above-discussed advantages of SWNT-based slurry coatings, slurries were prepared according to the exemplary Methods 2, 3 and 4, discussed above.

Due to the relatively low density of SWNT as compared to conventional carbon materials, the preparation of the SWNT slurry was unexpectedly discovered to require the use of relatively larger amounts of iso-propanol to disperse, for example, 2.4 g of SWNT. Part of the iso-propanol may later be freely evaporated for about, for example, 18 hours in a fume hood. It was also discovered that a smaller amount of ethyl cellulose may be required.

Referring to Table 3, below, amounts of different ingredients that may be used for preparation of the SWNT slurry, according to the exemplary Method 100, before and after iso-propanol evaporation, are shown.

TABLE 3

| Compounds | Before Evaporation | | After Evaporation | |
|---|---|---|---|---|
| | Weight (g) | Weight (%) | Weight (g) | Weight (%) |
| Solids | | | | |
| Carbon powder (SWNT) | 2.5 | 0.8 | 2.5 | 1.1 |
| Ethyl cellulose | 1.0 | 0.3 | 1.0 | 0.5 |
| Solvents | | | | |
| Iso-propanol | 300.0 | 98.45 | 215.0 | 97.8 |
| n-butanol | 0.5 | 0.15 | 0.5 | 0.2 |
| Hexylene glycol | 0.5 | 0.15 | 0.5 | 0.2 |
| Propylene glycol | 0.5 | 0.15 | 0.5 | 0.2 |

In another example, a carbon slurry was formed by utilizing the optional heating-related steps 114, 116, 118, 120 and 122 was found to have the properties listed in Table 4, and was observed to be more homogenous (i.e. to have a more homogeneous distribution of the carbon material within the slurry) than the carbon slurries formed via the method 100 but without the optional heating steps. In this example, the solvents and interim mixtures were heated to about 50 deg. C. during the dispersion and mixing steps.

TABLE 4

| Compounds | Weight (g) | Weight (%) |
|---|---|---|
| Solids | | |
| Carbon Material | 4.0 | 2.22 |
| Ethyl Cellulose | 2.0 | 1.11 |
| Solvents | | |
| Isopropanol | 168 | 93.34 |
| n-Butanol | 2 | 1.11 |
| Hexylene Glycol | 2 | 1.11 |
| Propylene Glycol Monomethyl Ether | 2 | 1.11 |

In the experiments conducted to demonstrate the above-discussed advantages of SWNT-based slurry coatings, slurry was prepared according to the exemplary Method 100 as well.

Fullerenes may be the only known allotrope of carbon that can be dissolved in common solvents at room temperature. $C_{60}$ slurries can be prepared using iso-propanol and toluene as solvents.

Referring to Table 5, below, amounts of different ingredients that may be used for preparation of the $C_{60}$ slurries, according to exemplary Methods 6 and 7, are shown.

TABLE 5

| Compounds | $C_{60}$ (Method 6) | | $C_{60}$ (Method 7) | | EC (Method 8) | |
|---|---|---|---|---|---|---|
| | Weight (g) | Weight (%) | Weight (g) | Weight (%) | Weight (g) | Weight (%) |
| Solids | | | | | | |
| Carbon powder | 2.0 | 2.4 | 1.0 | 1.0 | | |
| Ethyl cellulose | 5.0 | 6.0 | 4.0 | 4.1 | 4.0 | 3.4 |
| Solvents | | | | | | |
| Iso-propanol | 75.0 | 89.8 | 40.0 | 41.5 | 115.0 | 95.4 |
| n-butanol | 0.5 | 0.6 | 0.5 | 0.5 | 0.5 | 0.4 |
| Hexylene glycol | 0.5 | 0.6 | 0.5 | 0.5 | 0.5 | 0.4 |
| Propylene glycol | 0.5 | 0.6 | 0.5 | 0.5 | 0.5 | 0.4 |
| Toluene | | | 50.0 | 51.9 | | |

In the experiments conducted to investigate the properties of SWNT-based slurry coatings, slurries were prepared according to the exemplary Methods 6 and 7 as well.

Although the solubility of $C_{60}$ in iso-propanol has not been determined, this is assumed to be similar to the solubility observed for $C_{70}$, which is on the order of 0.0021 mg/mL. The solubility of $C_{60}$ in toluene has been determined to be about 3 mg/mL.

Due to the solubility of $C_{60}$ in iso-propanol and toluene, about 0.1575 and 150.0 mg of $C_{60}$ may be dissolved in the embodiments of Method 6 and Method 7, respectively. The rest of the powder may not be dissolved or dispersed. Once the magnetic stirrer is stopped, a precipitate of the remaining powder may be formed at the bottom of a beaker containing the compounds.

Blank slurry may also be prepared using only ethyl cellulose (EC). Referring again to Table 5, above, amounts of different ingredients that may be used for preparation of EC slurry according to an exemplary Method 8 are shown.

In the experiments conducted to demonstrate the above-discussed advantages of SWNT-based slurry coatings, slurry was also prepared according to the exemplary Method 8.

Referring again to the conducted experiments, in order to test the ability of the slurries, prepared according to the exemplary Methods 2 to 8, to produce a homogenous coating, preliminary coating tests were performed by submerging the tip of a Zircaloy rod into the prepared slurries. The coatings were then set to evaporate freely in air.

Referring to FIG. 1, an image of different Zircaloy rods with tips coated with different carbon coatings prepared according to the above embodiments is shown. During the preliminary coating tests, all the slurries presented a very viscous consistency under static conditions. However, the slurries became less viscous over time when they were shaken or agitated, improving their flowability. This time-dependent shear thinning property is known as thixotropy.

Method of Coating Zircaloy Tubes with Carbon-Based Slurries

In one embodiment, once the carbon-based slurries were prepared according to any of the above-discussed exemplary methods, the inside of the Zircaloy sheaths were coated using the different carbon-based slurries. For example, the slurries can be applied by brush, dip, roller, or spray. The slurries may need to be agitated thoroughly just prior to use.

Referring again to the experiments, viscosities of the slurries prepared according to the above-discussed exemplary methods were measured using a rotational viscometer, e.g., Contraves Rheomat 115 equipped with a DIN 114 viscosity vessel. The equipment was calibrated using a N35 viscosity reference standard. Referring to Table 6, below, the calibration results of a viscosity reference standard at the fifteen required settings are shown. After calibration, viscosities of the different carbon slurries were measured. Table 6, Table 7, and Table 8, below, show the viscosity results of the different carbon-based slurries. In an embodiment, the coated Zircaloy sheaths may be dried and baked under vacuum, e.g., at about 350° C. for two hours. During the experiments, several preliminary tests, including scratch and compression tests, were performed to evaluate the quality of the coatings that were made according to this embodiment.

TABLE 6

| Viscometer Settings | Shear Speed | Std Output | μ (mPa·s) | CB-M280 Method 2 (Ratio 1.5:1) Output | μ (mPa·s) | Graphite (synthetic) Method 3 (Ratio 1.5:1) Output | μ (mPa·s) | CB-M280 Method 4 (Ratio 1.5:1) Output | μ (mPa·s) |
|---|---|---|---|---|---|---|---|---|---|
| 01 | 977.00 | 0 | 0.00 | 0 | 0.00 | 0 | 0.00 | 0 | 0.00 |
| 02 | 683.00 | 0 | 0.00 | 0 | 0.00 | 0 | 0.00 | 0 | 0.00 |
| 03 | 478.00 | 0 | 0.00 | 0 | 0.00 | 0 | 0.00 | 0 | 0.00 |
| 04 | 334.00 | 0 | 0.00 | 0 | 0.00 | 0 | 0.00 | 0 | 0.00 |
| 05 | 233.00 | 0 | 0.00 | 0 | 0.00 | 0 | 0.00 | 0 | 0.00 |
| 06 | 162.90 | 0 | 0.00 | 0 | 0.00 | 0 | 0.00 | 0 | 0.00 |
| 07 | 113.60 | 1 | 113.60 | 0 | 0.00 | 0 | 0.00 | 0 | 0.00 |
| 08 | 79.50 | 1 | 79.50 | 0 | 0.00 | 0 | 0.00 | 0 | 0.00 |
| 09 | 55.50 | 1 | 55.50 | 0 | 0.00 | 0 | 0.00 | 0 | 0.00 |
| 10 | 38.80 | 2 | 77.60 | 0 | 0.00 | 0 | 0.00 | 0 | 0.00 |
| 11 | 27.10 | 2 | 54.20 | 1 | 27.10 | 1 | 27.10 | 1 | 27.10 |
| 12 | 18.95 | 3 | 56.85 | 1 | 18.95 | 1 | 18.95 | 1 | 18.95 |
| 13 | 13.21 | 4 | 52.84 | 2 | 26.42 | 2 | 26.42 | 2 | 26.42 |
| 14 | 9.23 | 5 | 46.15 | 2 | 18.46 | 2 | 18.46 | 2 | 18.46 |
| 15 | 6.45 | 7 | 45.15 | 3 | 19.35 | 3 | 19.35 | 3 | 19.35 |
| Average: | | 1.7 | 38.75 | 0.66 | 7.35 | 0.66 | 7.35 | 0.66 | 7.35 |
| Average last four reading | | 4.75 | 50.24 | 2 | 20.75 | 2 | 20.75 | 2 | 20.75 |
| Comments | | | | Viscosity of the as-prepared slurry was 52.55 mPa·s. 60 g of propanol were added. | | Viscosity of the as-prepared slurry was 54.17 mPa·s. 60 g of propanol were added. | | Viscosity of the as-prepared slurry was 17.49 mPa·s. 16.7 g of propanol were removed by stirring and leaving it evaporates in air. | |

TABLE 7

| Viscometer Settings | Shear Speed | SWNT Method 100 (Ratio 1.5:1) Output | μ (mPa·s) | $C_{60}$ Method 6 (Ratio 1.5:1) Output | μ (mPa·s) | $C_{60}$ Method 7 (Ratio 1.5:1) Output | μ (mPa·s) |
|---|---|---|---|---|---|---|---|
| 01 | 977.00 | 0 | 0.00 | 0 | 0.00 | 0 | 0.00 |
| 02 | 683.00 | 0 | 0.00 | 0 | 0.00 | 0 | 0.00 |
| 03 | 478.00 | 0 | 0.00 | 0 | 0.00 | 0 | 0.00 |
| 04 | 334.00 | 0 | 0.00 | 0 | 0.00 | 0 | 0.00 |
| 05 | 233.00 | 0 | 0.00 | 0 | 0.00 | 0 | 0.00 |
| 06 | 162.90 | 0 | 0.00 | 0 | 0.00 | 0 | 0.00 |
| 07 | 113.60 | 0 | 0.00 | 0 | 0.00 | 0 | 0.00 |
| 08 | 79.50 | 0 | 0.00 | 0 | 0.00 | 0 | 0.00 |
| 09 | 55.50 | 0 | 0.00 | 0 | 0.00 | 0 | 0.00 |
| 10 | 38.80 | 0 | 0.00 | 0 | 0.00 | 0 | 0.00 |
| 11 | 27.10 | 1 | 27.10 | 1 | 27.10 | 1 | 27.10 |
| 12 | 18.95 | 1 | 18.95 | 1 | 18.95 | 1 | 18.95 |
| 13 | 13.21 | 2 | 26.42 | 2 | 26.42 | 2 | 26.42 |
| 14 | 9.23 | 2 | 18.46 | 2 | 18.46 | 2 | 18.46 |
| 15 | 6.45 | 3 | 19.35 | 3 | 19.35 | 3 | 19.35 |
| Average | | 0.66 | 7.35 | 0.66 | 7.35 | 0.66 | 7.35 |
| Average last four reading | | 2 | 20.75 | 2 | 20.75 | 2 | 20.75 |
| Comments | | Viscosity of the as-prepared slurry was 20.79 mPa·s. | | Viscosity of the as-prepared slurry was 20.79 mPa·s. 110 g of propanol were added. The slurry was very thin and transparent. | | Viscosity of the as-prepared slurry was 74.96 mPa·s. 80 g of propanol were added. The slurry was very thin and transparent. | |

TABLE 8

| Viscometer Settings | Shear Speed | EC Method 8 (Ratio 1.5:1) | | DAG-154 (Ratio 1.5:1) | |
|---|---|---|---|---|---|
| | | Output | μ (mPa · s) | Output | μ (mPa · s) |
| 01 | 977.00 | 0 | 0.00 | 0 | 0.00 |
| 02 | 683.00 | 0 | 0.00 | 0 | 0.00 |
| 03 | 478.00 | 0 | 0.00 | 0 | 0.00 |
| 04 | 334.00 | 0 | 0.00 | 0 | 0.00 |
| 05 | 233.00 | 0 | 0.00 | 0 | 0.00 |
| 06 | 162.90 | 0 | 0.00 | 0 | 0.00 |
| 07 | 113.60 | 0 | 0.00 | 0 | 0.00 |
| 08 | 79.50 | 0 | 0.00 | 0 | 0.00 |
| 09 | 55.50 | 0 | 0.00 | 0 | 0.00 |
| 10 | 38.80 | 0 | 0.00 | 0 | 0.00 |
| 11 | 27.10 | 1 | 27.10 | 1 | 27.10 |
| 12 | 18.95 | 1 | 18.95 | 1 | 18.95 |
| 13 | 13.21 | 2 | 26.42 | 2 | 26.42 |
| 14 | 9.23 | 2 | 18.46 | 2 | 18.46 |
| 15 | 6.45 | 3 | 19.35 | 3 | 19.35 |
| Average | 215.35 | 0.66 | 7.35 | 0.66 | 7.35 |
| Average last four reading | | 2 | 20.75 | 2 | 20.75 |
| Comments | | Viscosity of the as-prepared slurry was 20.79 mPa · s. | | | |

Overall, the coating procedure, in one embodiment, may involve the below steps:

a) Checking a rotational viscometer, e.g., RHEOMAT 115 rotational viscometer, using a Viscosity Reference Standard before using the instrument on any coating mixtures—Table 6, above, shows the viscosity results of the standard at the required 15 different speeds of RHEOMAT 115, using 3.5 mL of reference standard warmed to 25° C.;

b) Homogenizing the carbon-based slurry with, e.g., a magnetic stirrer using, e.g., a covered glass beaker placed on a hot plate, e.g., for 30 minutes on setting 4 with no heat;

c) After stirring, measuring the viscosity of the slurry using the rotational viscometer, e.g., RHEOMAT 115 rotational viscometer; depending on the initial viscosity, diluting the as-received slurries with iso-propanol as-required to achieve a final viscosity, e.g., of about 19 mPa·s—Table 6 to Table 8, above, show the viscosity results of the different carbon-based slurries;

d) Identifying the Zircaloy sheaths, e.g., using an engraver pen;

e) Cleaning the Zircaloy sheaths, e.g., by pouring iso-propanol down the tube, agitating it and then emptying it out of the tubes before blowing the tubes, e.g., with argon; drying the Zircaloy sheaths, e.g., on the drying rack, e.g., for 5 minutes;

f) Flooding the Zircaloy sheaths with the carbon-based slurry, e.g., for 30 seconds; then, draining the sheath, e.g., for 5 minutes at the flooding station; drying the coating, e.g., by inverting and placing the sheath on the drying station with fans turned on, e.g., for an additional 2 hours;

g) Baking the Zircaloy sheaths under vacuum, e.g., (about $10^{-4}$ torr) at 350° C. for 2 hours—the required time for the furnace to achieve the baking temperature may be about 3.3 hours, while the furnace cool down with vacuum may be about 12 hours.

h) After baking, performing a visual inspection, a scratch test, a compression test and a test on the thickness of the coating on the inside of the tube, e.g., using a Microderm equipment; and i) Taking a picture of the carbon layer using an optical microscope, e.g., Unimet Unitron 8150.

Referring again to the experiments, most of the slurries had to be diluted with propanol. Three Zircaloy sheaths were coated using carbon-based slurries prepared according to the exemplary Methods 2 to 8. A single layer was applied, as the goal was to determine if the coatings produced with the different carbon-based slurries adhere to the Zircaloy wall, in a similar way to DAG-154. Coatings produced with the ethyl cellulose (EC) slurry were used as reference coatings.

Two preliminary tests were performed to assess coating adherence. A compression test was used to evaluate visually if the carbon coating flakes off when the tube is compressed. A scratch test was performed on Zircaloy sheaths previously sectioned and split open coated. A cross-sectional pattern was then scratched into the sheaths and any carbon flaking was noted.

Table 9 shows the results of the Zircaloy coatings using the different carbon-based slurries, as well as coating prepared with ethyl cellulose and DAG-154 for comparison.

TABLE 9

| Tube | Section | Thickness (μm) | Scratch Test | Compression Test | Comments |
|---|---|---|---|---|---|
| CB-M2 | Top | 0.3 | Pass | Pass | The tubes presented a gold tint appearance on the outside wall; a double coat was applied to the tubes because the first coating was transparent. Inside of the tube looked textured before baking and after it looked smooth and uniformed. |
| | Middle | 0.5 | | | |
| | Bottom | 0.5 | | | |

TABLE 9-continued

| Tube | Section | Thickness (μm) | Scratch Test | Compression Test | Comments |
|---|---|---|---|---|---|
| G-M3 | Top | 1.5 | Pass | Pass | The tubes presented a gold tint appearance on the outside |
| | Middle | 0.5 | | | wall. The tube looked smooth and uniformed on the inside. |
| | Bottom | 2.0 | | | Graphite was falling off the inside wall of the tube when |
| | | | | | measuring the thickness of the slurry. |
| CB-M4 | Top | 1.4 | Pass | Pass | The tubes presented a gold tint appearance on the outside |
| | Middle | 0.8 | | | wall. Inside of the tube looked smooth and uniformed. After |
| | Bottom | 1.8 | | | baking it was not sticking to the tube |
| SWNT-M5 | Top | 1.4 | Pass | Pass | The tubes presented a gold tint appearance on the outside |
| | Middle | 0.9 | | | wall. Inside of the tube looked very chunky and rough. The |
| | Bottom | 3.0 | | | slurry did not stick to the entire tube - it looks like it ran off |
| | | | | | in a lot of spots. Inside of the tube looked smooth and |
| | | | | | uniformed after baking. |
| $C_{60}$-M6 | Top | 0.5 | Pass | Pass | The tubes presented a gold tint appearance on the outside |
| | Middle | 0.9 | | | wall. Inside of the tubes looked very chunky and rough. The |
| | Bottom | 1.2 | | | slurry did not stick to the entire tube - it looks like it ran off in |
| | | | | | a lot of spots. |
| $C_{60}$-M7 | Top | Not | Pass | Pass | The tubes presented a gold tint appearance on the outside |
| | Middle | measured | | | wall. On the inside of the tube the slurry was very thin and |
| | Bottom | | | | transparent. There was no thickness measurement of the |
| | | | | | slurry taken because it was too thin. |
| EC-M8 | Top | Not | Pass | Pass | The tubes presented a gold tint appearance on the outside |
| | Middle | measured | | | wall. On the inside of the tube the slurry was rough texture. |
| | Bottom | | | | After baking it flaked off just by touching the inside of the |
| | | | | | tube with the probe to measure the slurry thickness. There |
| | | | | | was no thickness measurement taken of the coating. |
| DAG-154 | Top | 3.4 | Pass | Pass | The tubes presented a gold tint appearance on the outside |
| | Middle | 2.0 | | | wall. Tubes 1 and 3 looked good. Tube 2 had a stain inside |
| | Bottom | 2.4 | | | from the propanol not being dry enough. It should have been |
| | | | | | left on the drying rack longer. |

Referring still to the experiments, although some carbon-based slurries were coarse with visible particle agglomerates and rough when applied to the Zircaloy wall, the coatings presented a very good, homogeneous appearance after baking, as shown in the experimental results. All the coated Zircaloy sheaths passed the compression and scratch tests. However, coatings produced using $C_{60}$ slurries were very thin and transparent on the inside of the tube. No thickness was detected with the Micro-derm equipment.

Referring to FIGS. 2 to 9, images of Zircaloy coatings with different carbon-based slurries prepared according to the exemplary Methods 2 to 8 in the above-discussed experiments are shown. The images include optical micrographs, and pictures of the compression and scratch tests, as well as the coating of a stainless steel mesh.

Figure 2:
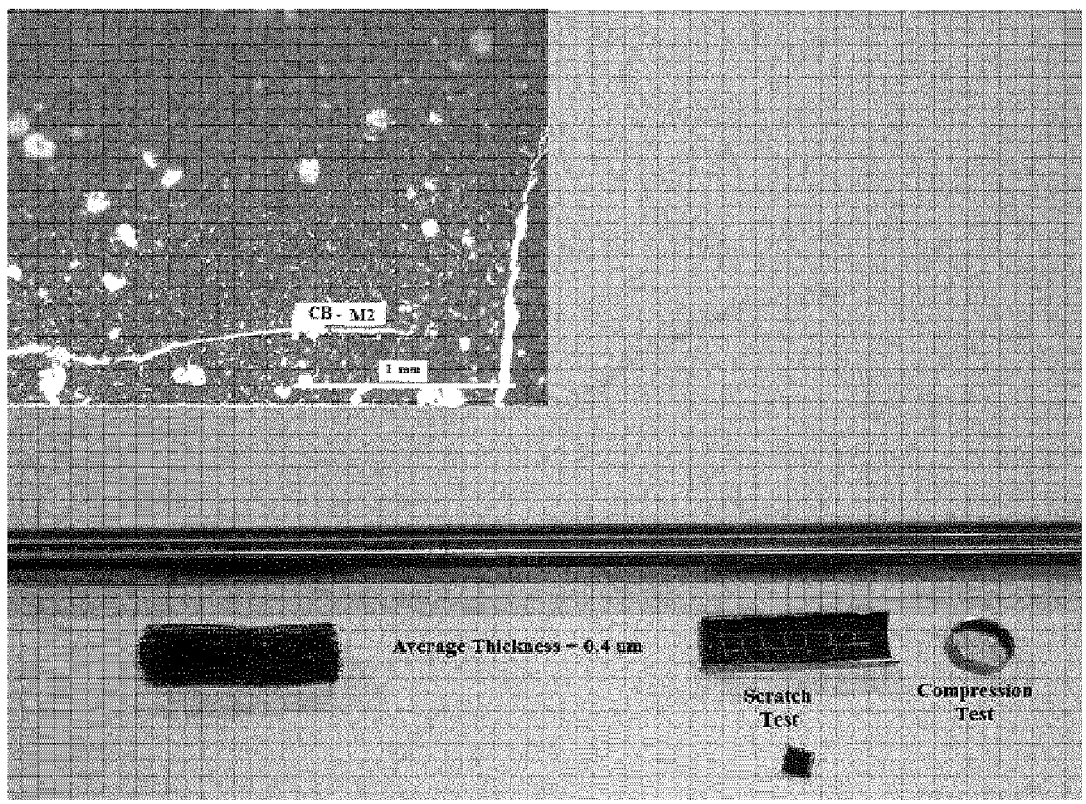
Figure 3:
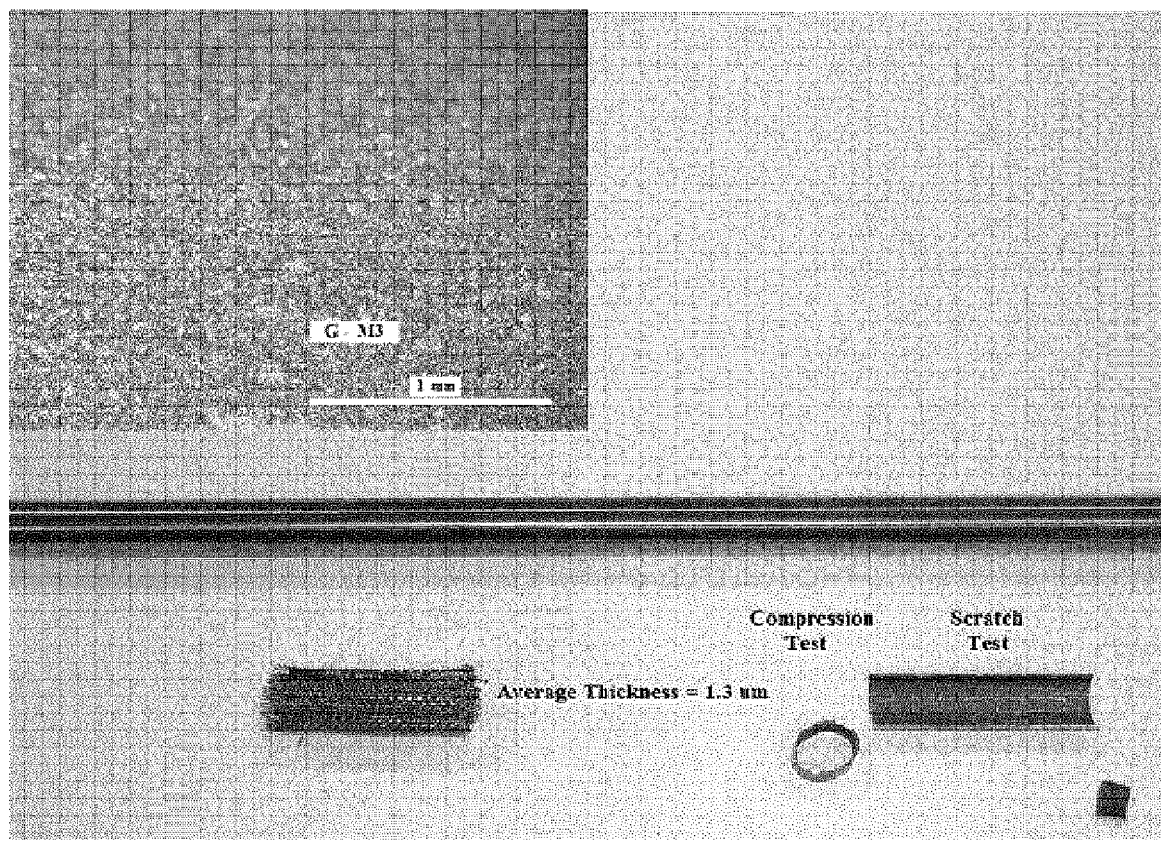
Figure 4:
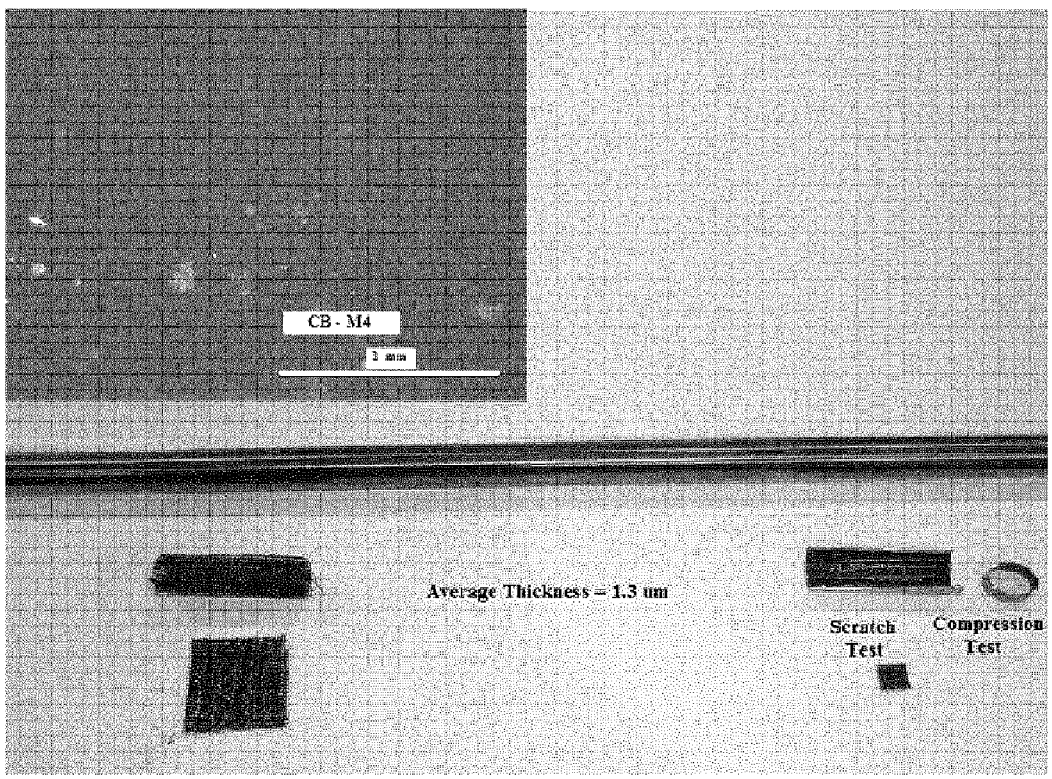
Figure 5:
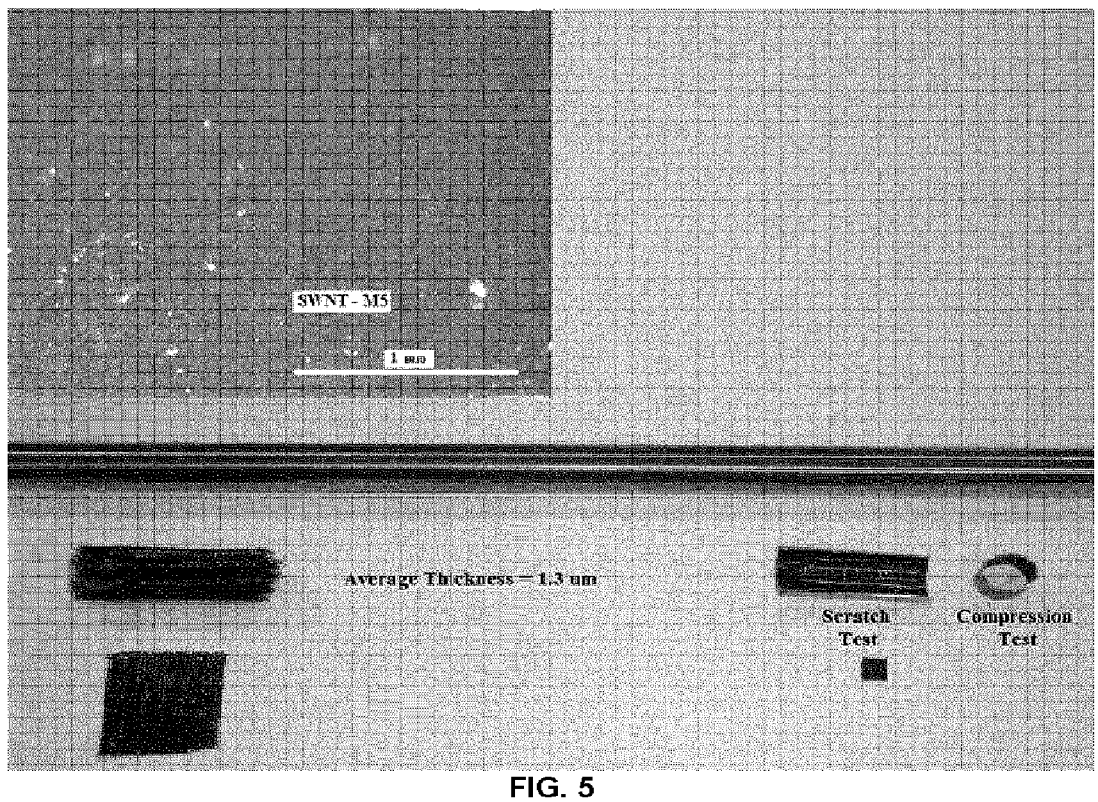
Figure 6:
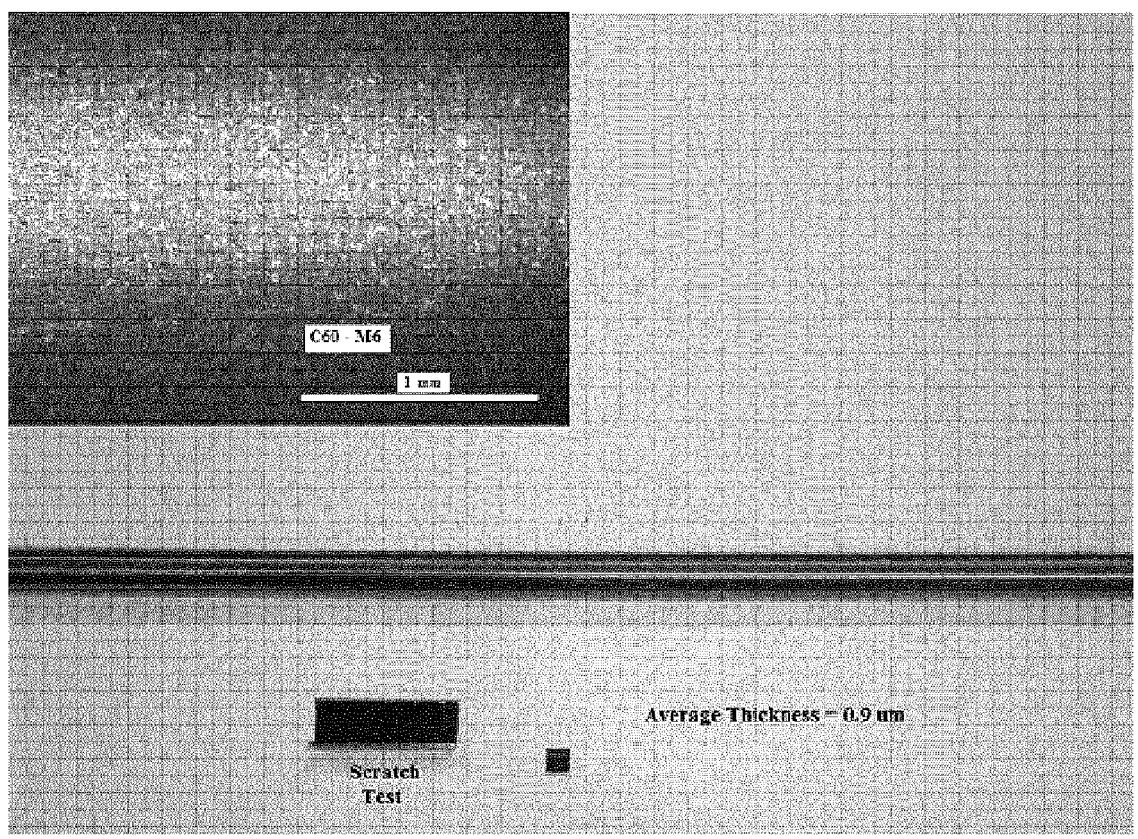
Figure 7:
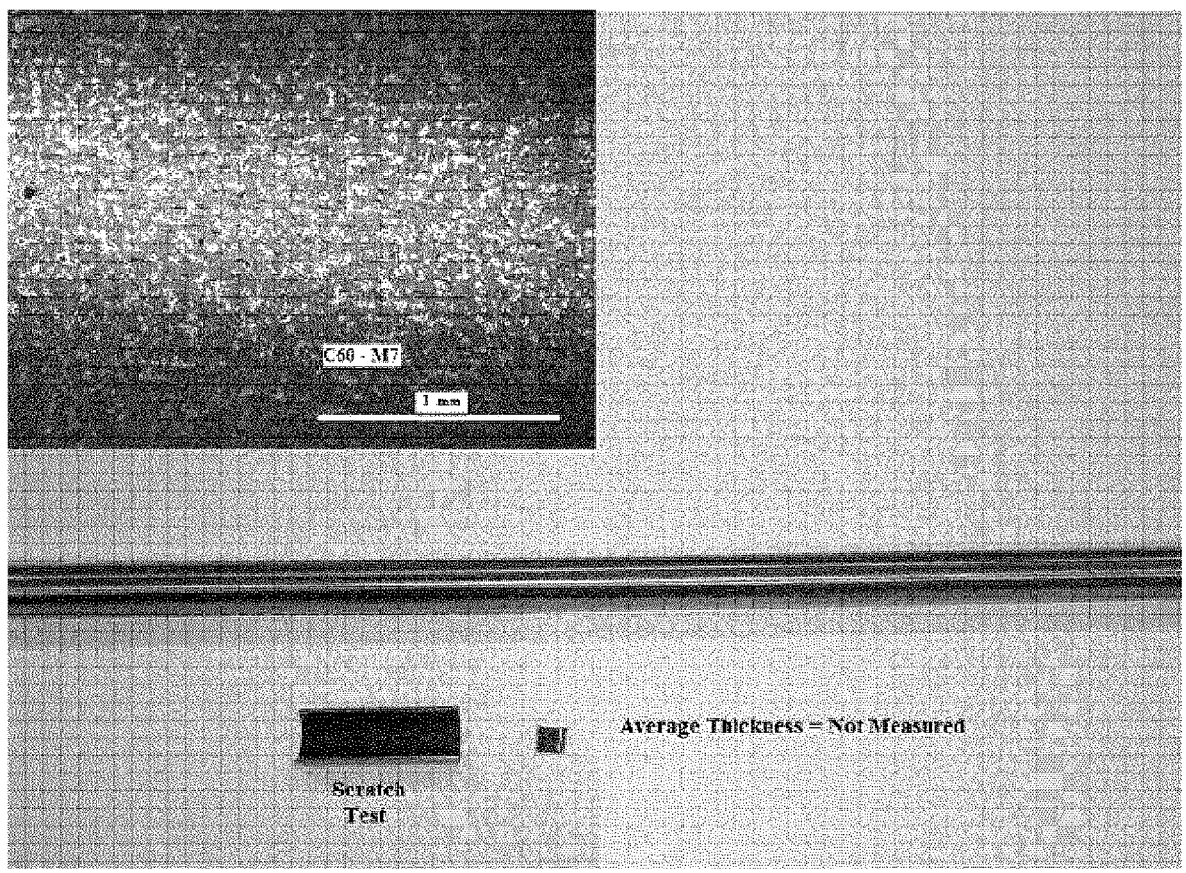
Figure 8:
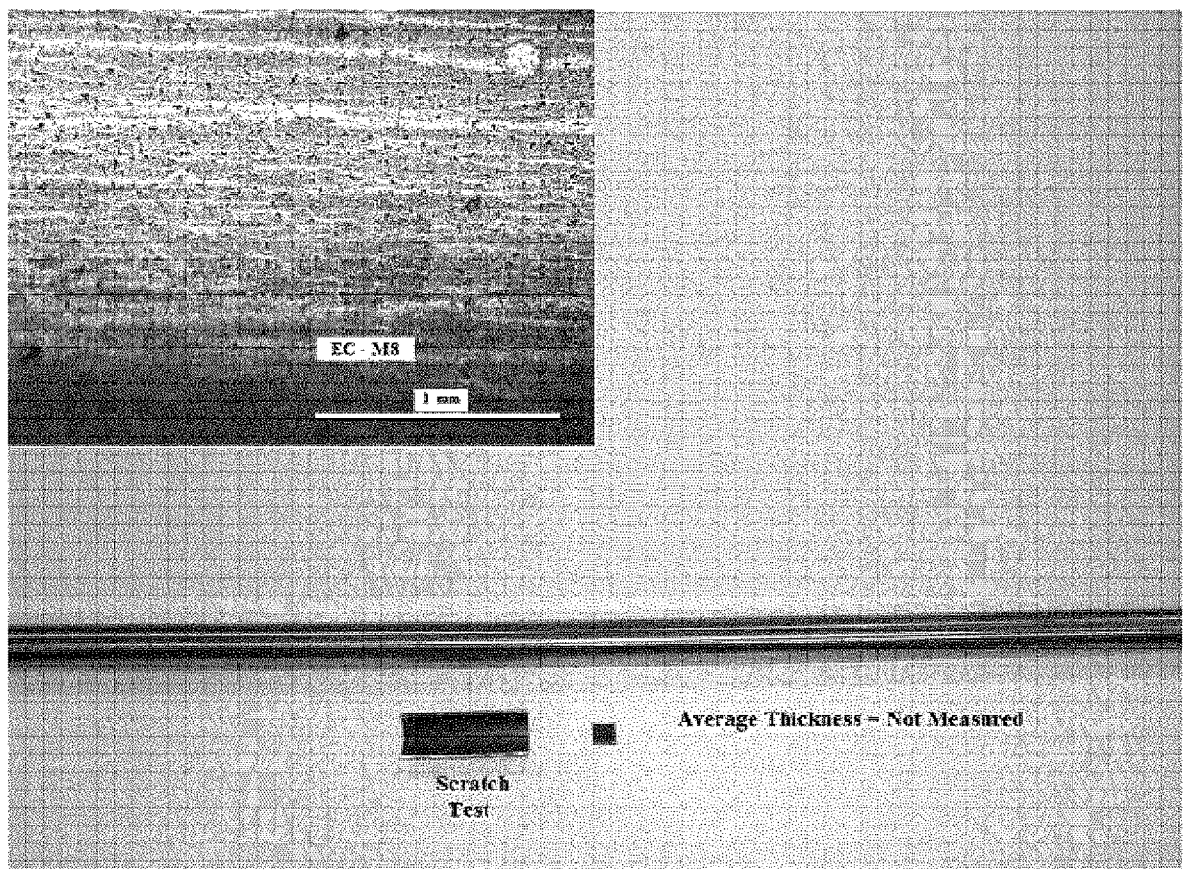
Figure 9:
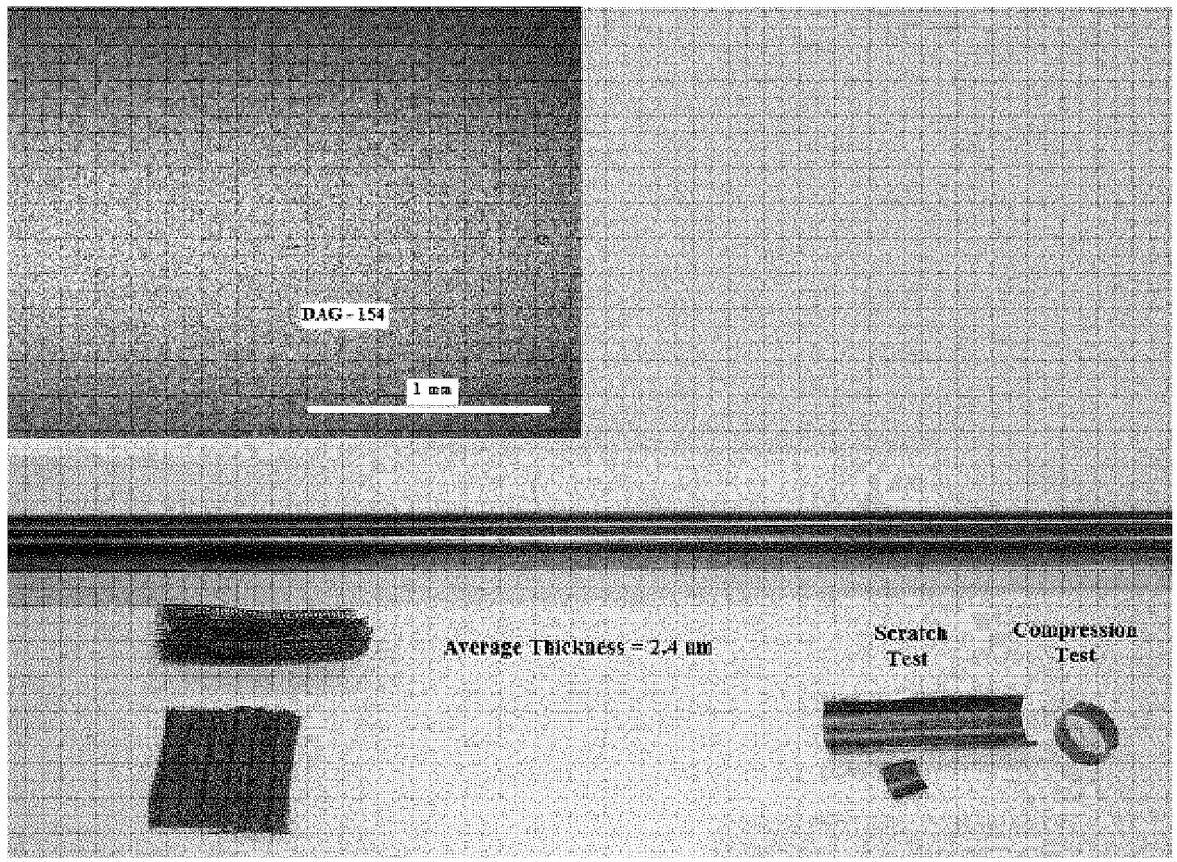

Optical micrographs showed that the DAG-154 coating (FIG. 9) presents the most homogenous coating followed by graphite (synthetic) (FIG. 3), SWNT (FIG. 5) and CB M-280 coatings (FIG. 2 and FIG. 4). A number of imperfections (white spots) are observed on CB M-280 coatings.

Although Zircaloy coatings with $C_{60}$ and EC slurries were almost transparent to the Micro-derm equipment, optical micrographs showed that a thin coating was generated. $C_{60}$ coatings exhibited a purple color characteristic of $C_{60}$ solutions, while the EC coating exhibited a brown-like color likely produced during the pyrolysis process of the binder.

Characterization of Soot Samples

Referring still to the experiments, soot samples of the as-received carbon materials used for the slurry preparation and produced from DAG-154 slurry were analyzed using a number of analytical techniques discussed in more detail below.

X-Ray Diffraction (XRD) of Carbon Samples

Figure 10:
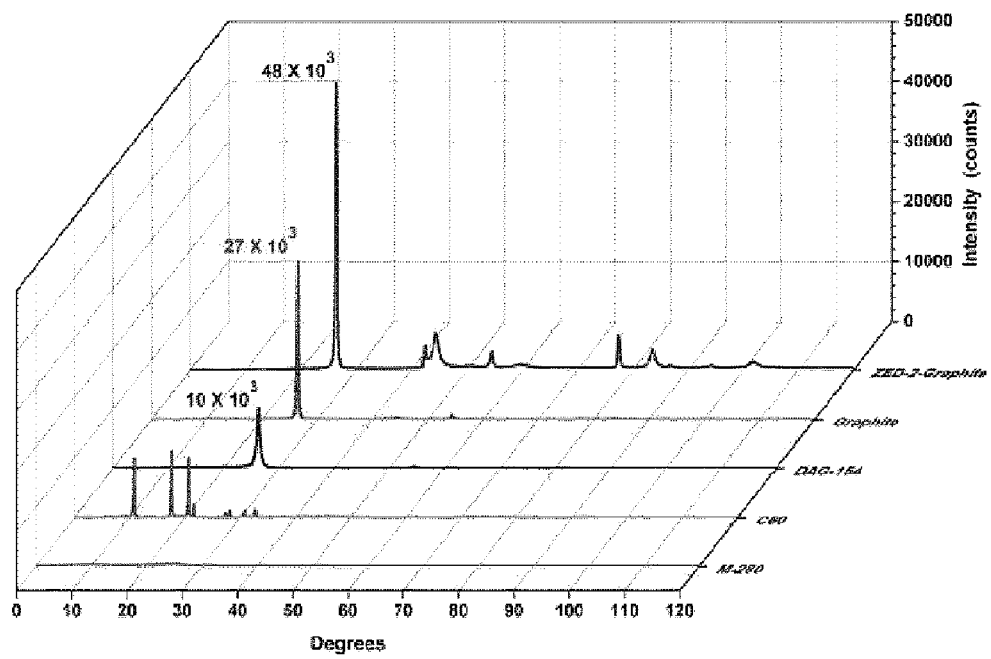
Figure 11:
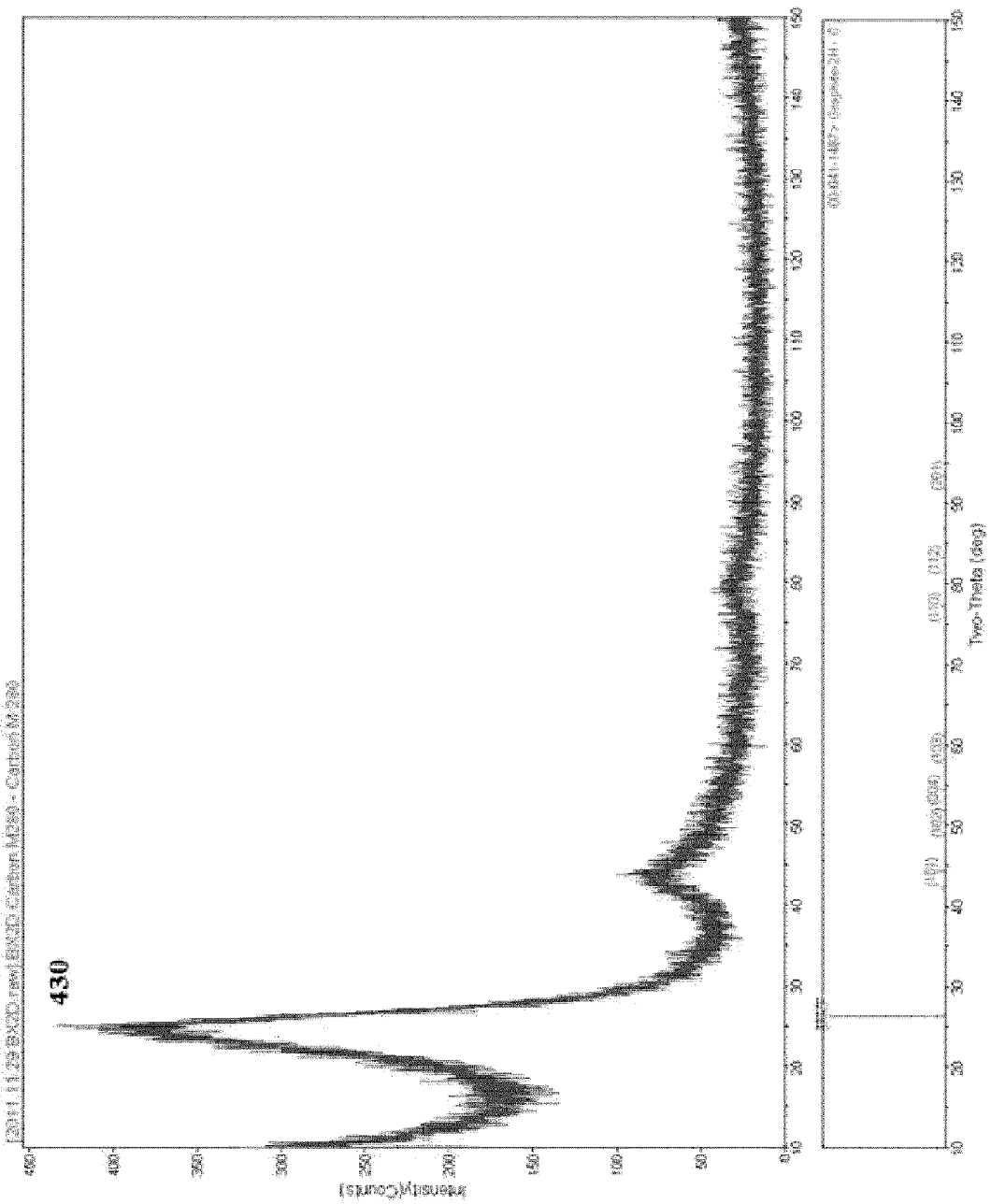
Figure 12:
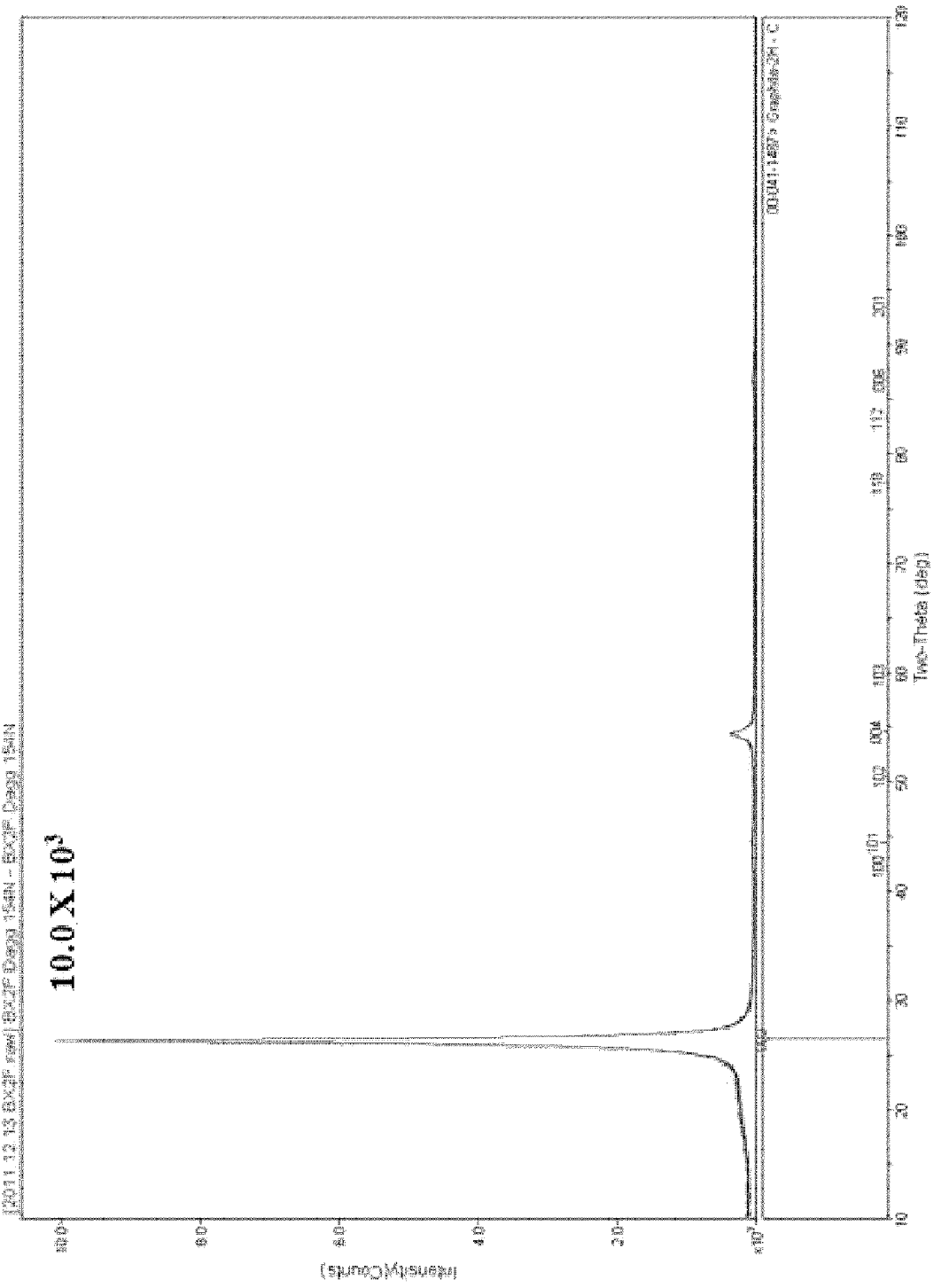
Figure 13:
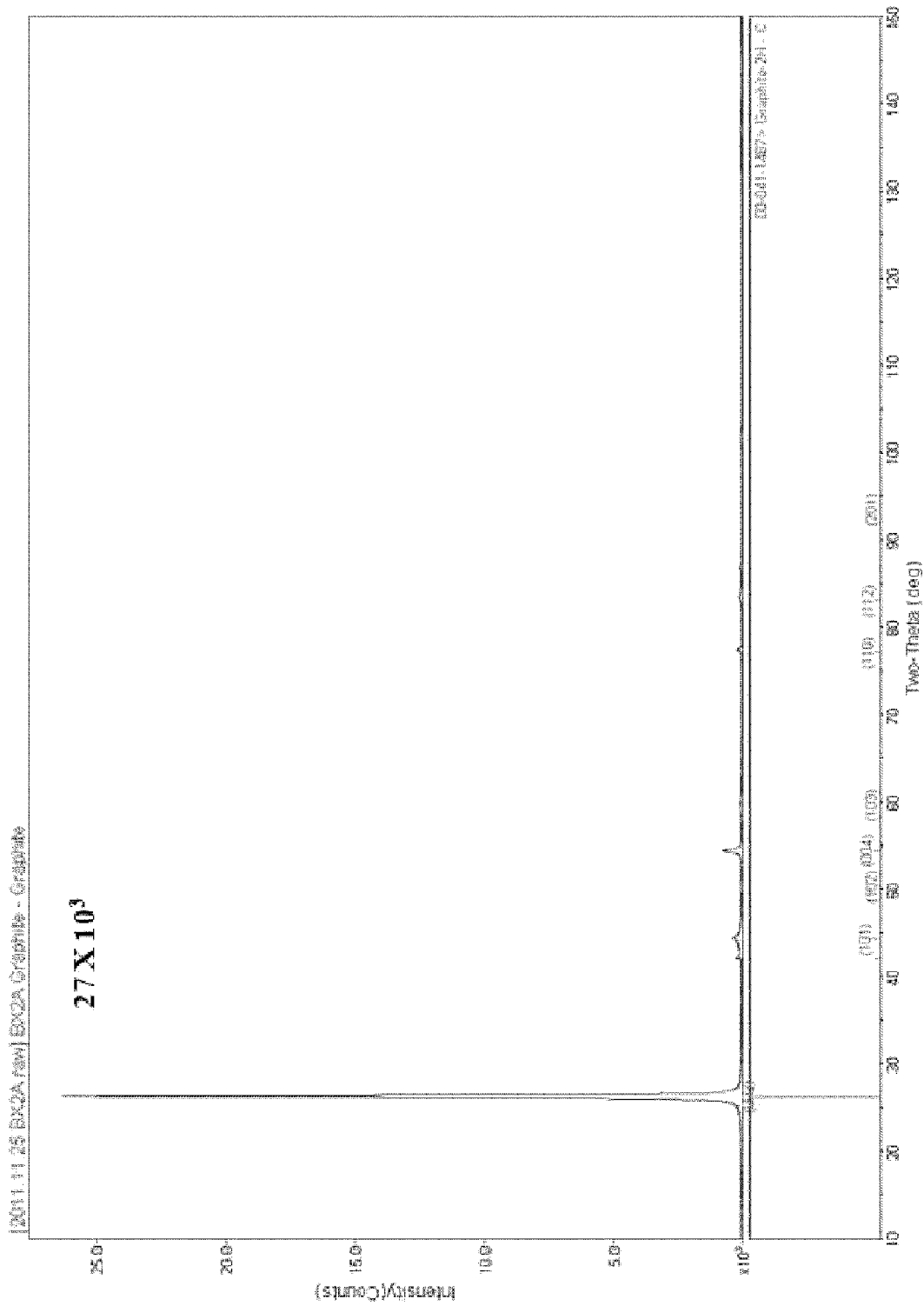
Figure 14:
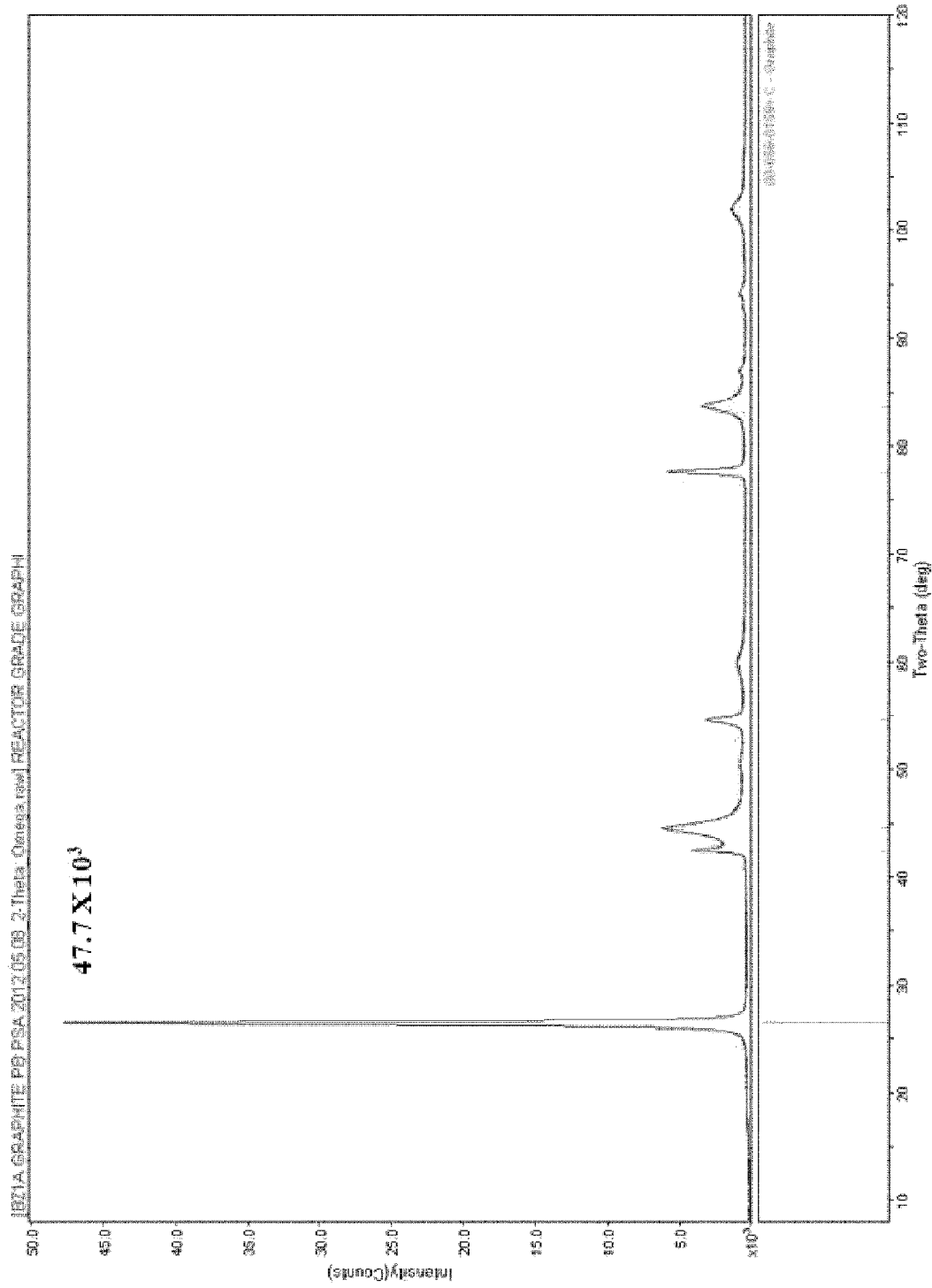

The crystal structure of the carbon powders used to prepare the slurries were investigated using powder x-ray diffraction (XRD). FIG. 10 shows XRD patterns for six carbon powders. XRD patterns of M-280, $C_{60}$ and graphite (synthetic) were obtained prior to the preparation of the slurry. DAG-154 soot was produced following the regular DAG-154 coating preparation protocol. In this case, a sample of DAG-154 slurry was placed in a Pyrex Petri dish, dried on the drying station with fans turned on and baked under vacuum (about $10^{-4}$ torr) at 350° C. for 2 hours. The required time for the furnace to achieve the baking temperature was about 3.3 hours, while the furnace cool-down with vacuum was about 12 hours. The XRD pattern of the Nuclear Grade Graphite was obtained from a sample of graphite used in an experimental nuclear reactor as shielding and reflecting material. Microstructural properties of SWNT, in terms of diameter, graphitization, chirality and defects, are not commonly analyzed by XRD as this technique is not very sensitive to the full range of structural states present in SWNT. Instead, SWNT were analyzed by micro-Raman spectroscopy (see below).

Figure 15:
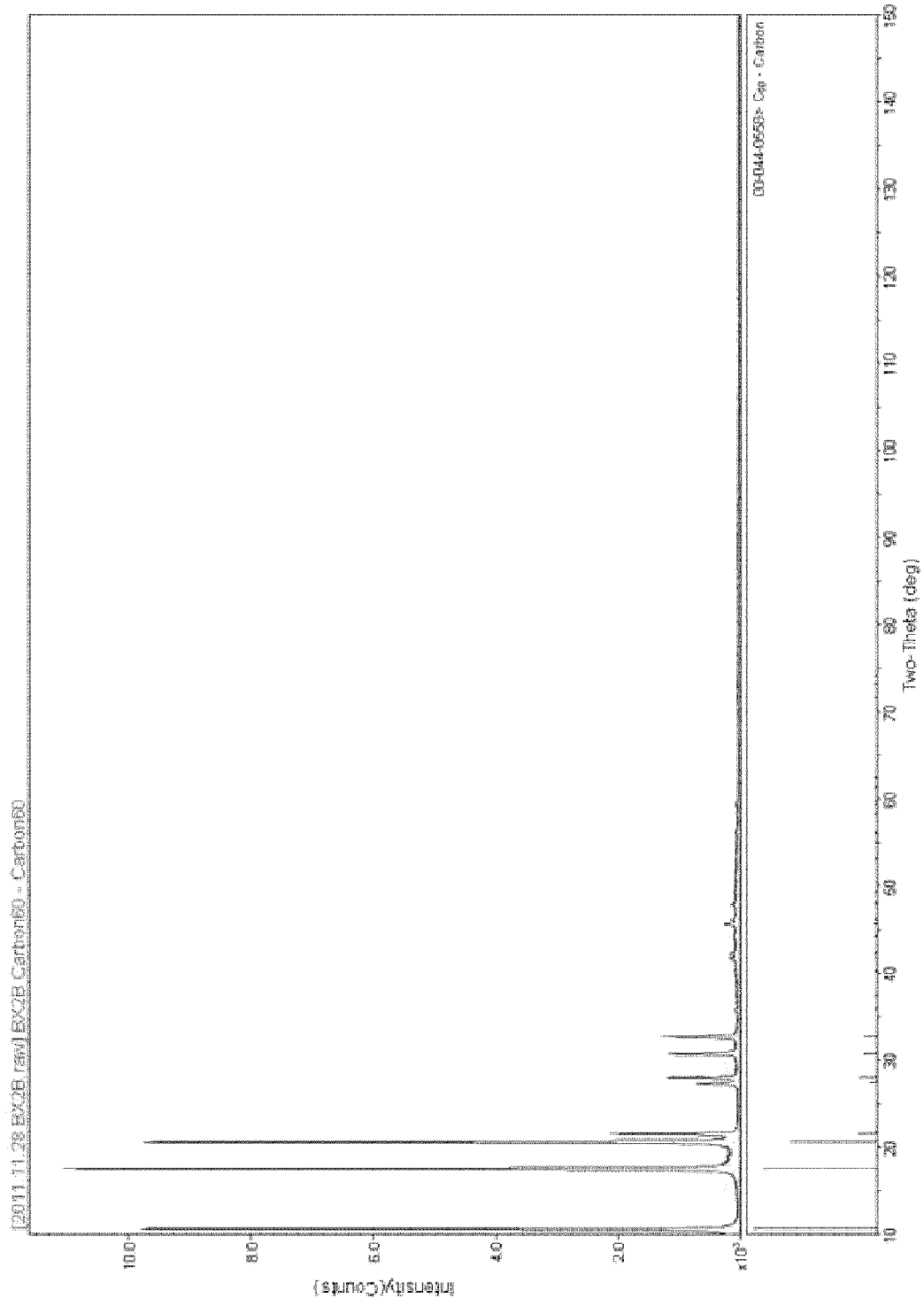

Referring to FIGS. 11 to 15, detailed XRD spectra of the different carbon powders analyzed, along with their corresponding XRD reference pattern, are shown. As expected, the $C_{60}$ spectrum shows typical crystallographic peaks of the reference $C_{60}$ fullerene (FIG. 15). Except for the M-280 spectrum, the two major crystallographic peaks of graphite (at 26.5° and) 54.5° can readily be identified in the XRD pattern of the rest of the carbon powders. The crystallographic peaks at 26.5° and 54.5° correspond to the (002) and the (004) planes, respectively. Carbon black M-280 displays the lowest degree of graphitization among all the powders, while Nuclear Grade Graphite, shows the highest. The interplanar distances ($d_{002}$) can be calculated for each carbon powder from the reflection peaks from the (002) planes. A first-order approximation of the crystallite sizes of the individual carbon powder was calculated using the Debye-Scherrer formula.

$$D = \frac{k\lambda}{\beta \cos\theta}$$

Where D is the crystallite size, k is Scherrer constant (0.89), $\lambda$ is the X-ray wavelength (0.15405 nm), $\beta$ is the peak width of half-maximum, and $\theta$ is the Bragg diffraction angle.

Referring to Table 10, below, the interplanar distances ($d_{002}$) and the crystallite size for each carbon powder are shown.

TABLE 10

| Carbon Powder | 2θ (°) | ($d_{002}$) (Å) | D (nm) |
|---|---|---|---|
| M-280 | 25.8 | 3.45 | 4.4 |
| DAG-154 | 26.4 | 3.38 | 14.7 |
| Graphite (synthetic) | 26.4 | 3.36 | 30.4 |
| Nuclear Grade Graphite | 26.5 | 3.35 | 19.4 |

Nuclear Grade Graphite exhibits the smallest interplanar distance followed by graphite (synthetic), DAG-154 and M-280. Only Nuclear Grade Graphite, presents an interplanar distance corresponding to the theoretical interplanar distance of graphite (3.35 Å), while the values of graphite (synthetic), DAG-154 and M-280 are greater than that value. Carbon black M-280 turned out to have the smallest crystallite size followed by DAG-154, Nuclear Grade Graphite and graphite (synthetic) powders.

Referring still to the experiments, these results suggest that M-280 may be mainly composed of amorphous carbon, while DAG-154 may be composed of a mixture of amorphous and graphitized particles typical of graphitized carbon blacks produced at very high temperature. Graphite (synthetic) and Nuclear Grade Graphite, may be made of highly graphitized carbons produced in typical process to make synthetic graphite where a second heat treatment called "graphitizing" can be applied at temperatures up to 3000° C. (5430° F.). During the graphitizing process, recrystallization may occur, yielding in larger graphitic domains with a higher degree of orientation.

Amorphous carbon contains a high concentration of dangling bonds, which may cause deviations in the C—C distances. Graphite consists of the well-known hexagonal and rhombohedral arrays of carbon atoms grouped in planar graphene layers composed of strongly bonded carbon atoms at the network vertices. Therefore, the efficacy of the DAG-154 carbon coating to mitigate SCC in Zircaloy sheaths may be due to the medium graphitization degree of the carbon particles. Medium graphitization level is likely due to a combination of a number of dangling bonds with strongly bonded carbon atoms. While strongly bonded carbon atoms may be responsible of physisorption of fission products, carbon dangling bonds may enhance chemisorption of fission products.

Raman Spectroscopy of SWNT

Micro-Raman Spectroscopy has been widely used to study Single Walled Carbon Nanotubes (SWNT) as this is one of the few techniques more sensitive to the full range of structural states present in this class of materials.

Referring again to the experiments, a micro-Raman analysis of a SWNT sample was performed. The SWNT sample was produced by inductively coupled radio frequency (RF) thermal plasma.

Figure 16:
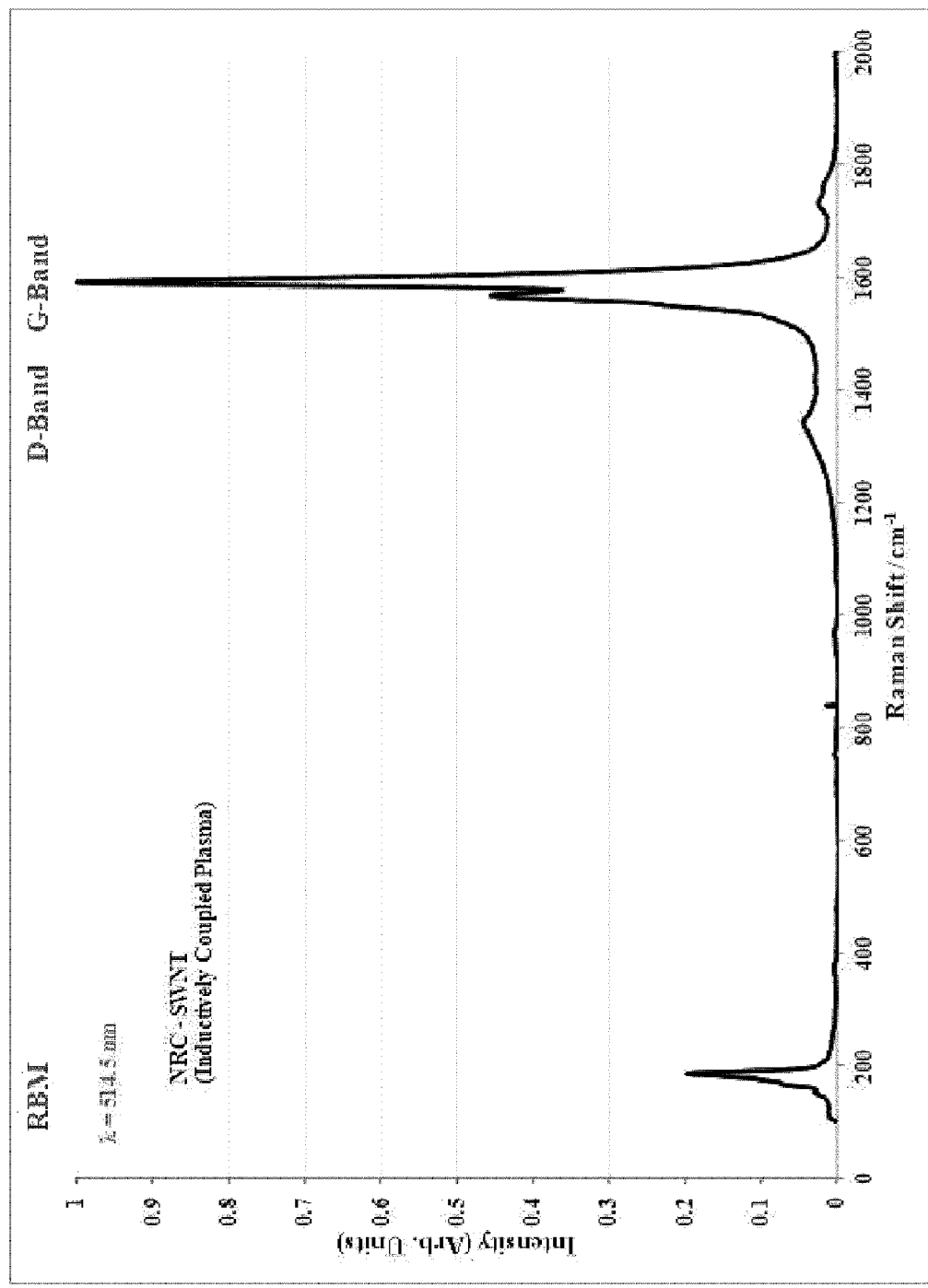

Referring to FIG. 16, a typical normalized Raman spectrum of high quality SWNT is depicted. The three characteristic Raman features of SWNT can be easily identified. The low-energy peak in the range of 160-200 $cm^{-1}$ can be attributed to the "radial breathing mode" (RBM) of the SWNT, and may strongly depend on the diameter of nanotubes. The higher-energy peak at 1580 $cm^{-1}$ is the "tangential mode" (G-band) and may be due to in-plane C—C stretching in the $sp^2$ framework of the SWNT, while the small peak near 1350 $cm^{-1}$ can be a disorder-induced feature (D-band) and may represent a measure of impurity carbon species and nanotube defect sites in the sample.

The results may show that the soot contains about 40 wt % of highly graphitized SWNT with estimated diameters between 1.5 and 1.6 nm.

UV-VIS Spectrometry of Toluene Extractions of Carbon Samples

Referring still to the experiments, samples of pure raw carbon materials and soot produced from the various carbon slurries were analyzed by UV-Vis spectroscopy. UV spectroscopy represents a powerful analytical tool for characterizing fullerene molecules. This technique is based on the fact that fullerenes exhibit size- and structure-dependent UV absorption spectra due to the electronic transitions within the clusters.

Figure 17:
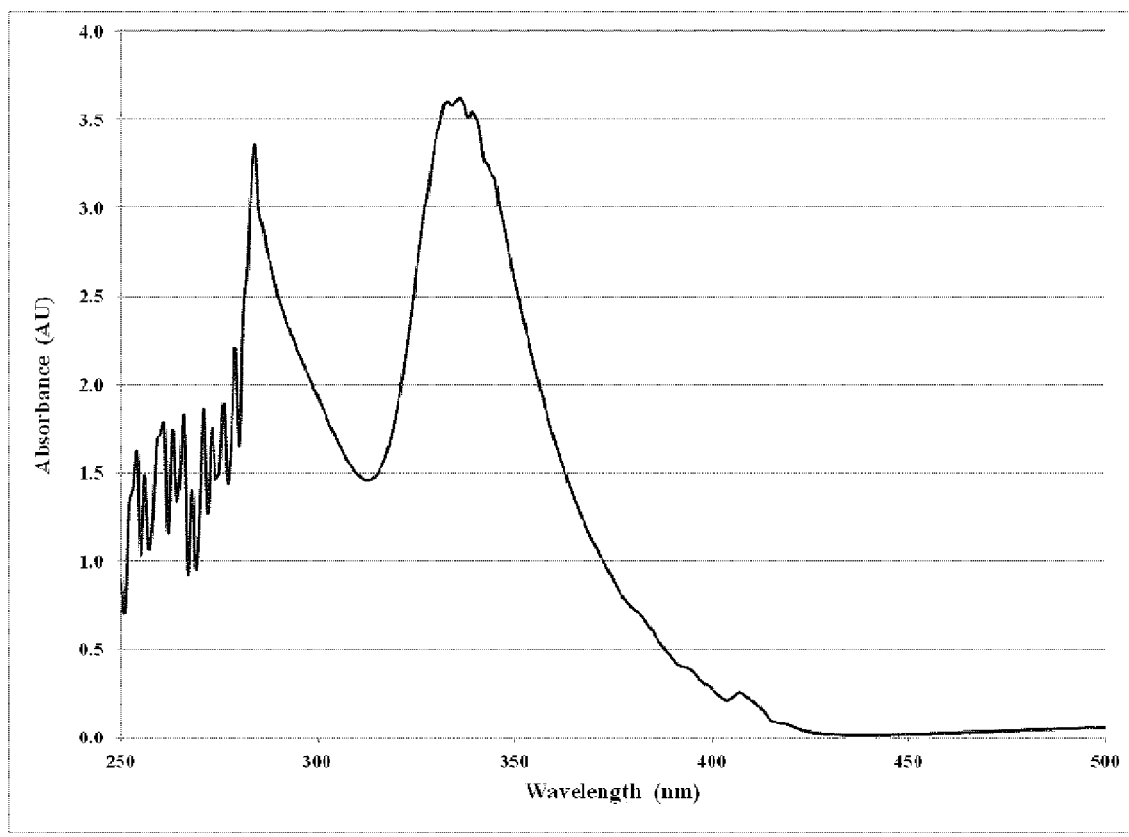

Qualitatively, pure $C_{60}$ solutions exhibit a deep purple color and a characteristic absorption peak at 329 nm. An Agilent UV-Vis absorption spectrometer equipped with ChemStation analysis software, operating in a 150-900 nm wavelength range, was used to qualitatively analyze the $C_{60}$ fullerene content of the carbon layer produced by the different slurries after baking. The instrument was calibrated using a $C_{60}$ fullerene standard 95.5% purity from Sigma-Aldrich. A calibration curve was prepared by dissolving specific quantities of $C_{60}$ fullerene standard into 200 g of toluene and analyzing them at 329-nm wavelength. FIG. 17 depicts a representative spectrum for $C_{60}$ standard solution.

The sample preparation procedure involved the following steps. In the first step, soot samples from the various carbon slurries were produced in Petri dishes, using the carbon coating protocol. Then, 0.025 g of soot was dispersed in 15 g of toluene in a sonication bath for 15 min.

The solution was filtered using a #40 filter paper. The resulting filtrate containing the dissolved fullerene molecules was analyzed by UV-Vis spectrometry.

Figure 18:
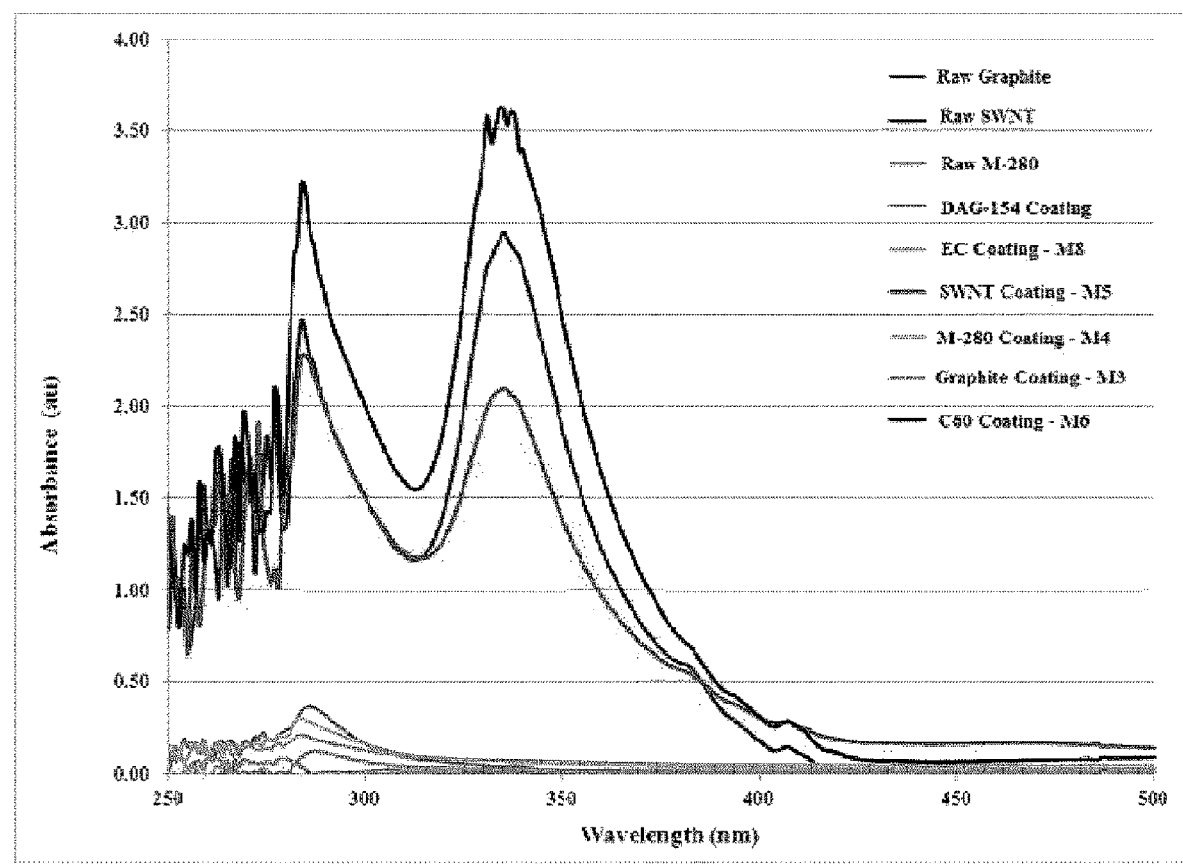
Figure 19:
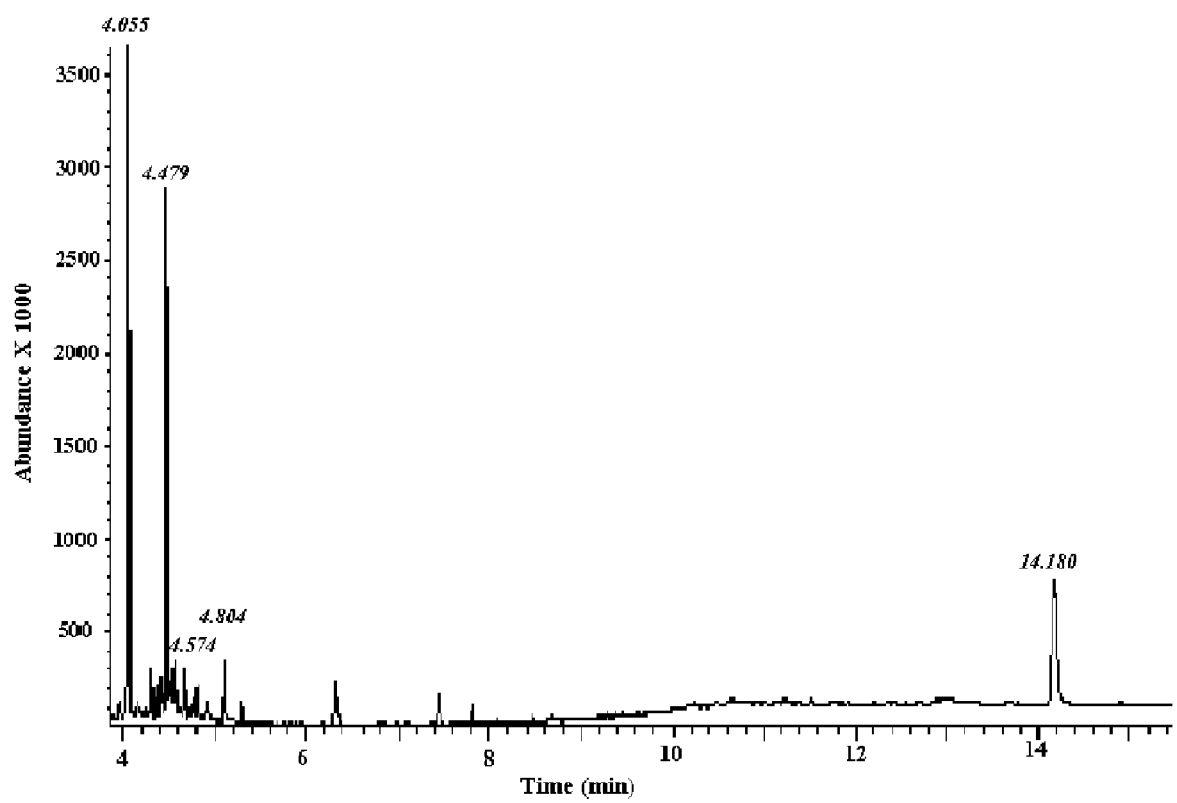
Figure 20:
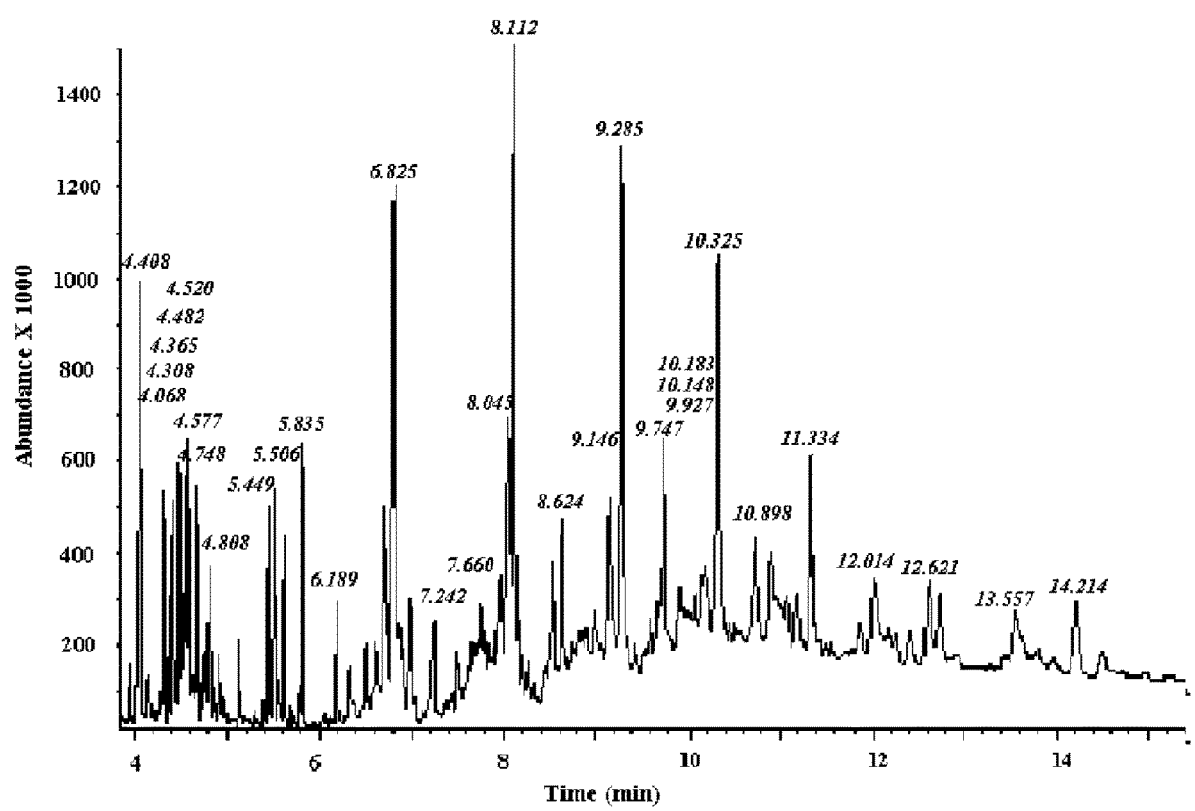
Figure 21:
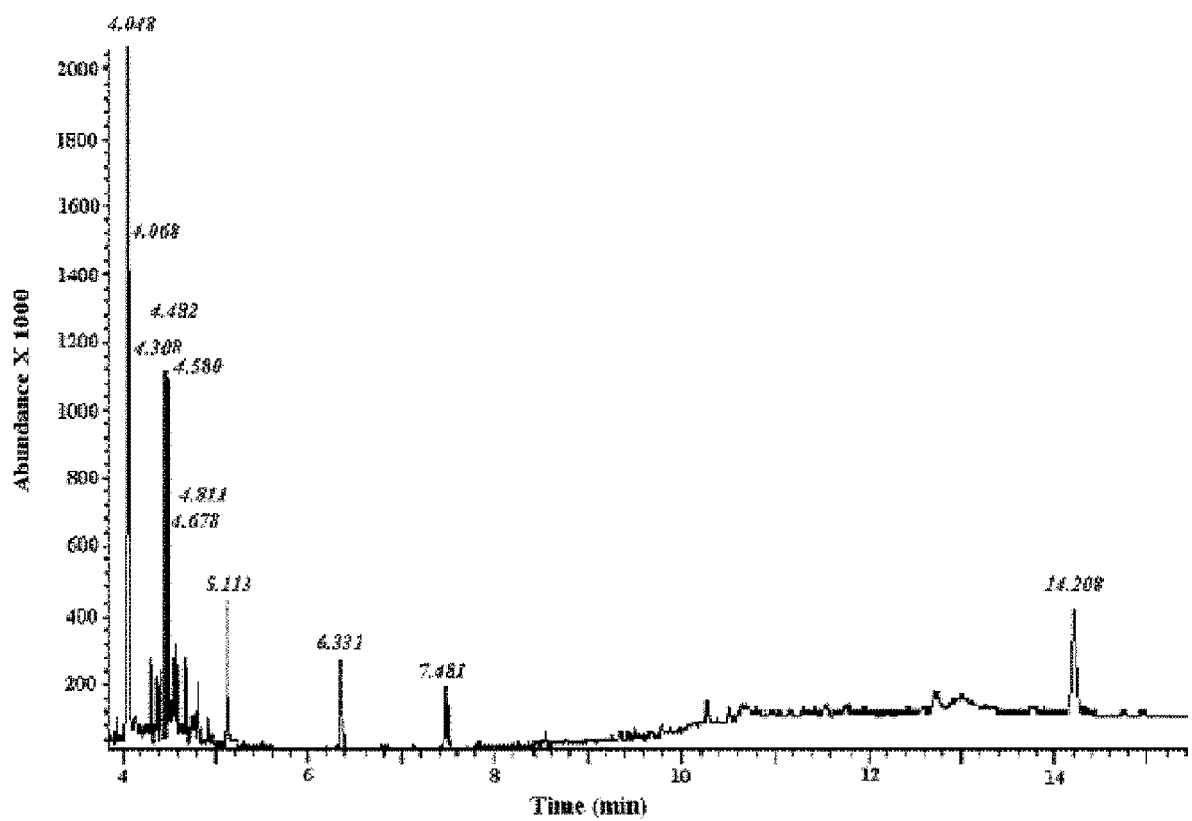
Figure 22:
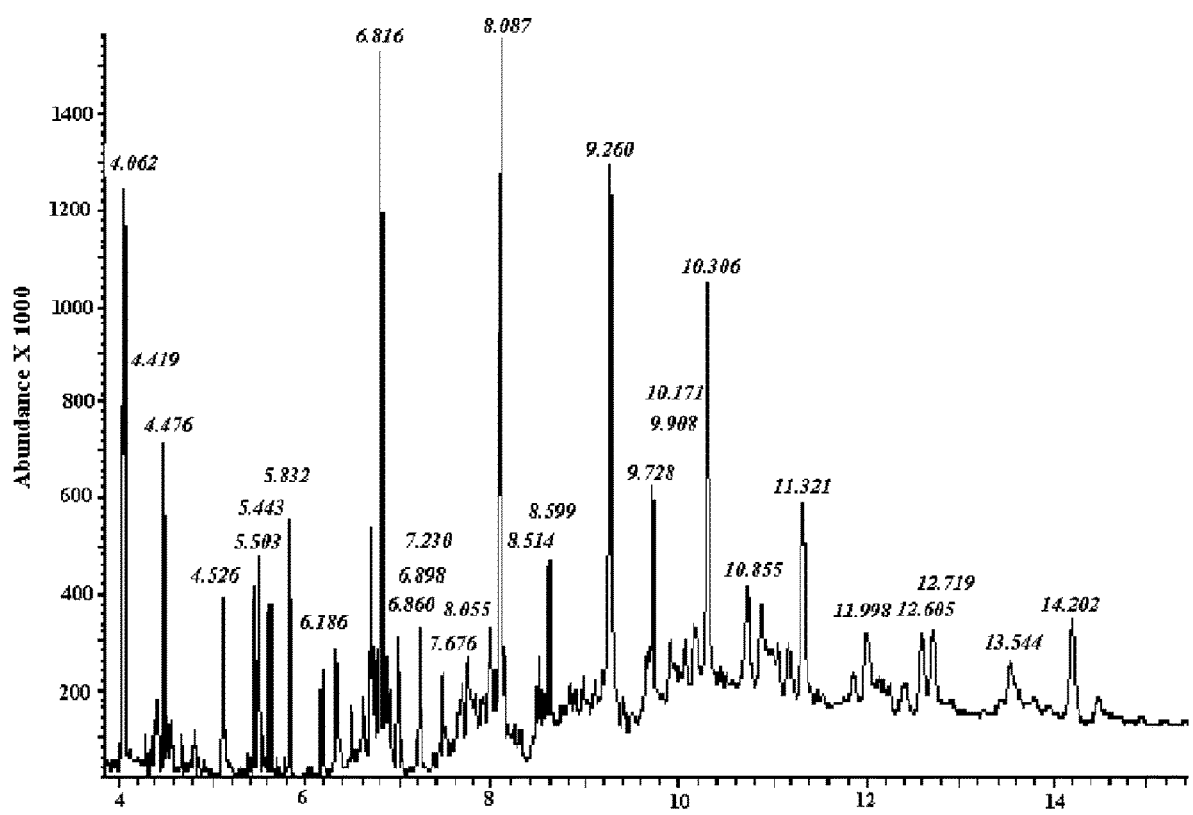
Figure 23:
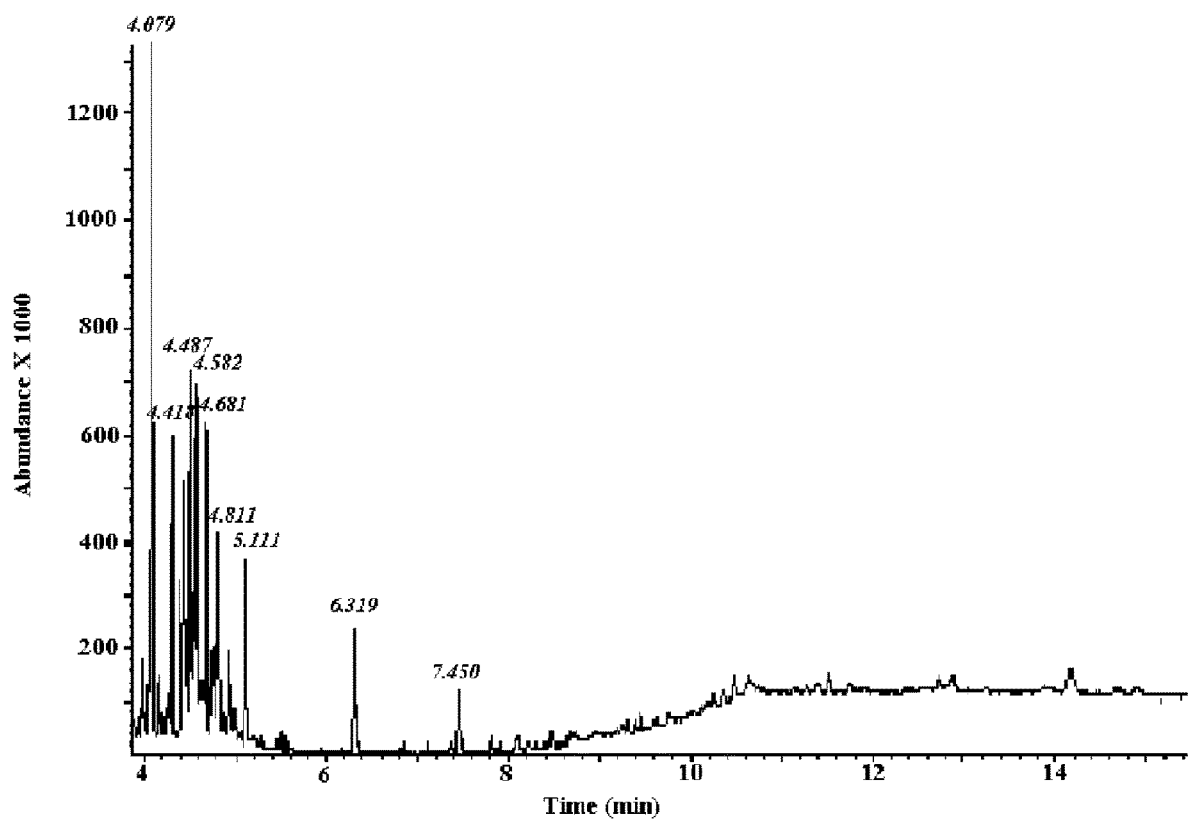
Figure 24:
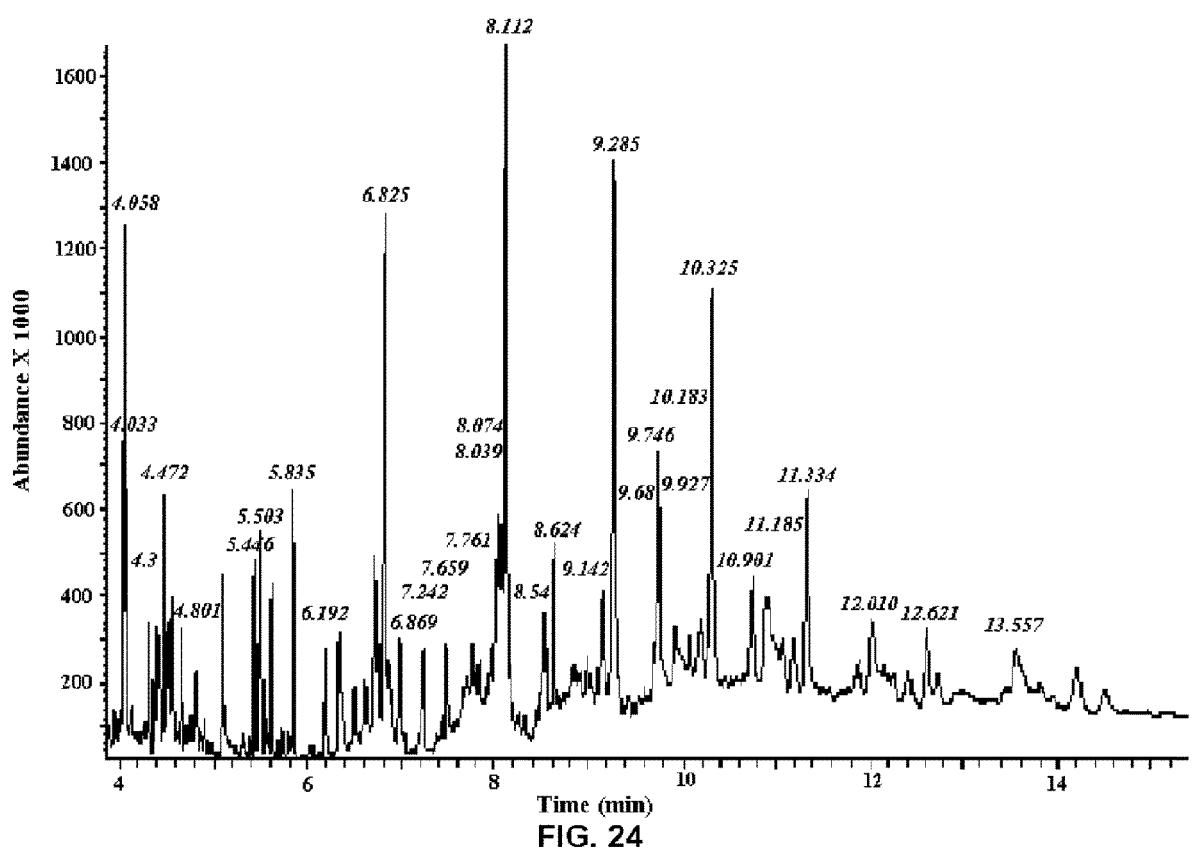
Figure 25:
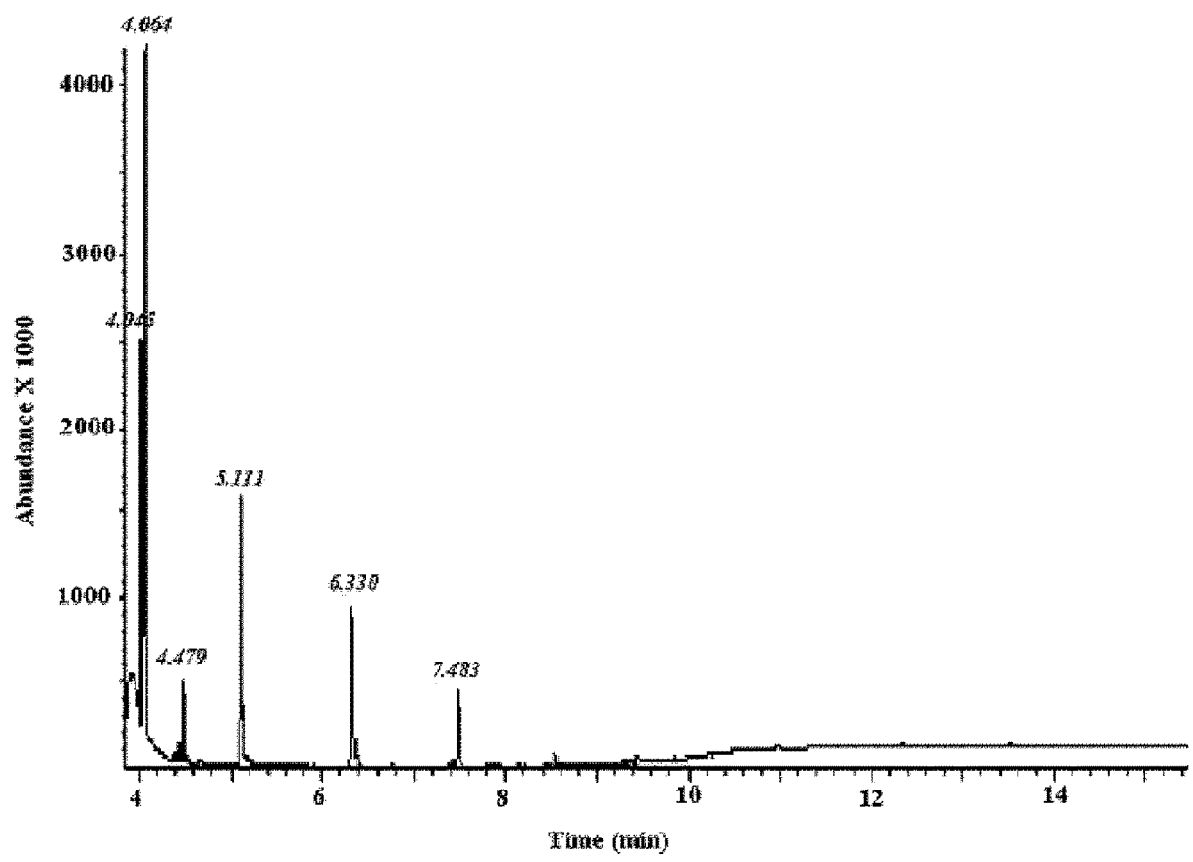
Figure 26:
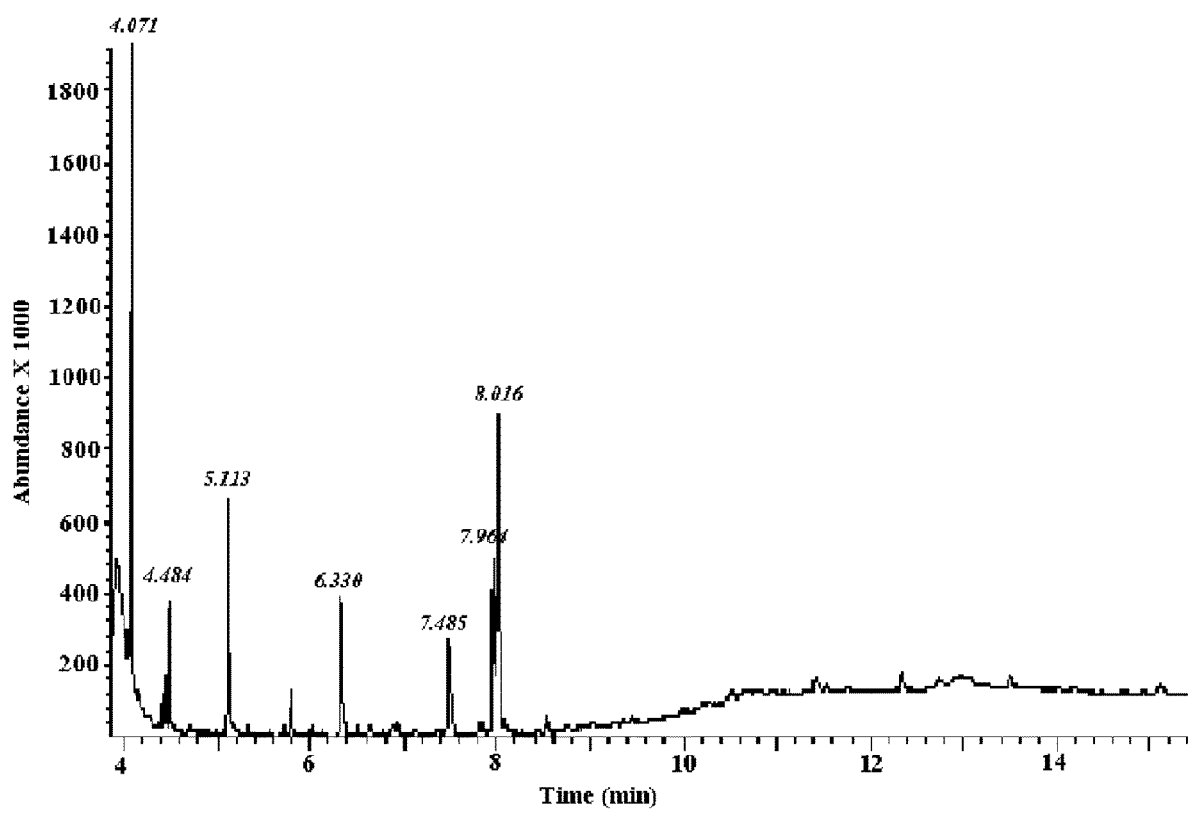
Figure 27:
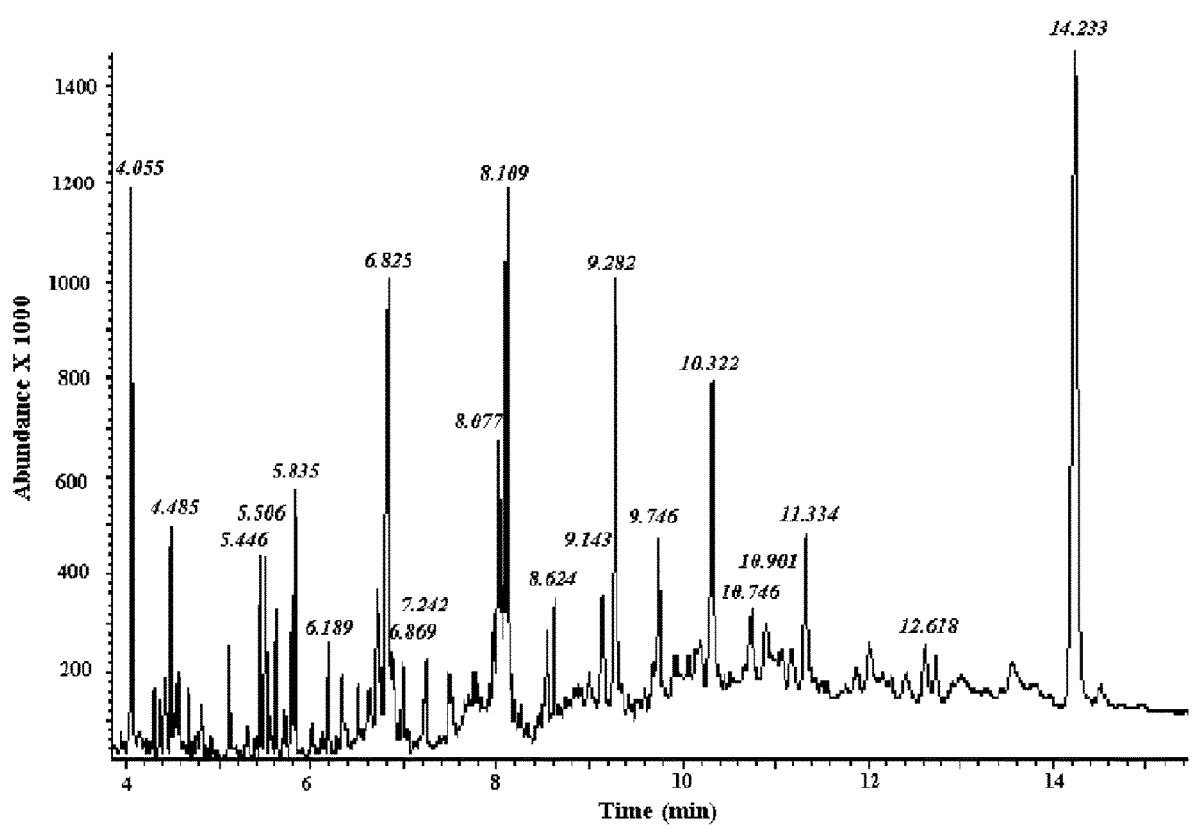

Referring to FIG. 18, UV-Vis spectra of toluene extractions of various carbon powders are shown. The results showed that only $C_{60}$ and SWNT coatings contain $C_{60}$ fullerenes. In order to analyze the $C_{60}$ coatings, the extract was diluted with toluene by a factor of 10 due to the high concentration of $C_{60}$ in the soot sample. Table 11 shows the estimated $C_{60}$ concentrations of the $C_{60}$ and SWNT coatings, as well as pure SWNT.

TABLE 11

| Sample | $C_{60}$ Concentration (wt %) |
|---|---|
| SWNT Extract | 2.1 |
| SWNT Coating | 1.5 |
| $C_{60}$ Coating | 24.1 |

These results may confirm that although Zircaloy coatings with $C_{60}$ slurries appeared almost transparent to the Microderm equipment, the thin coating produced during the baking process, comprised dissolved $C_{60}$ molecules.

The results may also show that the raw SWNT soot, and consequently the coating prepared with it, also may contain a small amount of $C_{60}$ fullerenes.

Gas Chromatography-Mass Spectrometry (GC-MS) of Toluene Extractions of Carbon Samples The effect of hydrogen in zirconium ductility has been identified as one of the potential causes of fuel failures at high burnups. The proposed APHWR fuel specifications call for a more stringent total hydrogen gas content. However, APHWR fuel also requires a thicker carbon coating, which might increase the total hydrogen gas in the fuel element. Therefore, because organic contaminants are considered the main sources of hydrogen content in PHWR fuel, Gas Chromatography-Mass Spectroscopy (GC-MS) analyses were performed to qualitatively identify the type of organic contaminants present in the different carbon coatings after the baking step.

Referring still to the experiments, toluene extractions of the different raw carbon powders and soot recovered from the different coatings were also analyzed by GC-MS. An Agilent 7890A GC-MS equipped with an Agilent 19091 S-433:HP-SMS, 5% phenyl methyl silox capillary chromatographic column was used for the analyses. The temperature program was 70° C. for 1 minute, followed by a temperature ramp of 20° C./min to 250° C. for 5 minutes.

Referring to FIGS. 19 to 28, detailed GC-MS spectra of toluene extractions of raw carbon powders and their corresponding soot recovered from the coatings are depicted. FIG. 19, FIG. 21, FIG. 23 and FIG. 25 correspond to the GC-MS analyses performed on the toluene extractions from pure raw carbon materials while FIG. 20, FIG. 22, FIG. 24, FIG. 26, FIG. 27 and FIG. 28 correspond to the GC-MS analyses of the toluene extractions performed on soot recovered from the coatings.

Upon comparison, it can be seen that the soot recovered from the different coatings contains a much larger number of adsorbed organic compounds than the corresponding raw carbon powder used for the preparation of the slurry.

Figure 28:
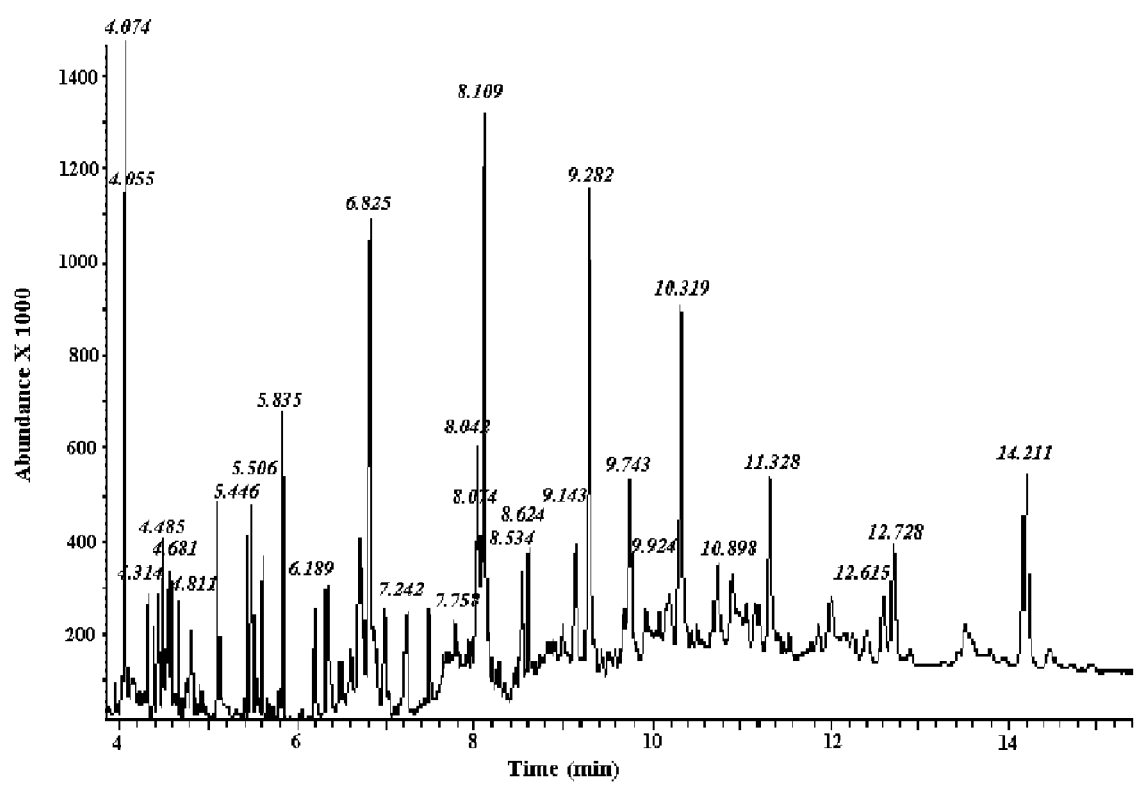

Referring to FIG. 28, the binder (ethyl cellulose) may be responsible for the large number of adsorbed organic compounds. These contaminants are most likely produced during the decomposition of the binder during the baking process of carbon coatings.

Referring to Table 12, below, typical organic compounds found in toluene extractions of the soot recovered from the different coatings are shown. Table 12 includes the peak number (PK), the chromatographic retention time (RT) in minutes, the area percent, and the identification name of the compound, its reference number and the corresponding Chemical Abstracts Service (CAS) registry number according to the NIST mass spectrometry database. The quality index represents the percent how the mass spectrum of the identified chemical compounds matches the corresponding mass spectrum in the NIST mass spectrometry database.

TABLE 12

| PK | RT (min) | Area (%) | Library/ID | Ref | CAS | Qual |
|---|---|---|---|---|---|---|
| 1 | 4.055 | 3.495 | Benzaldehyde | 4936 | 000100-52-7 | 97 |
| 2 | 4.074 | 5.239 | Cyclotetrasiloxane,octamethyl- | 122480 | 000556-67-2 | 91 |
| 3 | 4.314 | 0.987 | Decane,2,2-dimethyl- | 36459 | 017302-37-3 | 72 |
| 4 | 4.374 | 0.715 | 1-Hexene,5,5-dimethyl- | 6532 | 007116-86-1 | 52 |
| 5 | 4.422 | 1.530 | Undecane,3,8-dimethyl- | 46122 | 017301-30-3 | 47 |
| 6 | 4.485 | 1.544 | Benzyl Alcohol | 5224 | 000100-51-6 | 97 |
| 7 | 4.523 | 0.536 | Dodecane,2,6,10-trimethyl- | 66082 | 003891-98-3 | 64 |
| 8 | 4.545 | 1.126 | Decane,2,2,6-trimethyl- | 46154 | 062237-97-2 | 50 |
| 9 | 4.580 | 1.316 | Hexane,2,2,5-trimethyl- | 12327 | 003522-94-9 | 59 |
| 10 | 4.681 | 1.104 | Undecane,2,8-dimethyl- | 46108 | 017301-25-6 | 72 |
| 11 | 4.811 | 1.019 | Tridecane | 46087 | 000629-50-5 | 80 |
| 12 | 5.114 | 1.797 | Benzaldehyde,2,4-bis(trimethylsiloxy)- | 112902 | 033617-38-8 | 64 |
| 13 | 5.446 | 1.664 | 1-Dodecene | 34946 | 000112-41-4 | 98 |
| 14 | 5.506 | 2.120 | Cyclohexane,1,5-diethyl-2,3-dimethyl- | 35082 | 074663-66-4 | 80 |
| 15 | 5.620 | 1.405 | cis,cis,cis-1-Isobutyl-2,5-dimethylcyclohexane | 35089 | 1000113-60-0 | 47 |

TABLE 12-continued

| PK | RT (min) | Area (%) | Library/ID | Ref | CAS | Qual |
|---|---|---|---|---|---|---|
| 16 | 5.835 | 2.294 | Cyclohexane,hexyl- | 34974 | 004292-75-5 | 94 |
| 17 | 6.189 | 1.023 | 2-Undecanone | 36355 | 000112-12-9 | 91 |
| 18 | 6.335 | 2.130 | Benzenepropanoic acid,.alpha.-[(trimethylsilyl)oxy]-, trimethylsilyl ester | 130723 | 027750-45-4 | 38 |
| 19 | 6.502 | 0.824 | 1,7-Dimethyl-4-(1-methylethyl)cyclodecane | 64469 | 000645-10-3 | 58 |
| 20 | 6.619 | 1.321 | Cyclohexanone,3-ethyl-3,5,5-trimethyl- | 34896 | 167226-01-9 | 50 |
| 21 | 6.717 | 2.622 | 1-Butene,2,3,3-trimethyl- | 3317 | 000594-56-9 | 42 |
| 22 | 6.749 | 1.094 | 3-Amino-2-cyclohexenone | 5951 | 005220-49-5 | 43 |
| 23 | 6.825 | 8.088 | 2-Tetradecene,(E)- | 54521 | 035953-53-8 | 98 |
| 24 | 6.989 | 1.356 | 1,7-Dimethyl-4-(1-methylethyl )cyclodecane | 64470 | 000645-10-3 | 52 |
| 25 | 7.242 | 1.840 | Cyclohexane,octyl- | 54529 | 001795-15-9 | 97 |
| 26 | 7.486 | 1.250 | Benzoic acid, 5-methyl-2-trimethylsilyloxy-, trimethylsilyl ester | 121894 | 1000153-59-4 | 47 |
| 27 | 7.758 | 0.883 | Cyclohexanecarboxylic acid, 4-hexyl-,4-butoxy-2,3-dicyanophenyl ester | 173468 | 075941-48-9 | 74 |
| 28 | 8.042 | 2.731 | Oxalic acid, allyl hexadecyl ester | 154534 | 1000309-24-4 | 96 |
| 29 | 8.074 | 1.030 | 7-Hexadecene,(Z)- | 74527 | 035507-09-6 | 95 |
| 30 | 8.109 | 5.444 | 1-Hexadecene | 74522 | 000629-73-2 | 98 |
| 31 | 8.536 | 1.299 | Cyclohexane,decyl- | 74529 | 001795-16-0 | 70 |
| 32 | 8.624 | 1.400 | 8-Pentadecanone | 76032 | 000818-23-5 | 98 |
| 33 | 9.143 | 2.071 | Z-8-Hexadecene | 74523 | 1000130-87-5 | 99 |
| 34 | 9.282 | 6.835 | 1-Octadecene | 93544 | 000112-88-9 | 99 |
| 35 | 9.677 | 0.710 | Cyclododecanemethanol | 55891 | 001892-12-2 | 53 |
| 36 | 9.743 | 2.488 | 10-Nonadecanone | 113462 | 000504-57-4 | 78 |
| 37 | 9.924 | 0.477 | 13-Tetradecen-1-ol acetate | 94752 | 056221-91-1 | 86 |
| 38 | 10.319 | 6.728 | 5-Eicosene,(E)- | 112105 | 074685-30-6 | 99 |
| 39 | 10.743 | 2.072 | Dodecane,4-cyclohexyl- | 93555 | 013151-84-3 | 58 |
| 40 | 10.898 | 0.831 | Octadecane | 94931 | 000593-45-3 | 83 |
| 41 | 11.328 | 3.431 | 1-Hexadecene | 74521 | 000629-73-2 | 94 |
| 42 | 12.004 | 1.515 | 13-Tetradecen-1-ol acetate | 94752 | 056221-91-1 | 64 |
| 43 | 12.615 | 1.801 | 1-Nonadecene | 102860 | 018435-45-5 | 96 |
| 44 | 12.728 | 2.829 | Hexanedioic acid, bis(2-ethylhexyl) ester | 161421 | 000103-23-1 | 93 |
| 45 | 14.211 | 5.989 | 1,2-Benzenedicarboxylic acid, mono(2-ethylhexyl) ester | 110586 | 004376-20-9 | 90 |

Referring to Table 13, below, typical adsorbed organic compounds found in toluene extractions of raw carbons are shown. A much smaller number of organic contaminants were found in the carbon powders used to prepare the different carbon slurries. In particular, raw SWNT contains the lowest amount of organic contaminants among the different carbon powders. This is likely due to the inert and high temperature process used to synthesize this kind of nanomaterial.

TABLE 13

| RT (min) | Library/ID | Raw M-280 | Raw Graphite (synthetic) | Raw $C_{60}$ | Raw SWNT |
|---|---|---|---|---|---|
| 4.049 | Benzaldehyde | • | • | | • |
| 4.068 | Cyclotetrasiloxane, octamethyl- | | • | | • |
| 4.308 | Octane, 2,5,6- | | | • | • |
| 4.368 | trimethyl-Decane, 2,2- | | | | • |
| 4.415 | dimethyl-Undecane, | | | | • |
| 4.482 | Benzyl Alcohol | • | • | • | • |
| 4.523 | Nonane,3,7-dimethyl- | | | | • |
| 4.580 | Heptane,4-ethyl-2,2,6,6-tetramethyl- | • | • | | • |
| 4.678 | Undecane,2,8-dimethyl- | | • | | • |
| 4.751 | Undecane,4-methyl- | | | | • |
| 4.811 | Undecane,2,8-dimethyl- | • | • | | • |
| 14.208 | 1,2-Benzenedicarboxylic acid, mono(2-ethylhexyl) ester | • | • | | |

Referring to Table 14, below, a comparison of the adsorbed organic compounds found in toluene extractions of the soot recovered from the different carbon coatings is shown. As expected, except for the extraction obtained from the SWNT coating, the majority of the adsorbed organic compounds were found in the toluene extractions of all carbon coatings. The GC-MS analysis of the toluene extraction obtained from the SWNT coating (FIG. 26) showed that the coating with this slurry may produce much less types of organic contaminants than the coatings produced with other carbon slurries. This is likely due to the fact that, compared to the other carbon slurries, the preparation of the SWNT slurry required the use of smaller amount of ethyl cellulose binder (see above, Table 4).

Although hydrogen content was not determined, the GC-MS analysis results suggest that carbon coatings may contain a high concentration of hydrogen due to the large number of organic contaminants produced during the baking process and remained adsorbed in the soot.

The thickness of the current carbon layer used in PHWR can be several micrometers, with an average thickness in the range of 5-15 μm, whilst the total hydrogen gas content is on the order of less than 1.0 mg/element. At the extended operating conditions (high burnup, high power and large power ramps) of Advanced Pressurized Heavy Water Reactors (APHWR), a significantly thicker carbon layer with similar total hydrogen gas content may be required to help accommodate fission products. In other words, a thicker carbon coating and more stringent total hydrogen gas content have been specified for the proposed APHWR fuel.

Therefore, thicker carbon coatings of APHWR fuel might be of concern due to the their potential higher organic contaminant contents, which in turn may contribute to increase the total hydrogen gas content of the fuel element. Hydrogen pickup and redistribution as it affects zirconium ductility has been identified as one of the potential fuel failure causes related to increased burnups.

TABLE 14

| RT (min) | Library/ID | Coating EC | Coating $C_{60}$ | Coating Graphite (synthetic) | Coating M-280 | Coating DAG-154 | Coating SWNT |
|---|---|---|---|---|---|---|---|
| 4.055 | Benzaldehyde | • | • | | • | • | |
| 4.074 | Cyclotetrasiloxane, octamethyl- | | | • | • | | • |
| 4.314 | Decane,2,2-dimethyl- | • | • | | • | | |
| 4.374 | 1-Hexene,5,5-dimethyl- | | | | • | | |
| 4.422 | Undecane,3,8-dimethyl- | | | • | | | |
| 4.485 | Benzyl Alcohol | • | • | • | • | • | • |
| 4.523 | Dodecane,2,6,10-trimethyl- | | • | | • | | |
| 4.580 | Hexane,2,2,5-trimethyl- | | | | • | | |
| 4.747 | Undecane,4-methyl- | • | | | • | | |
| 4.801 | Hexadecane | | • | | | | |
| 4.811 | Tridecane | • | | | | | |
| 4.808 | Nonane,2-methyl-5-propyl- | | | | • | | |
| 5.114 | Benzaldehyde,2,4-bis(trimethylsiloxy)- | | | | | | • |
| 5.446 | 1-Dodecene | • | • | • | • | • | |
| 5.506 | Cyclohexane,1,5-diethyl-2,3-dimethyl- | • | • | • | • | • | |
| 5.835 | Cyclohexane,hexyl- | • | • | | • | • | |
| 6.189 | 2-Undecanone | • | • | • | • | • | |
| 6.825 | 2-Tetradecene,(E)- | • | • | • | • | • | |
| 6.869 | Tetradecane | | • | | • | • | |
| 6.989 | 1,7-Dimethyl-4-(1-methylethyl)cyclodecane | | | | • | | |
| 7.242 | Cyclohexane,octyl- | • | • | • | • | • | |
| 7.660 | Cyclohexane,1,2,4,5-tetraethyl- | • | • | | • | • | |
| 7.758 | Cyclohexanecarboxylic acid, 4-hexyl-, 4-butoxy-2,3-dicyanophenyl ester | • | • | | | | |
| 8.042 | Oxalic acid, allyl hexadecyl ester | • | | | | | |
| 8.074 | 7-Hexadecene,(Z)- | • | • | • | • | • | |
| 8.109 | 1-Hexadecene | • | • | • | • | • | |
| 8.501 | Benzocyclodecene, tetradecahydro- | | • | • | | | |
| 8.536 | Cyclohexane,decyl- | • | • | • | | | |
| 8.624 | 8-Pentadecanone | • | • | | • | • | |
| 9.143 | Z-8-Hexadecene | • | • | | • | • | |
| 9.282 | 1-Octadecene | • | • | | • | • | |
| 9.677 | Cyclododecanemethanol | | • | • | | | |
| 9.743 | 10-Nonadecanone | • | • | | • | • | |
| 9.924 | 13-Tetradecen-1-ol acetate | • | • | | • | • | |
| 10.183 | Cyclohexadecane,1,2-diethyl- | | • | • | | | |
| 10.319 | 5-Eicosene,(E)- | • | • | • | • | • | |
| 10.743 | Dodecane,4-cyclohexyl- | | | | | • | |
| 10.898 | Octadecane | • | • | • | • | | |
| 11.185 | Hexadecane,1-(ethenyloxy)- | | • | • | | | |
| 11.328 | Dichloroacetic acid, heptadecyl ester | • | • | • | • | • | |
| 12.004 | 1-Hexadecanol,2-methyl- | | • | • | • | | |
| 12.605 | 13-Tetradecen-1-ol acetate | • | • | | • | • | |
| 12.615 | 1-Nonadecene | • | • | | | | |
| 12.728 | Hexanedioic acid, bis(2-ethylhexyl) ester | • | | | • | | |
| 13.557 | Eicosane | | • | | • | • | |
| 14.211 | 1,2-Benzenedicarboxylic acid, mono(2-ethylhexyl) ester | • | | • | • | • | |

Scanning Electron Microscopy of Carbon Coating Samples

Typical external diameters of carbon nanoparticles fall in the range of 1 to 100 nm, while SWNT nanotube lengths can achieve several micrometers. At these scales, Scanning Electron Microscopy (SEM) is well suited for analysis of the carbon nanostructures.

Referring again to the experiments, a LEO 1530 Field Emission SEM was used to characterize the morphology of the coatings produced in the different carbon-based slurries. The operating parameters used during the analysis were an acceleration tension of 2 kV and a work distance of 8.0 mm.

Figure 29:
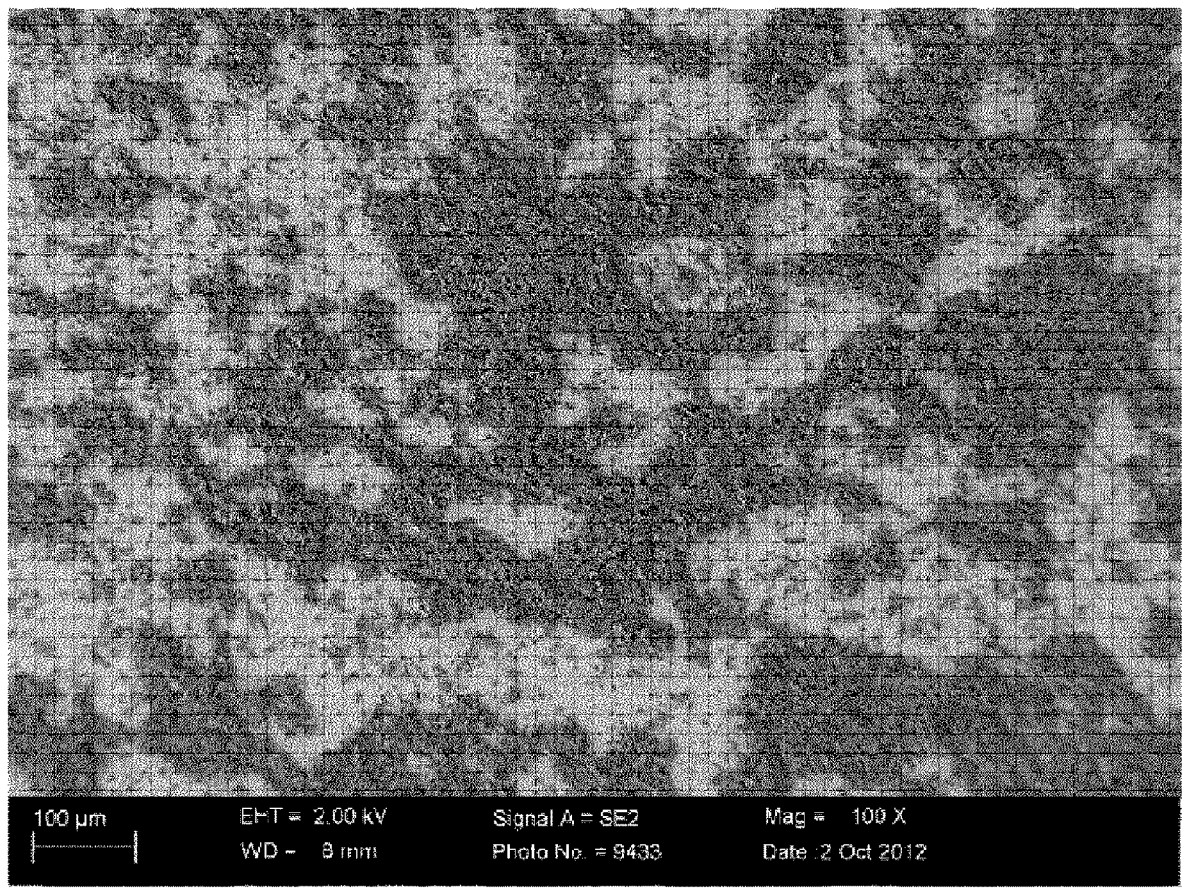
Figure 30:
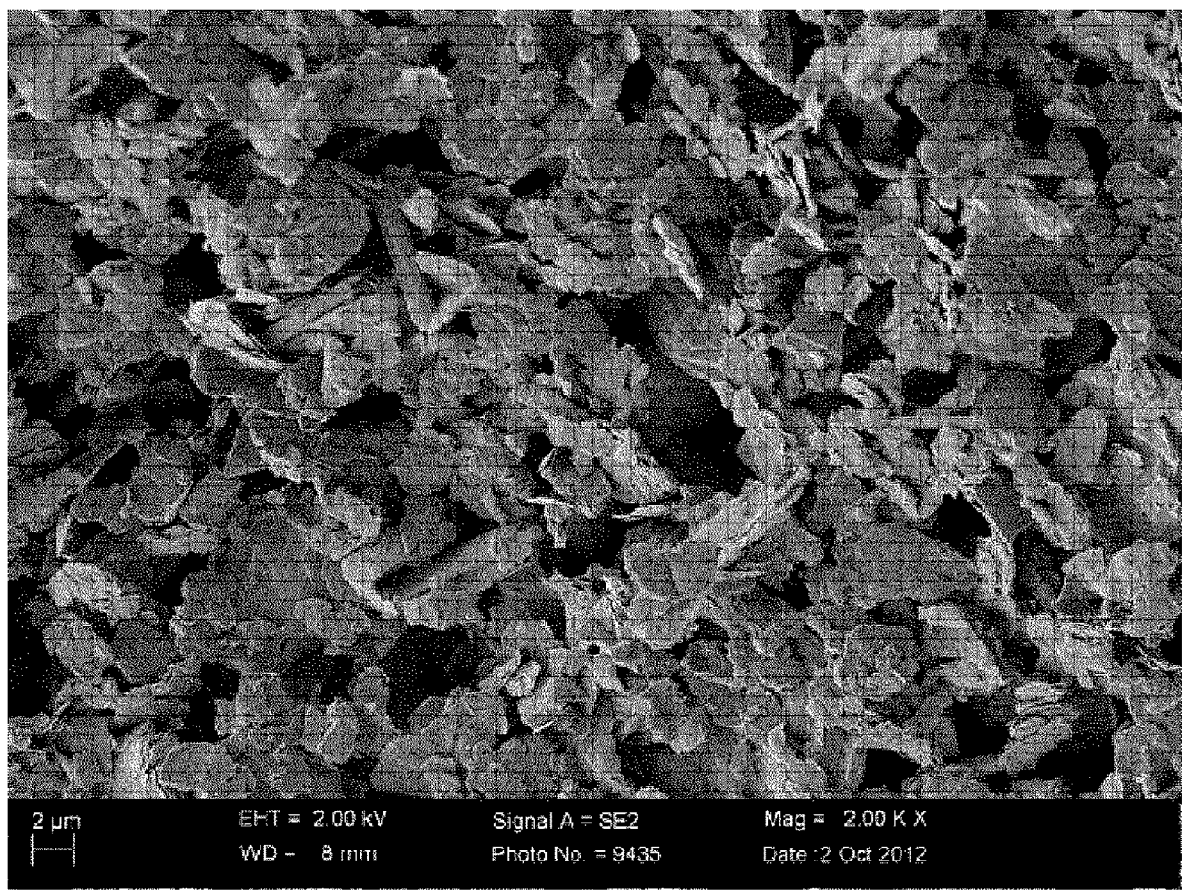

Referring to FIGS. 29 to 40, low and high magnification SEM pictures of the coatings produced with the different carbon slurries are shown. FIGS. 29 and 30 shows low and high magnification SEM micrographs of the coating prepared using graphite (synthetic) slurry (according to the exemplary Method 3), respectively, are shown. FIG. 29 shows that an uneven coating is produced with some graphite particles remaining above the carbon layer. It is thought that the majority of graphite particles were well dispersed in the ethyl cellulose suspension. Graphite particles above the carbon layer are particles that remained undispersed after the blending step of the graphite powder dispersion and the ethyl cellulose suspension. FIG. 30 shows that the graphite powder is composed of flake-like particles of about 3.5 µm.

Figure 31:
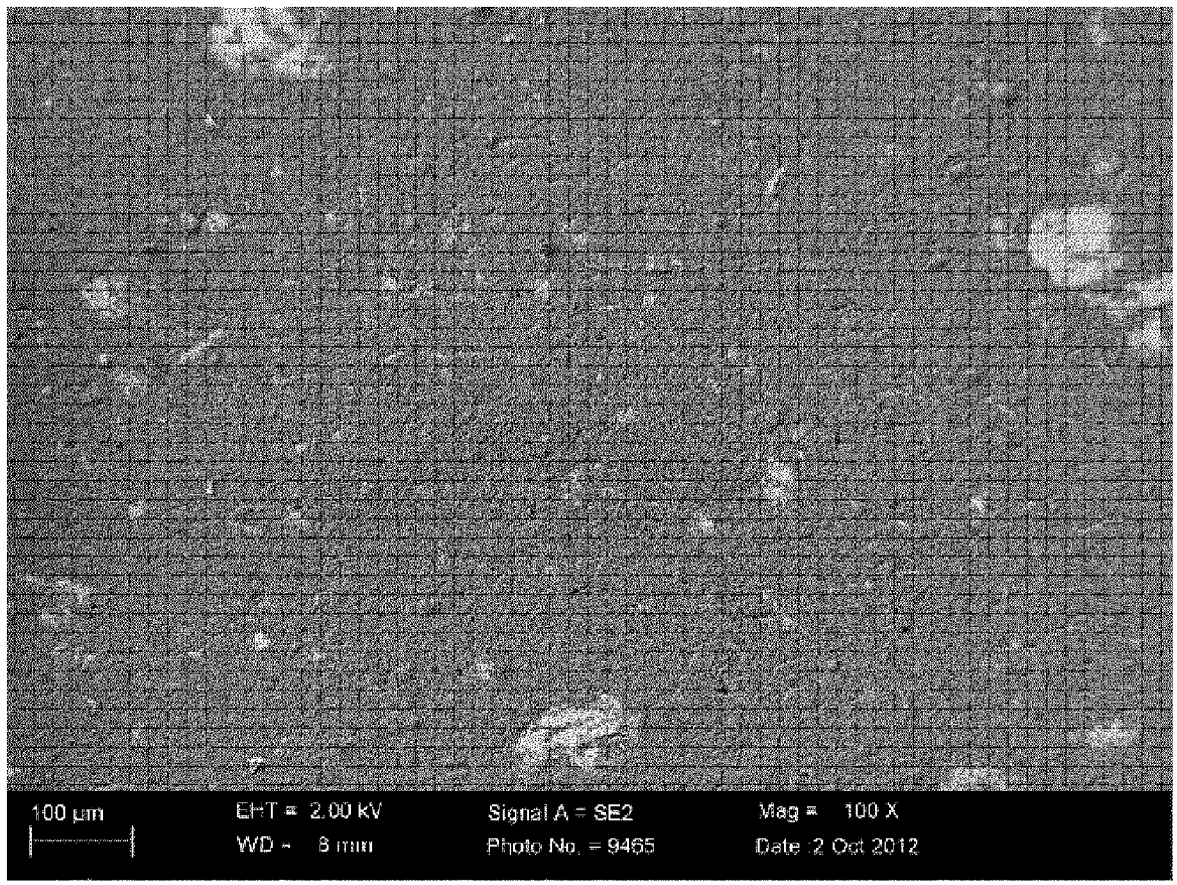
Figure 32:
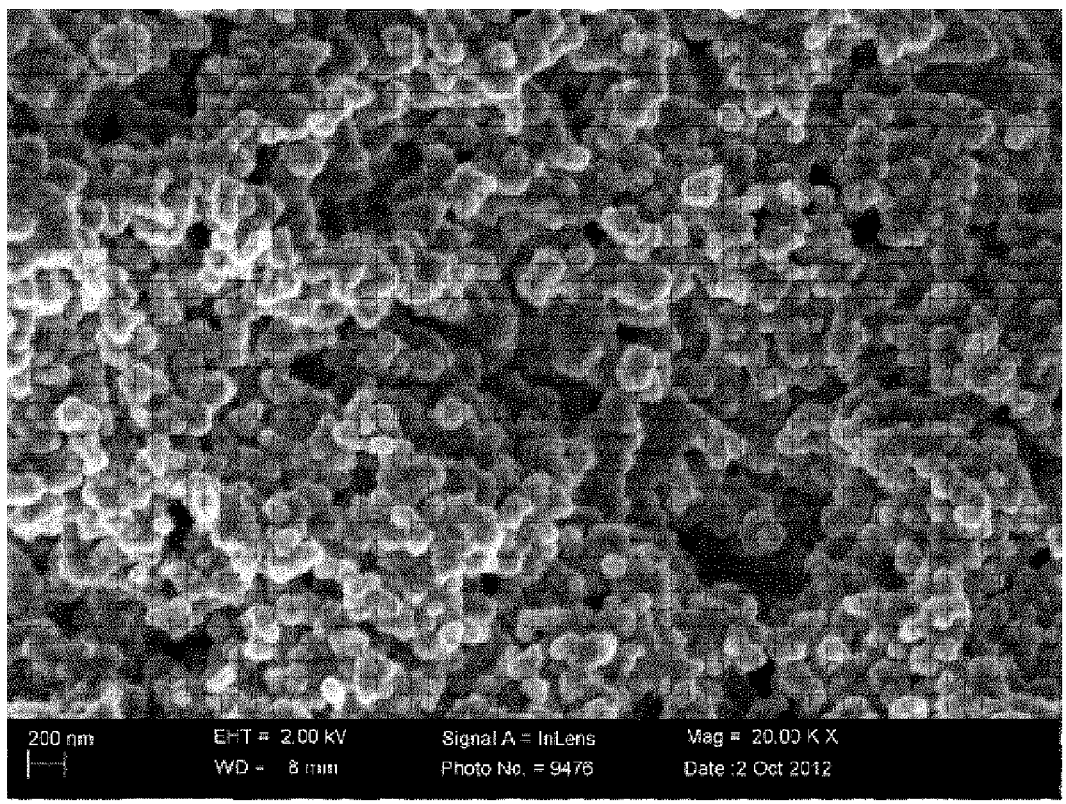

Referring to FIGS. 31 and 32, low and high magnification SEM micrographs of the coating prepared using CB M280 slurry (according to the exemplary Method 4), respectively, are shown. FIG. 31 shows that, similar to the graphite (synthetic) coating, some undispersed carbon particles remained above the carbon layer. FIG. 32 shows that the carbon black powder used to prepare this slurry present the typical morphology of amorphous carbon; i.e., spherical particles of nanometric size.

Figure 33:
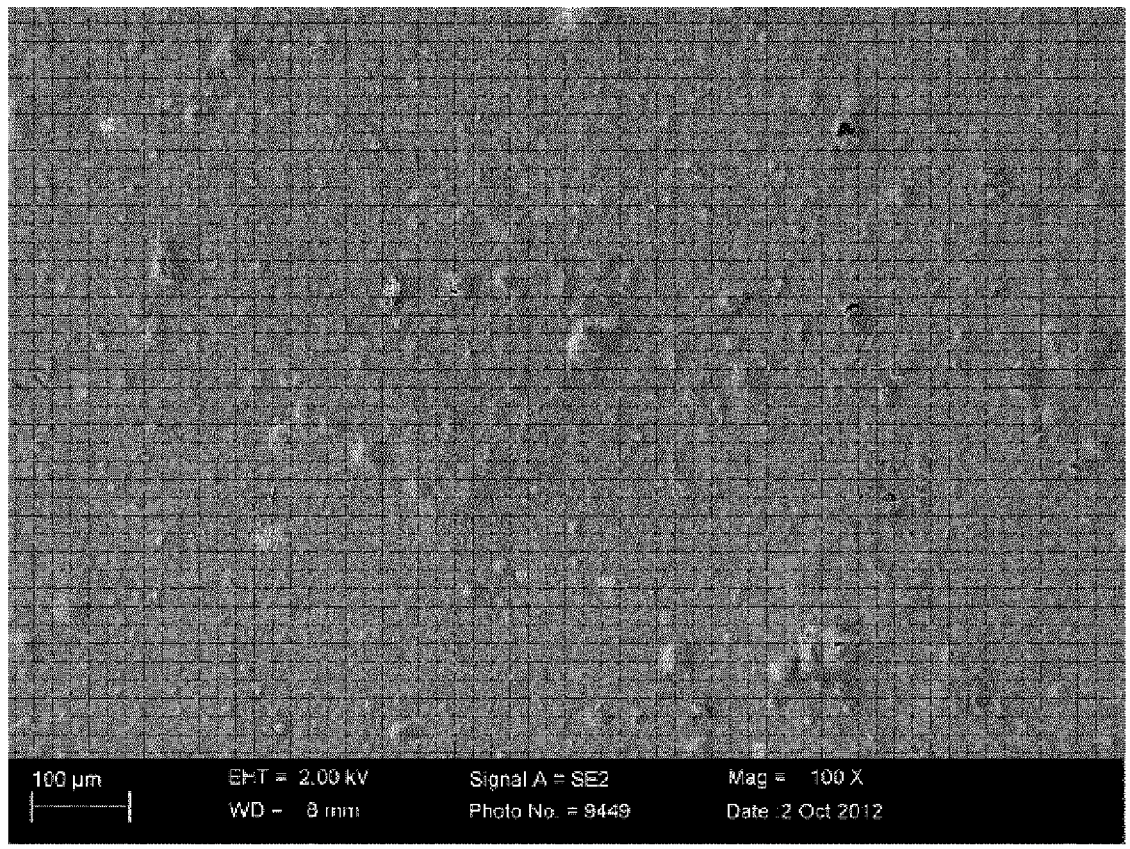
Figure 34:
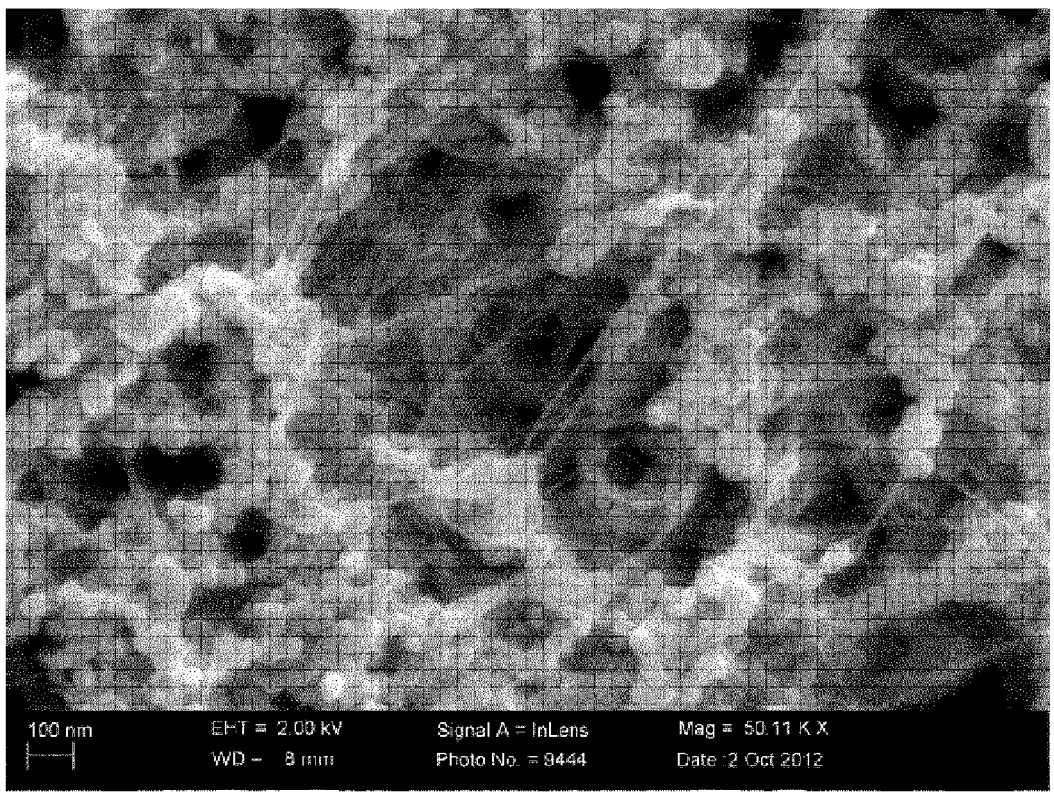

Referring to FIGS. 33 and 34, low and high magnification SEM micrographs of the coating prepared using SWNT slurry (according to the exemplary Method 100), respectively, are shown. FIG. 33 shows a well distributed SWNT rough surface. FIG. 34 reveals the presence of abundant SWNT entangled with amorphous carbon particles that partially mask the presence of the SWNT. The micrograph also depicts the "fluffy" appearance of the SWNT coating where a number of "cavities" can be identified. Although the exact lengths of the SWNT bundles are difficult to measure due to the amorphous carbon content, most are observed to extend to several micrometers.

Figure 35:
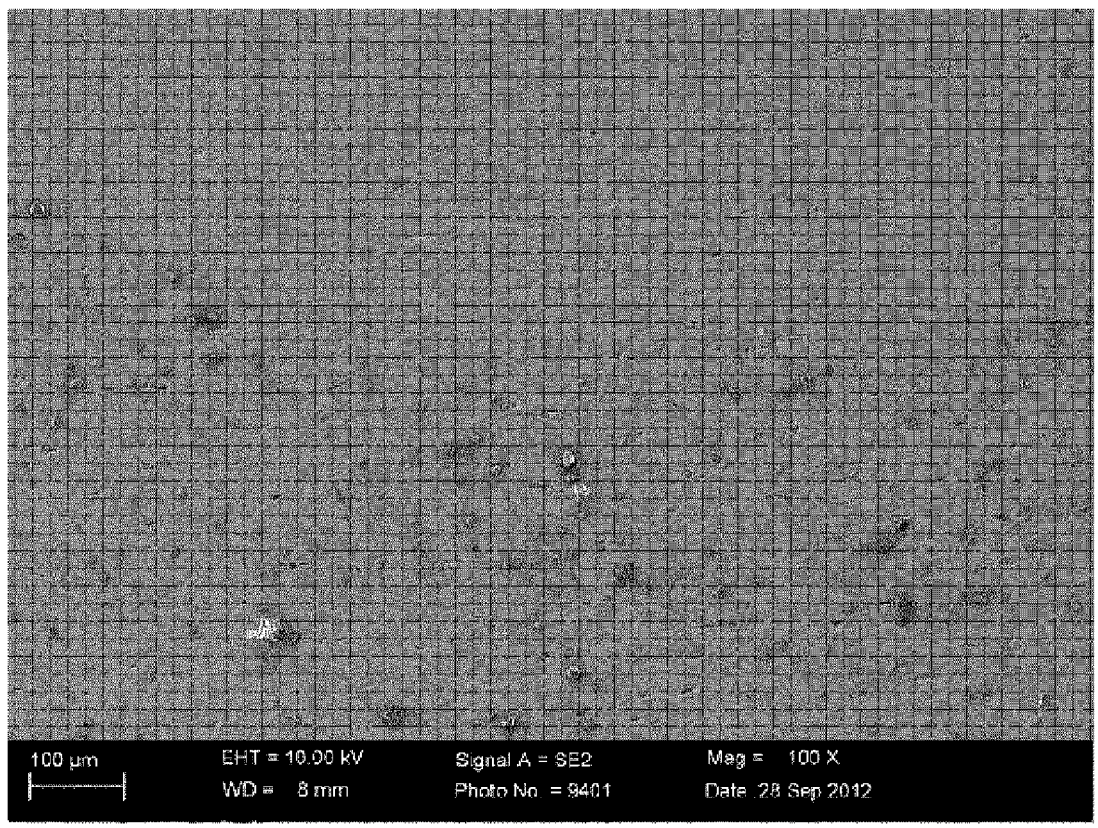
Figure 36:
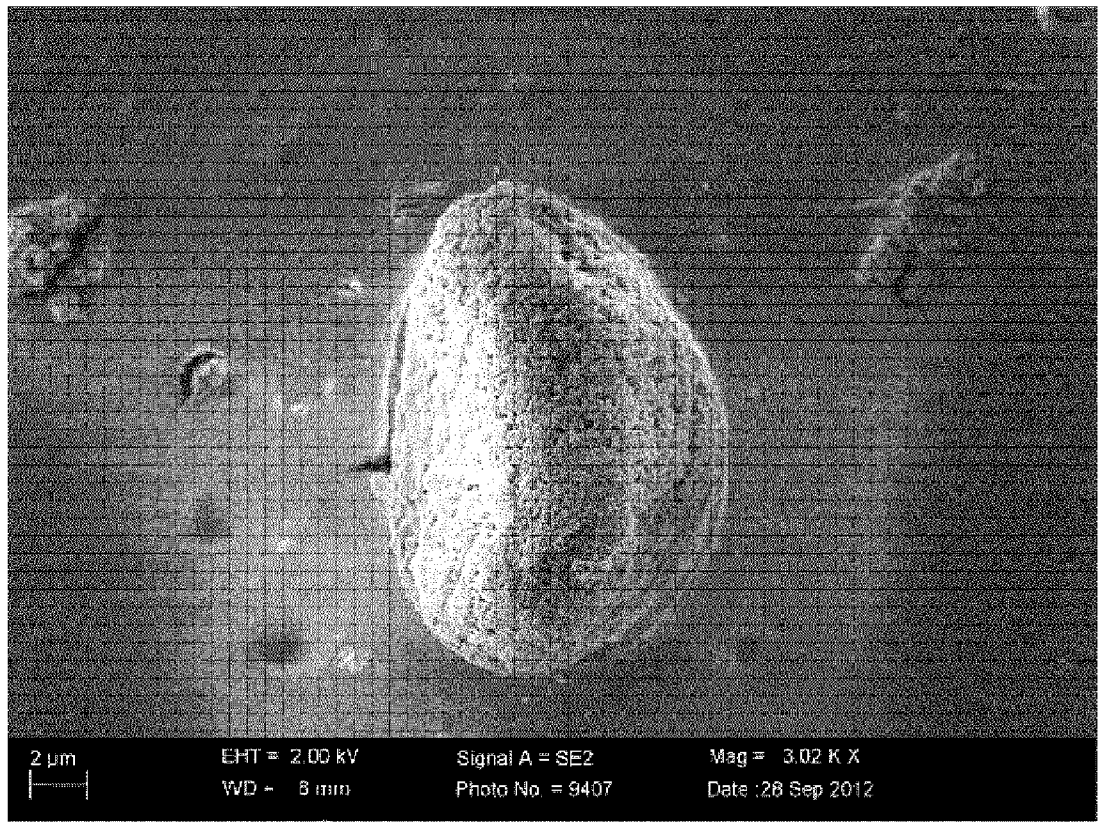

Referring to FIGS. 35 and 36, low and high magnification SEM micrographs of the coating prepared using $C_{60}$ slurry (according to the exemplary Method 7), respectively, are shown. FIG. 35 shows that the thin layer formed with $C_{60}$ contains carbon conglomerates on the surface. Due to the low solubility of $C_{60}$ molecules (see above), the layer is likely the result of the baking process of the ethyl cellulose containing dissolved $C_{60}$ fullerenes, whilst the conglomerates are mainly composed of undissolved $C_{60}$ molecules. This result may confirm the observations found on the optical micrographs (see above); i.e., although Zircaloy coatings with $C_{60}$ slurries appeared almost transparent to the Micro-derm equipment, a thin coating was produced. FIG. 36 depicts a high magnification micrograph of the coating. $C_{60}$ conglomerates of about 9.95 µm are spaced far apart in the coating. These conglomerates exhibit small holes at an average size of about 200 nm.

Figure 37:
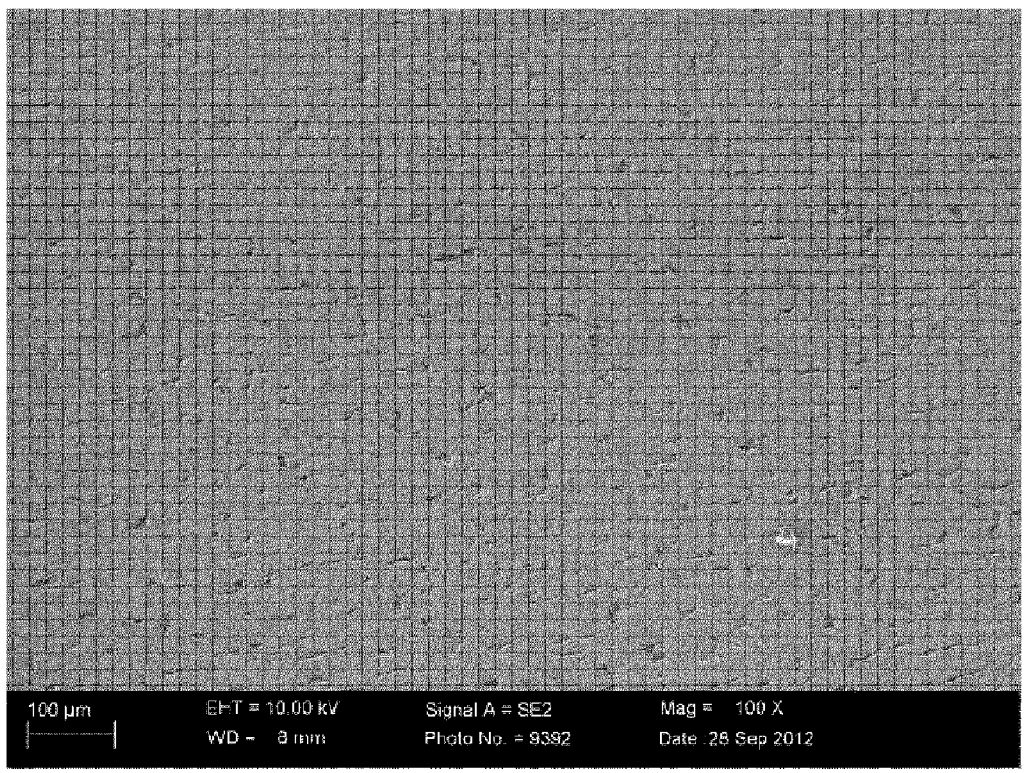
Figure 38:
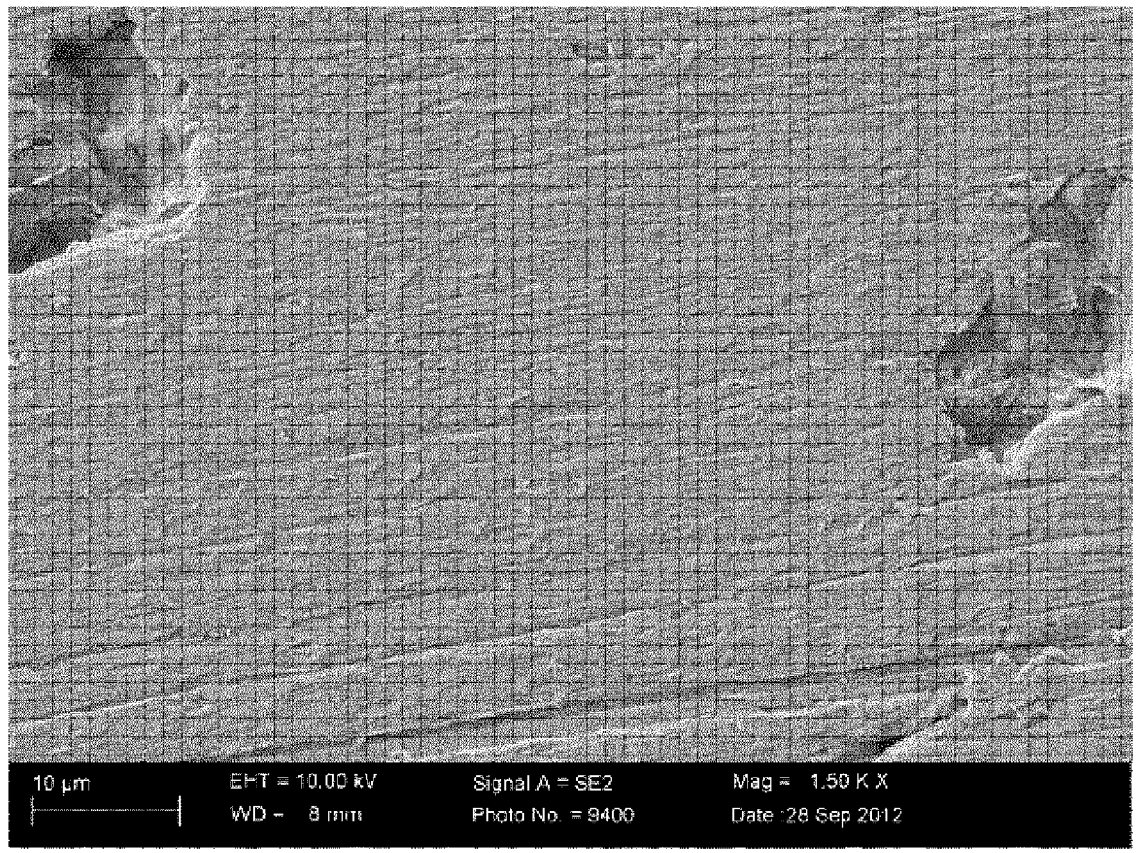

Referring to FIGS. 37 and 38, low and high magnification SEM micrographs of the coating prepared using ethyl cellulose (EC) slurry (according to the exemplary Method 8), respectively, are shown. FIG. 37 shows that, similar to the $C_{60}$ carbon layer, a thin coating was produced even if the EC coatings were almost transparent to the Micro-derm equipment. FIG. 38 reveals the presence of a number of cavities within the EC layer.

Figure 39:
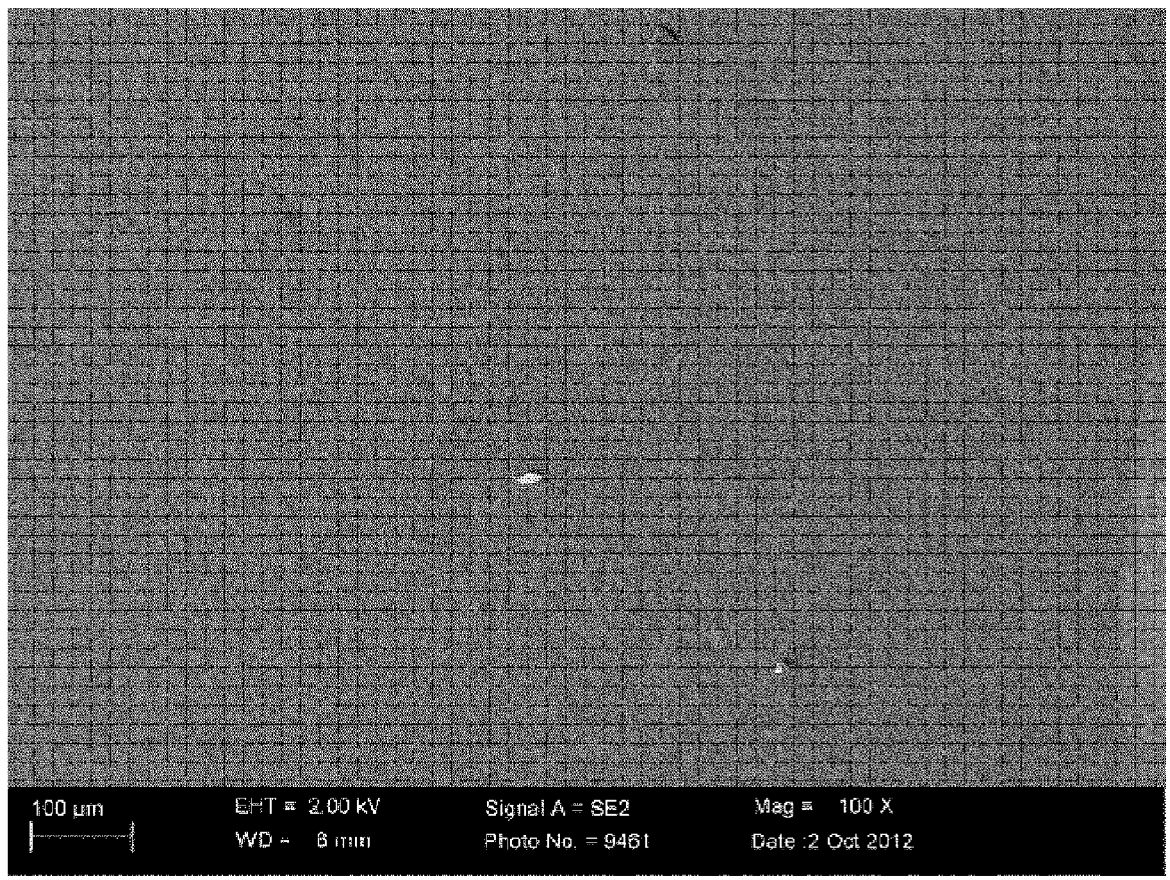
Figure 40:
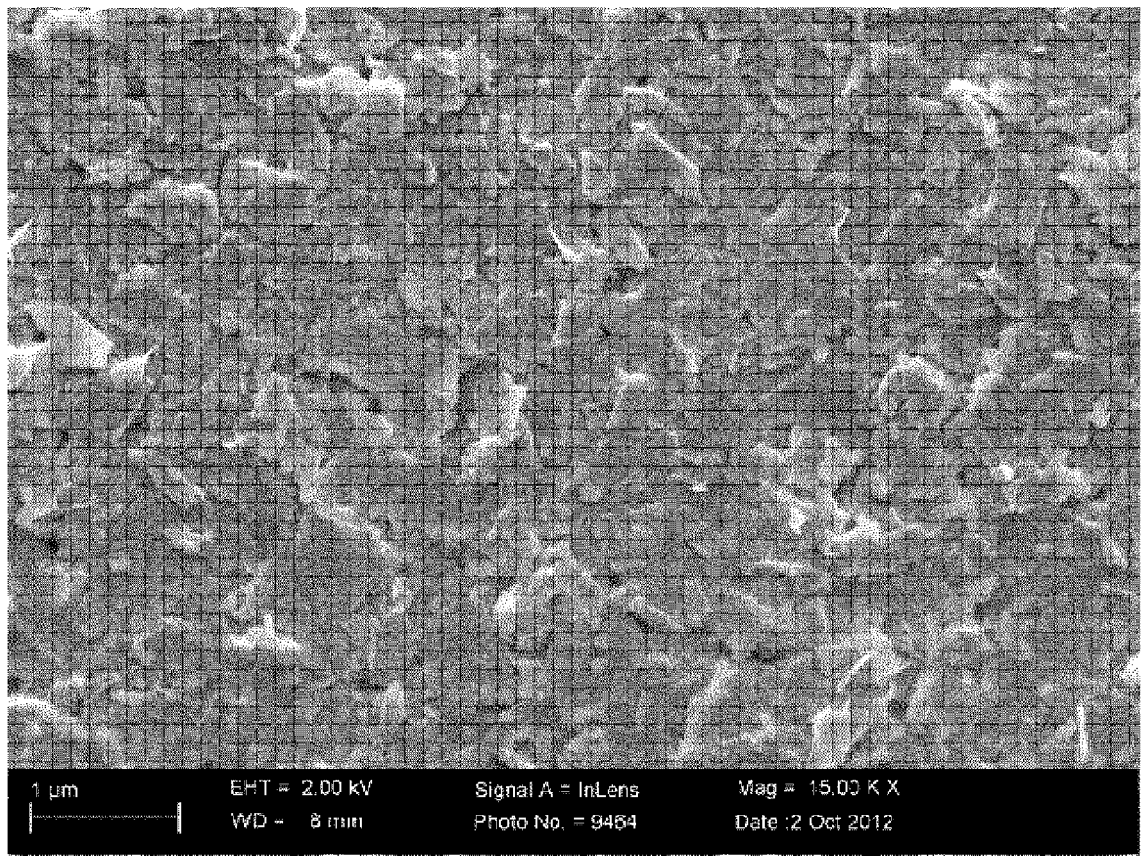

Referring to FIGS. 39 and 40, low and high magnification SEM micrographs of the coating prepared using DAG-154 slurry, respectively, are shown. FIG. 39 shows that DAG-154 produces a homogenous carbon coating. A few small imperfections can be observed. FIG. 40 reveals that the DAG-154 coating is composed of small flake-like carbon particles layered on top of one another. The SEM results showed that DAG-154 produced a similar uniform layering to that of the graphite (synthetic) (FIGS. 29 and 30), but with much smaller flake-like carbon particles. The size of the flake-like carbon for DAG-154 was estimated to be on the order of 0.6 µm, whilst the size of the carbon particles for graphite (synthetic) was estimated to be about 3.5 µm.

Transmission Electron Microscopy of Carbon Coating Samples

Referring again to the experiments, the morphology and structure of the experimentally produced carbon layers was also evaluated by transmission electron microscopy analysis. A High Resolution Philips CM30 Transmission Electron Microscope (TEM), equipped with Convergent Beam Electron Diffraction (CBED), was used to characterize the internal structure of the soot collected from the coatings produced DAG-154 and SWNT-based slurries.

Figure 41:
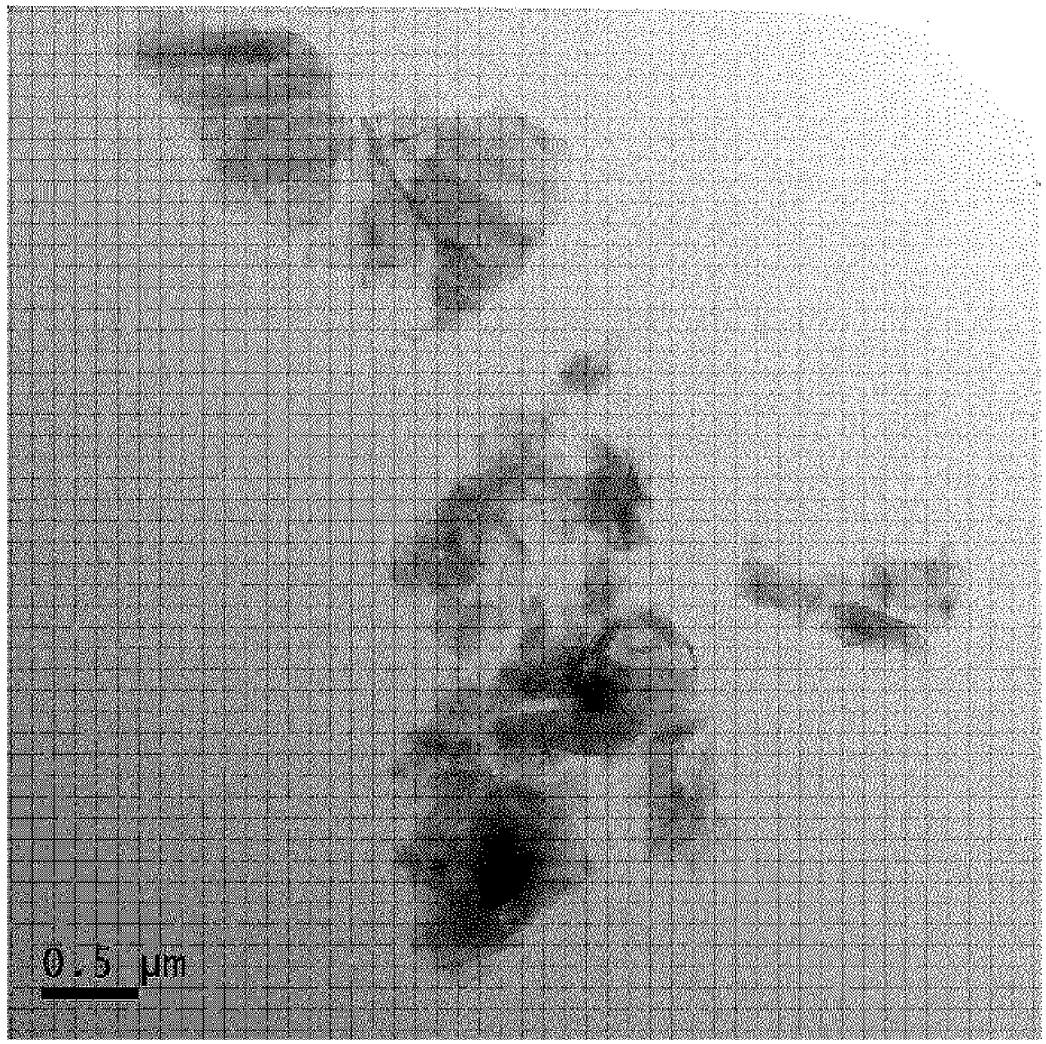
Figure 42:
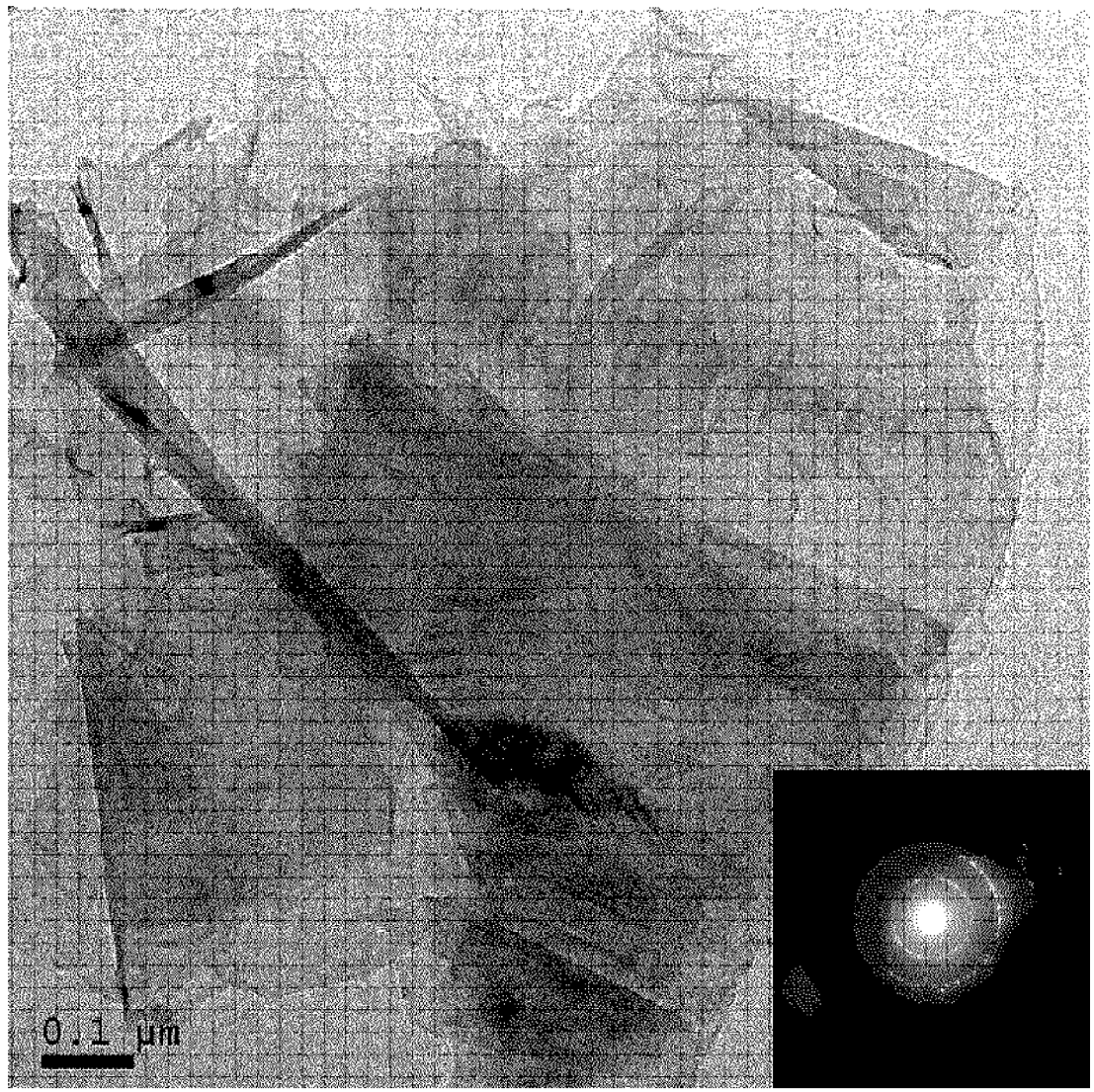

Referring to FIGS. 41 to 44, low and high magnification TEM micrographs of the soot collected from the coatings produced with DAG-154 and SWNT-based slurries are shown. As expected, FIG. 41 shows that the soot produced with DAG-154 is mainly composed of small flake-like particles, commonly found in plasma blacks. The flat particles are believed to be formed due to their recirculation in the hot zone of the reactor. The high energy density facilitates growth of a planar structure. Interestingly, FIG. 42 shows that carbon flakes are formed of very thin graphene-like sheets. The width of the graphene-like sheets can be estimated to be about 0.60 µm.

Figure 43:
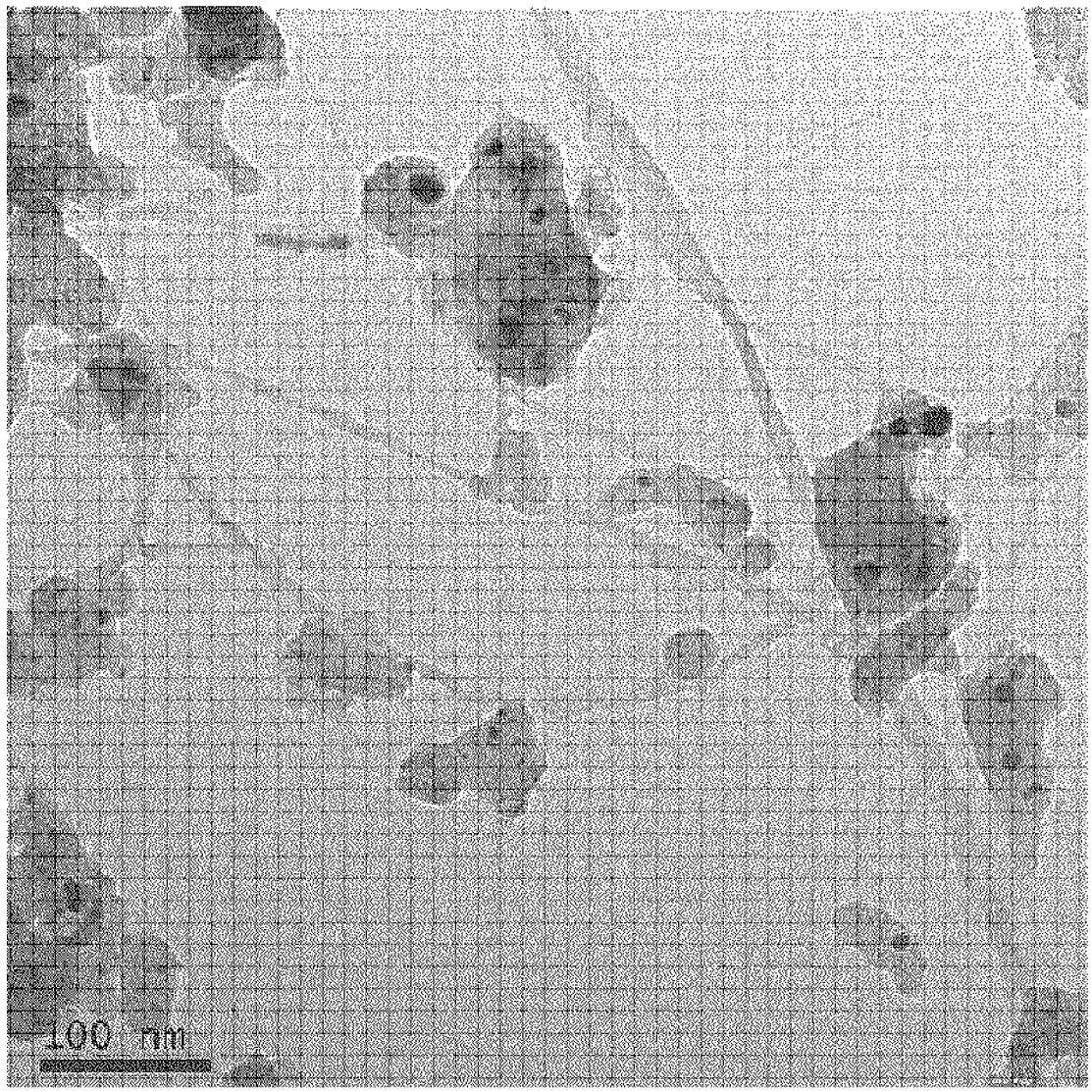

FIG. 43 shows the network of nanotubes also identified in the SEM analysis. The SWNT in this image are covered with an amorphous carbon coating. The high resolution TEM image in FIG. 44 clearly shows a number of SWNT bundles as well as many large diameter catalyst particles embedded within amorphous carbon clusters. The darker points of the globules are the remaining catalyst while the outer, lighter portion is composed of amorphous carbon and fullerenes. SWNT bundle diameters are estimated at about 10 nm, whilst tube diameters are estimated at about 1.5-1.6 nm.

Electron diffraction analyses were also carried out on carbon samples. Plane spacing was calculated using Bragg's Law.

$$n\lambda = 2d \sin \theta$$

where n is an integer, λ is the wavelength of incident wave, d is the spacing between the planes in the atomic lattice, and θ is the angle between the incident beam and the scattering planes.

For small values of θ, $$\sin \theta = \theta$$

$$\tan 2\theta = 2\theta = \frac{R}{L}$$

From this, Bragg's Law can be manipulated to form a new equation where $\lambda L$ is the camera constant (equal to 46.1 mmÅ):

$$d = \frac{\lambda L}{R}$$

Where L is the camera length and R is the spacing between the direct and the scattering beams.

Referring to Table 15, below, known d-spacing values for various carbon structures, including carbon black, graphite $C_{60}$ and SWNT are shown.

TABLE 15

| d-Spacing | Carbon Black (Å) | Graphite (Å) | $C_{60}$ (Å) | SWNT (Å) |
|---|---|---|---|---|
| $d_1$ | 3.4-3.8 | 3.354 | 8.68 | 3.41 (zigzag) |
| $d_2$ | | 2.131 | 8.18 | 3.39 ((2n, n chiral) |
| $d_3$ | | 2.031 | 7.68 | 3.38 (armchair) |
| $d_4$ | | 1.800 | 5.01 | |
| $d_5$ | | 1.677 | 4.28 | |
| $d_6$ | | 1.543 | 4.09 | |
| $d_7$ | | 1.231 | 3.17 | |
| $d_8$ | | 1.155 | 2.9 | |

FIG. 42 shows a high magnification TEM micrograph with an imbedded electron diffraction pattern obtained from the center of a flake-like carbon particle. Table 16 shows the corresponding d-spacing calculated using the spacing between the direct and the scattering beams.

TABLE 16

| | d-Spacing (Å) |
|---|---|
| $d_1$ | 3.41 |
| $d_2$ | 2.20 |
| $d_3$ | 1.71 |
| $d_4$ | 1.28 |
| $d_5$ | 1.20 |
| $d_6$ | 1.10 |
| $d_7$ | 0.84 |
| $d_8$ | 0.74 |
| $d_9$ | 0.64 |

As expected, the $d_1$ value for DAG-154 is larger than expected for graphite. This result may confirm the results obtained by XRD analysis. DAG-154 is composed of a mixture of amorphous and small graphitized particles typical of graphitized carbon blacks produced at very high temperature.

Figure 44:
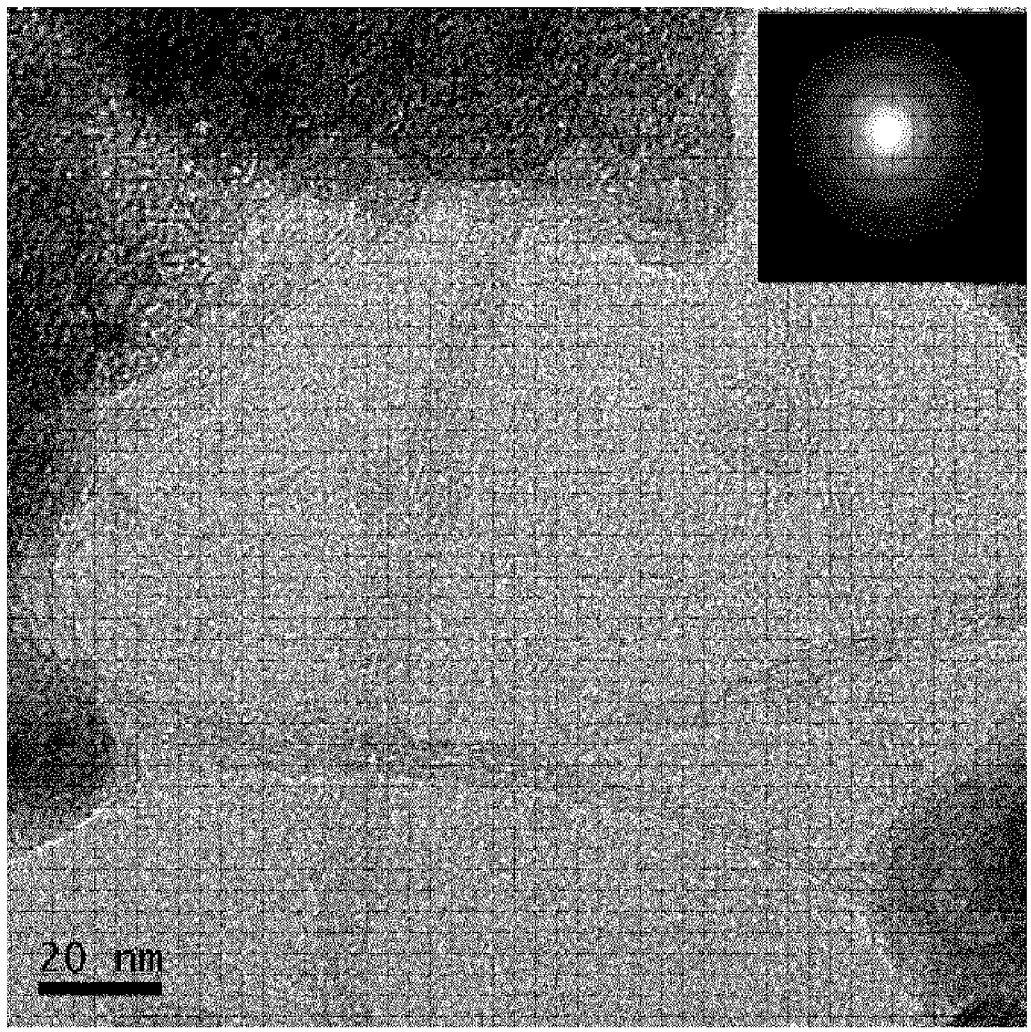

FIG. 44 shows a high magnification TEM micrograph with an imbedded electron diffraction pattern obtained when the beam was pointed directly at the center of a SWNT bundle. Table 17 shows the corresponding d-spacing calculated using the spacing between the direct and the scattering beams.

TABLE 17

| | d-Spacing (Å) |
|---|---|
| $d_1$ | 3.39 |
| $d_2$ | 3.07 |
| $d_3$ | 2.10 |

TABLE 17-continued

| | d-Spacing (Å) |
|---|---|
| $d_4$ | 1.24 |
| $d_5$ | 1.07 |

The main $d_1$ value for SWNT can be associated with chirality of the nanotubes, which affects the conductance of the nanotube, it's density, it's lattice structure, and other properties. The other d-spacing values might be associated to other carbon materials found in the sample, such as amorphous carbon and fullerenes.

Iodine Absorption Experiments in DAG-154 and SWNT Soot

Referring still to the conducted experiments, preliminary $I_2$ adsorption experiments were carried out in DAG-154 and SWNT soot samples to evaluate SWNT capability to potentially improve fission product capture when used in place of the current carbon layer, as part of the overall experiments to demonstrate the advantage of SWNT-based slurry coating. $I_2$-exposed samples were characterized using Thermogravimetric analysis (TGA) and X-ray photoelectron spectroscopy (XPS) as discussed in more detail below.

Experimental Set-Up

Figure 45:
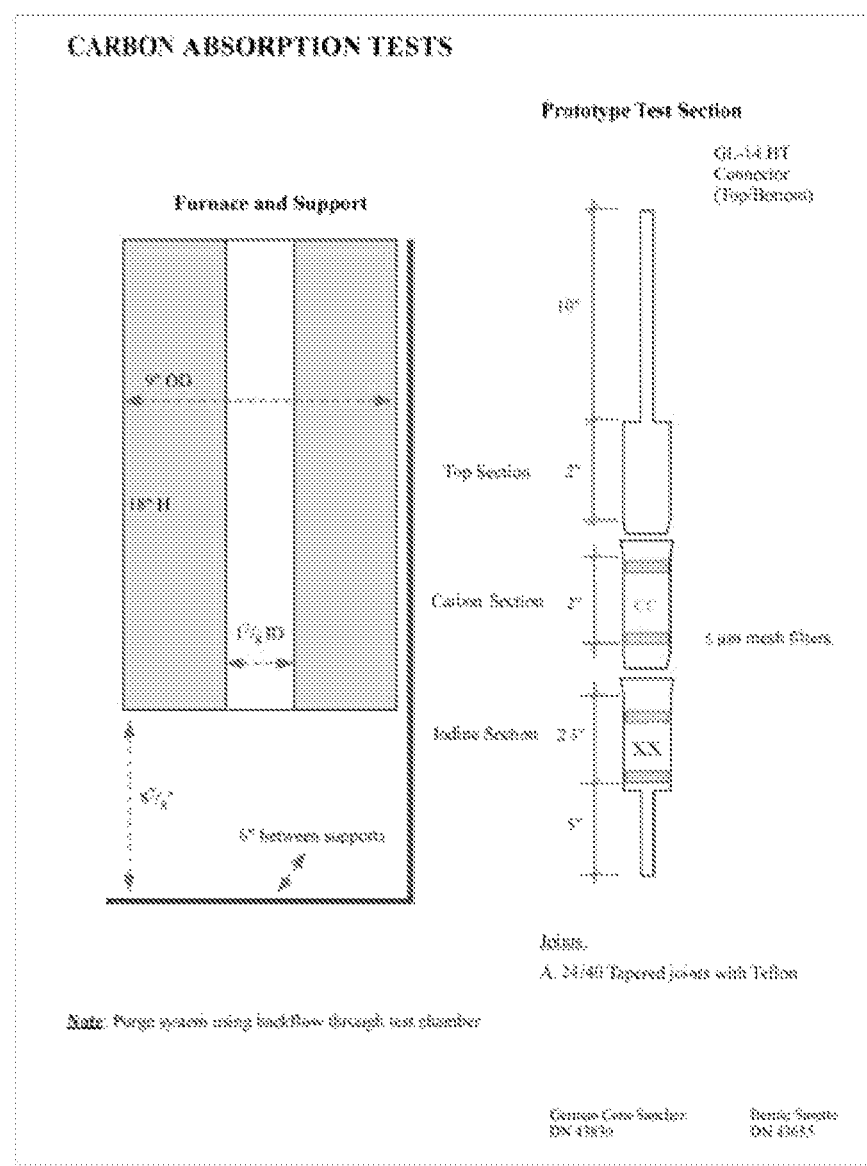
Figure 46:
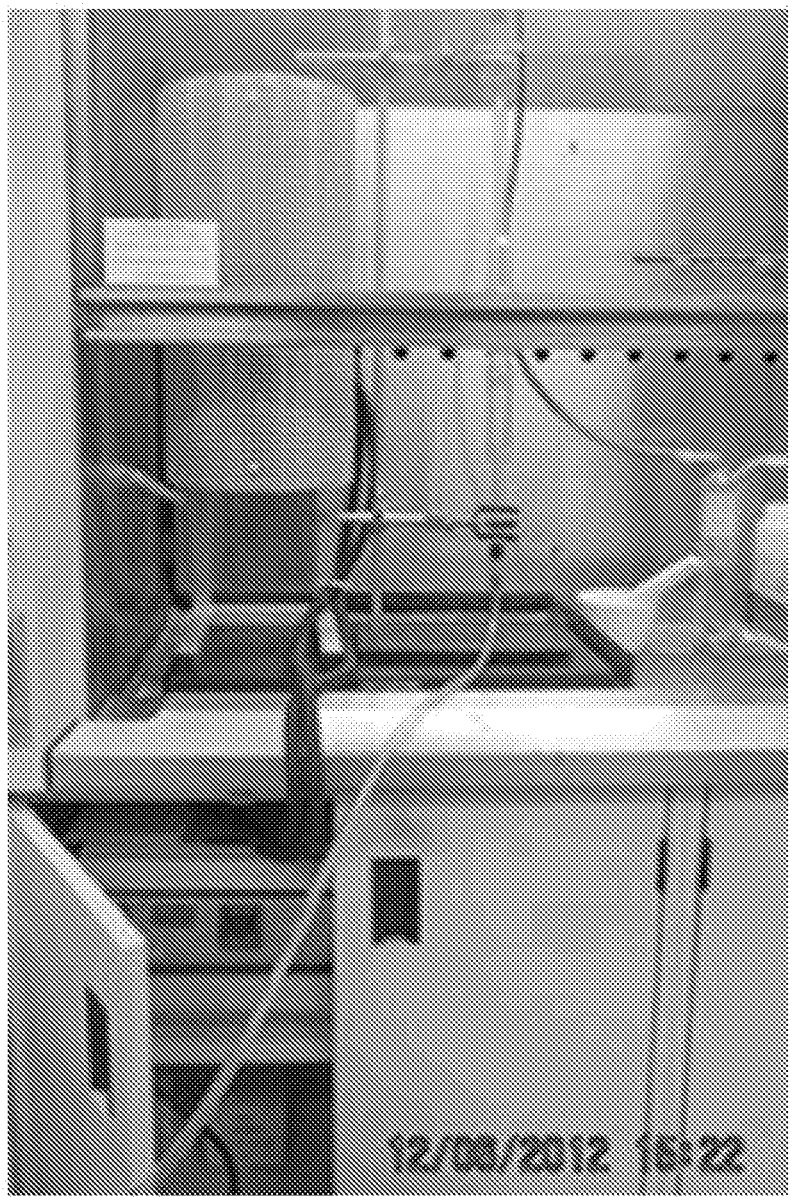

Referring to FIGS. 45 and 46, a schematic and a photograph of the experimental apparatus used to perform iodine adsorption experiments, respectively, are shown. The iodine adsorption equipment consists of a Carbolite Eurotherm 2132 tube furnace with a temperature range of 15 to 1000° C., a glass (Pyrex) sample holder, argon as carrier gas and an ensemble of a pressure regulator and flow meter.

The glass sample holder consists of two different chambers; the first chamber is used to vaporize solid iodine whilst the second chamber holds the carbon sample. The two glass chambers include glass filters to hold the samples in place. Once the solid iodine and carbon samples are loaded, the glass sample holder is placed into the tube furnace. The bottom section of the glass sample holder is connected to the Argon gas supply, and the top section is connected to a water-based bubbler to absorb the iodine leaving the adsorption system.

$I_2$ Absorption Experimental Results

Referring still to the experiments, overall, the iodine adsorption procedure involved the following steps:
1) Loading samples of solid iodine and carbon into the chambers of the glass sample holder;
2) Placing the glass sample holder into the tube furnace and connecting the bottom end to argon carrier gas from and the top end to the water-based bubbler;
3) Setting argon carrier gas pressure to about 40 psig (275.8 kPa) and flow rate to about 60 sccm;
4) Setting furnace to the specified temperature—for these experiments, furnace temperature was set to 100° C.;
5) Running the adsorption experiment and recording the time; and
6) Cooling down the system using argon as carrier gas.

Under these experimental conditions, vaporized iodine is carried by argon carrier gas through the carbon samples where adsorption takes place. The excess of iodine gas is then carried through a Tygon tube to a water-based bubbler.

Once the experiment is complete, the system is cooled down to room temperature using argon as carrier gas. Samples of $I_2$-exposed carbon material are collected and analyzed for iodine content using the TGA.

Two different adsorption experiments were performed using about 3 g of iodine and 3 g of soot DAG-154 at a temperature of about 100° C. The adsorption times for the first and second experiment were 2 and 4 hours, respectively.

Two different adsorption experiments were also carried out for SWNT soot. In these experiments, about 3 g of iodine and 0.5 g of SWNT soot were used for 3 and 4 hours adsorption times, at about 100° C.

Samples of $I_2$-exposed DAG-154 and SWNT soot were collected and analyzed for iodine adsorption using TGA and XPS.

Thermogravimetric Analysis of $I_2$-Absorbed Soot Samples

Thermogravimetric analysis (TGA) was performed on $I_2$-exposed DAG-154 and SWNT soot samples. The essential instrument components are a recording balance, a furnace, a temperature programmer, a sample holder, an enclosure for establishing the required atmosphere, and a means of data recording and displaying. The TGA procedure involved a temperature program from room temperature to 500° C., with a temperature ramp of 10° C./min and an inert atmosphere with argon flow rate of 4200 sccm. Referring to FIGS. 47 to 52, plots of weight-loss percent (TGA) of different soot samples, along with their corresponding derivative weight loss (DTG) curves, as function of temperature, are shown. $I_2$-exposed soot samples of about 10 mg for DAG-154 and 3 mg for SWNT were used for the analyses.

Figure 47:
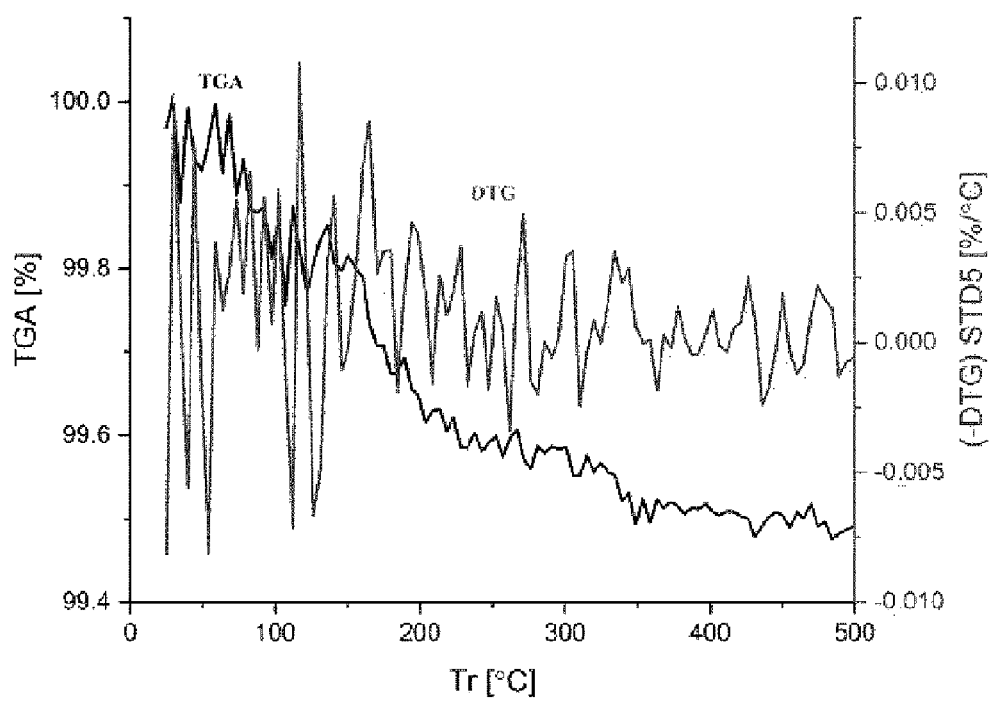
Figure 48:
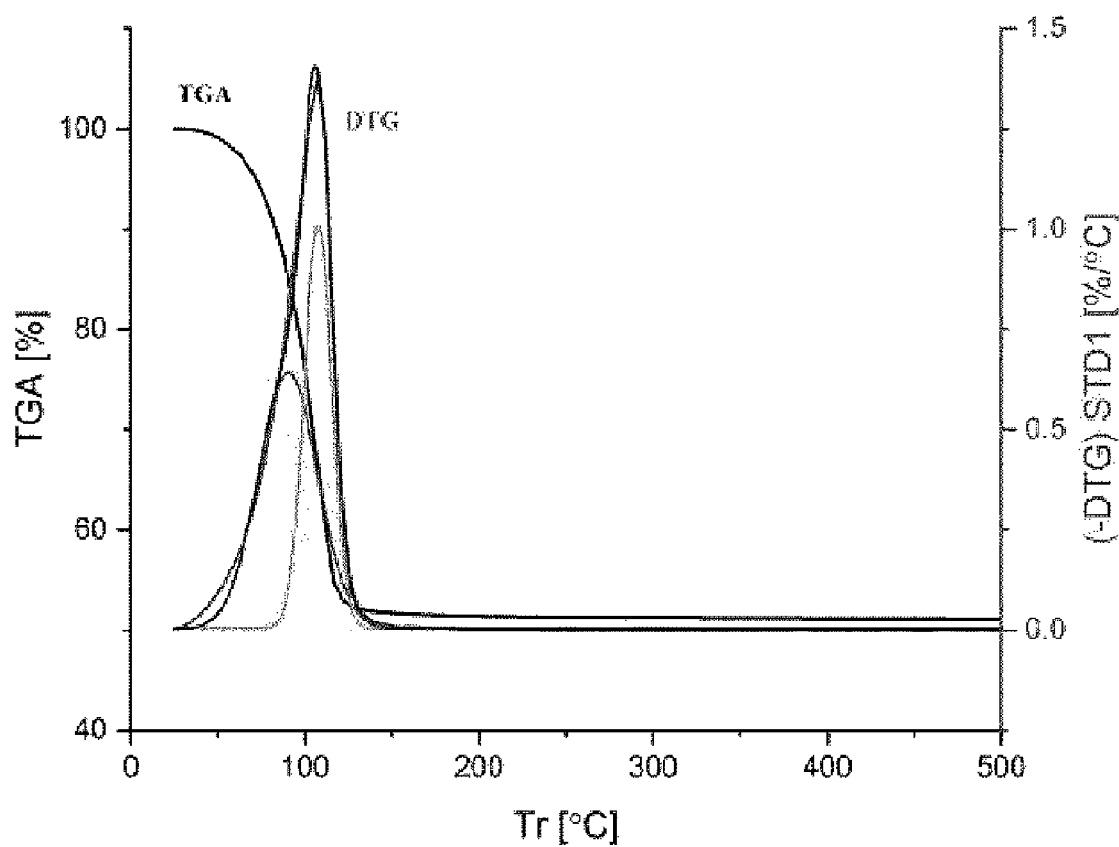

In order to determine the range of temperatures where iodine desorbs from carbon, preliminary TGA determinations were performed on pure carbon black M-280 powder and a mix of carbon black powder containing 50 wt % of solid iodine. FIG. 47 and FIG. 48 show the TGA and DTG curves for pure carbon black and carbon black containing 50 wt % of solid iodine, respectively. FIG. 47 shows that pure carbon black does not contain volatile impurities in the temperature range from room to 500° C. In contrast, FIG. 48 shows that the majority of iodine is volatilized from carbon black powder in two events occurring between ambient temperature and 200° C. The residual mass of about 50 wt % observed in the TGA trace corresponds to the remaining carbon and is consistent with the initial concentration of carbon black powder used in the original powder mixture.

Figure 49:
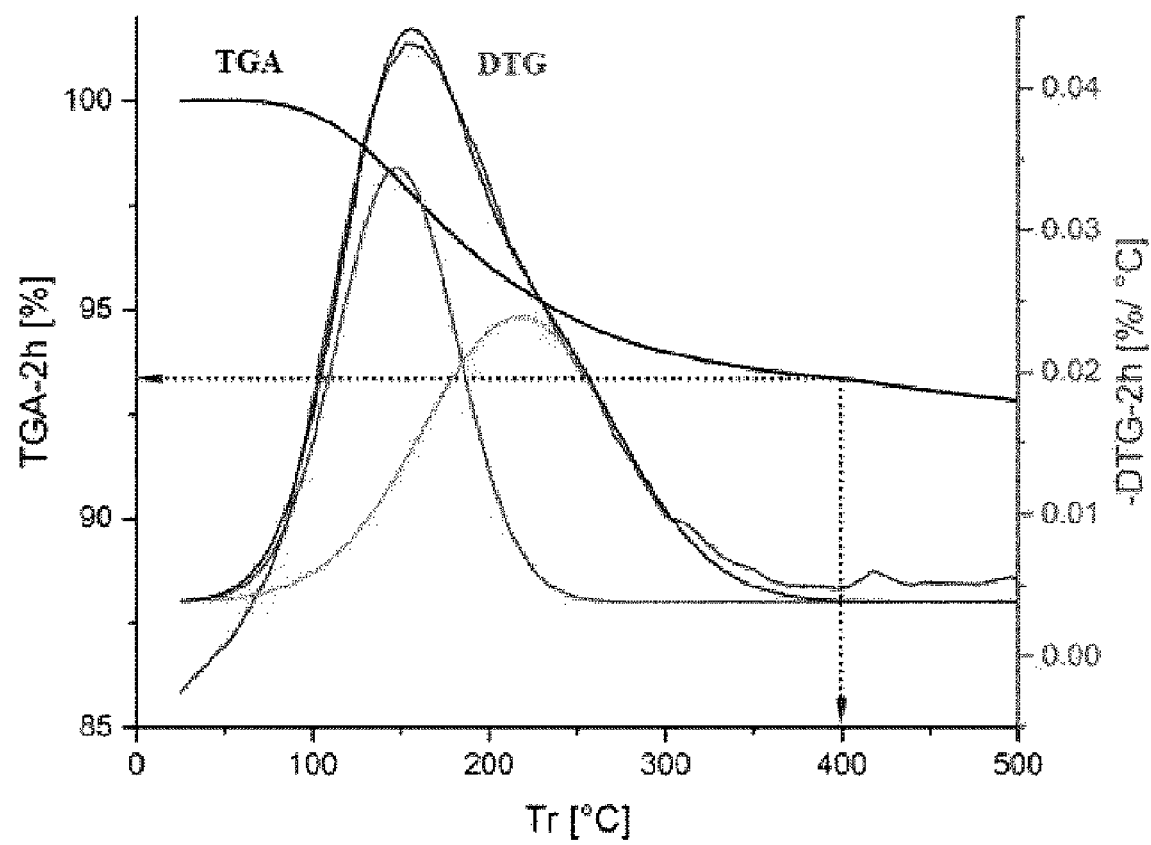
Figure 50:
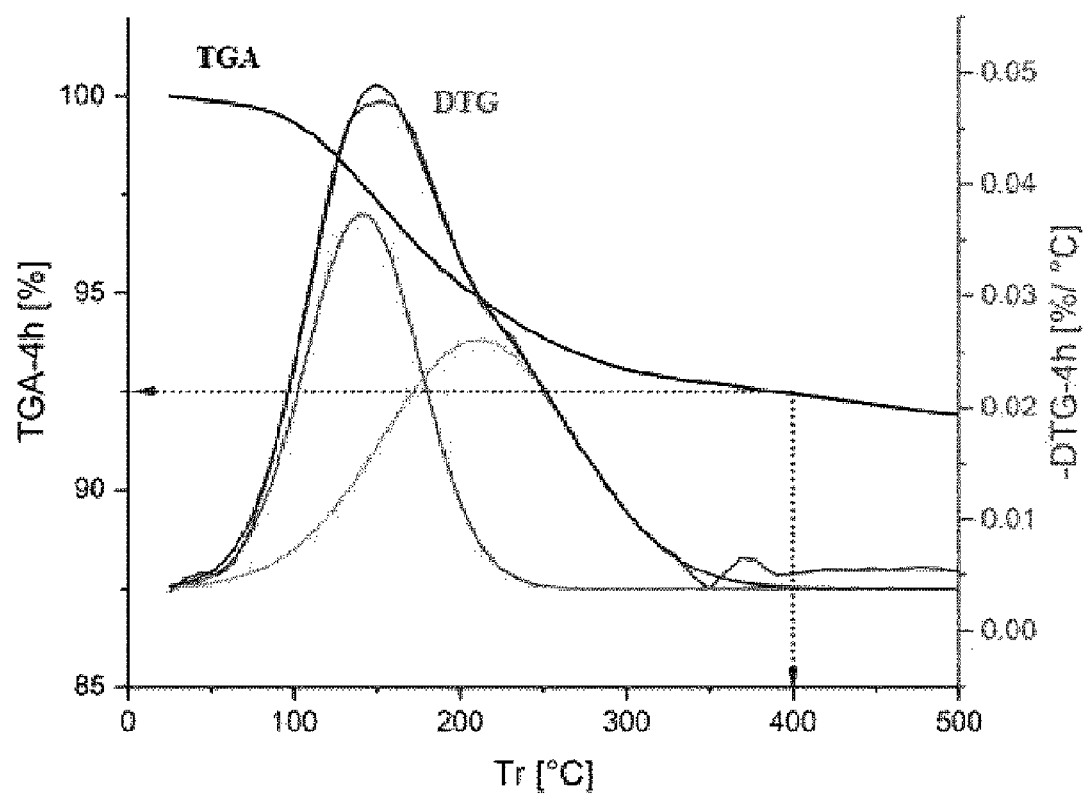

FIG. 49 and FIG. 50 show TGA/DTG plots of $I_2$-exposed soot samples collected from the two adsorption experiments performed on DAG-154 soot at 2 and 4 h, respectively. Iodine is desorbed from the soot in two events occurring between ambient temperature and 400° C. The residual mass of about 92.5 wt % observed in the TGA trace corresponds to the remaining DAG-154 soot. There is slight difference in the weight-loss percent for the two experiments, indicating that 2 h of $I_2$ adsorption might be sufficient to saturate the DAG-154 soot sample. The DTG profile facilitates identification of separate weight-loss events during the desorption process. The DTG for these samples was well fitted to a series of Gaussian functions. Two $I_2$ desorption events can be clearly identified at about 140° C. and 210° C. Upon comparison with FIG. 48, the two desorption events are shifted to the high temperature. The two $I_2$ desorption peaks found in FIG. 49 and FIG. 50 might be associated with two different C—I binding energies whilst the peaks found in FIGS. 43 and 44 might be only associated with $I_2$ volatilization phenomena.

Figure 51:
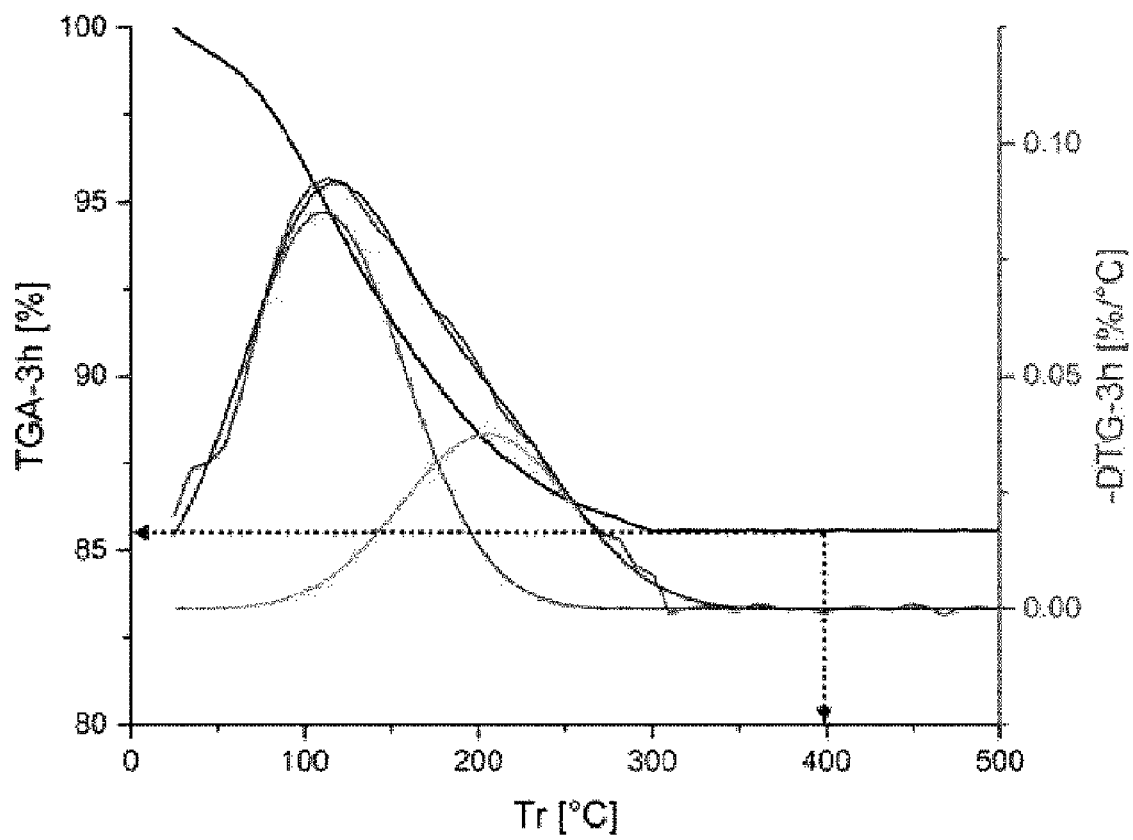
Figure 52:
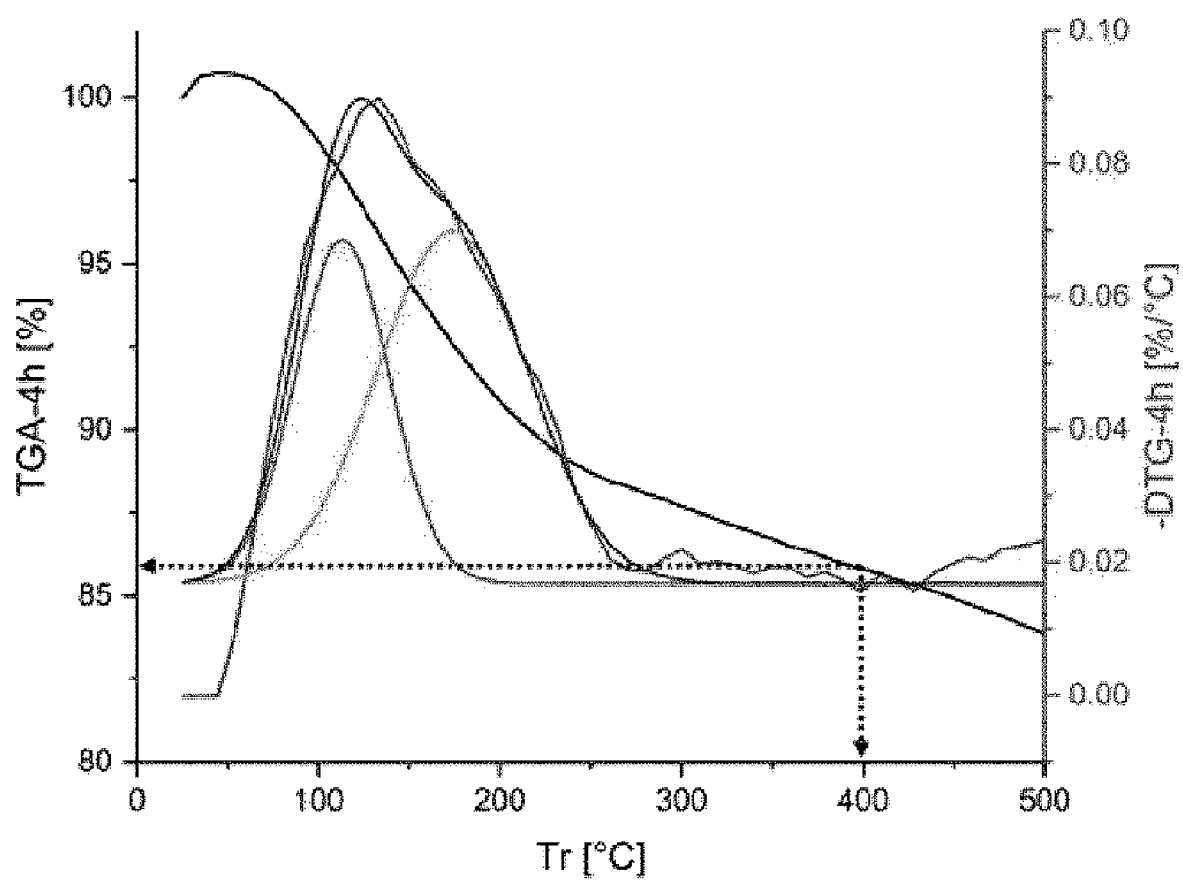

FIG. 51 and FIG. 52 show TGA/DTG plots of $I_2$-exposed soot samples collected from the two adsorption experiments performed on SWNT soot at 3 and 4 h, respectively. The residual mass of about 85 wt % observed in the TGA trace corresponds to the remaining SWNT soot. As expected, 3 h of $I_2$ adsorption time might be sufficient to saturate the SWNT soot sample, as indicated by the small difference in the weight-loss percent between the two experiments. Similar to DAG-154 experiments, iodine is desorbed from the soot in two events occurring between ambient temperature and 400° C. The DTG profile, fitted to a series of Gaussian functions, shows two $I_2$ desorption events at about 110° C. and 200° C. These two desorption peaks might be due to similar C—I bounds observed in the DAG-154 iodine adsorption experiments. Table 18 depicts TGA and DTG-Gaussian fitting values of the different curves.

TABLE 18

| Sample | TGA | | | DTG - Gaussian Fitting | | | | | |
|---|---|---|---|---|---|---|---|---|---|
| | Initial Mass (mg) | Onset Temperature (° C.) | Weight Loss (%) | Peak | Centre (° C.) | Width (° C.) | Height (%/° C.) | Area | Area (%) |
| Pure Carbon Black | 5.95 | 35 | 28.5 | 1 | 90 | 33.9 | 0.64 | 27.0 | 57 |
| | | 85 | 21.5 | 2 | 110 | 15.9 | 1.00 | 20.0 | 43 |
| DAG-154-2 h | 9.47 | 70 | 3.4 | 1 | 145 | 67.7 | 0.03 | 2.58 | 48 |
| | | 110 | 3.6 | 2 | 220 | 109.8 | 0.02 | 2.75 | 52 |
| DAG-154-4 h | 14.69 | 45 | 3.5 | 1 | 140 | 68.7 | 0.03 | 2.88 | 47 |
| | | 110 | 4.0 | 2 | 210 | 115.5 | 0.02 | 3.21 | 53 |
| SWNT-3 h | 2.75 | 40 | 10.0 | 1 | 110 | 93.5 | 0.09 | 9.98 | 69 |
| | | 88 | 4.5 | 2 | 205 | 97.4 | 0.04 | 4.57 | 31 |
| SWNT-4 h | 3.21 | 40 | 5.5 | 1 | 115 | 51.7 | 0.05 | 3.34 | 38 |
| | | 100 | 9.0 | 2 | 175 | 82.7 | 0.05 | 5.48 | 62 |

Similar area percents for the two desorption peaks were found for the iodine adsorption experiments performed on DAG-154 soot, at 2 and 4 hours. This result may suggest that the two C—I binding events are equally favored at 2 and 4 hours of $I_2$ adsorption.

In contrast, different area percents for the two desorption peaks were found for the experiments performed on SWNT soot, at 3 and 4 hours. At 4-h adsorption time, the area percent of the second peak is larger than the area percent of the corresponding peak at a 3-h adsorption time. It is believe that in the case of SWNT, larger adsorption times might favor $I_2$ adsorption having higher C—I binding energy.

The TGA results may suggest that SWNT soot may be able to adsorb about twice the amount of iodine than the DAG-154 soot, at the conditions of the experiment; i.e. $I_2$ carrier gas flow rate of 60 sccm and furnace temperature of 100° C. Overall, SWNT soot adsorbed about 15 wt % whilst DAG-154 soot adsorbed 7.5 wt % of $I_2$.

X-Ray Photoelectron Spectroscopy of $I_2$-Absorbed Soot Samples

Referring still to the experiments, four soot samples were also characterized using X-ray Photoelectron Spectroscopy (XPS). Two samples were starting materials (unexposed samples) DAG-154 and SWNT and served for comparative analyses to the other two that were exposed to gaseous iodine ($I_2$-exposed samples). The main objective of the examination is to characterize the iodine absorption in the DAG-154 and SWNT soot.

XPS analyses were carried out using a VG Scientific ESCALAB 220i-XL XPS instrument. A monochromatic Al Kα (1486.6 eV) X-ray beam with a diameter of about 500 μm was used to excite photoelectrons from atomic core-levels. The XPS method is described in detail in the following document, Microchemical Studies of Irradiated Fuel by Imaging XPS, AECL-12135.

XPS analyses were conducted by first collecting the photoelectron spectrum in a full binding-energy range from 0 to 1400 eV. These survey spectra provide a general list of detected elements and data for the overall quantification. From the surveys, elements of interest are selected and several region-spectra are collected in narrow energy ranges, which cover the binding energy (BE) position of the main photoelectron emission of the selected elements. Two XPS analyses were performed on two different areas (A1 and A2) of each sample. The main emissions of interest were the O 1 s and C 1 s photoelectrons, as well as I 3d photoelectrons for the $I_2$-exposed samples.

Figure 53:
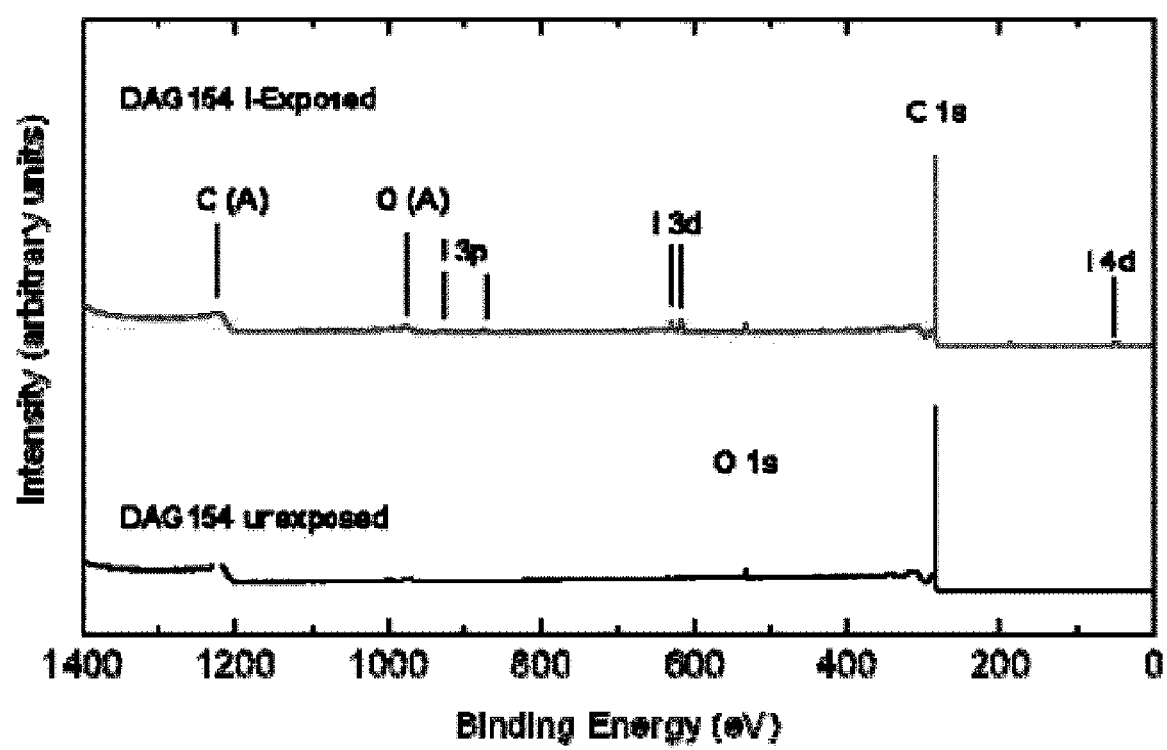
Figure 54:
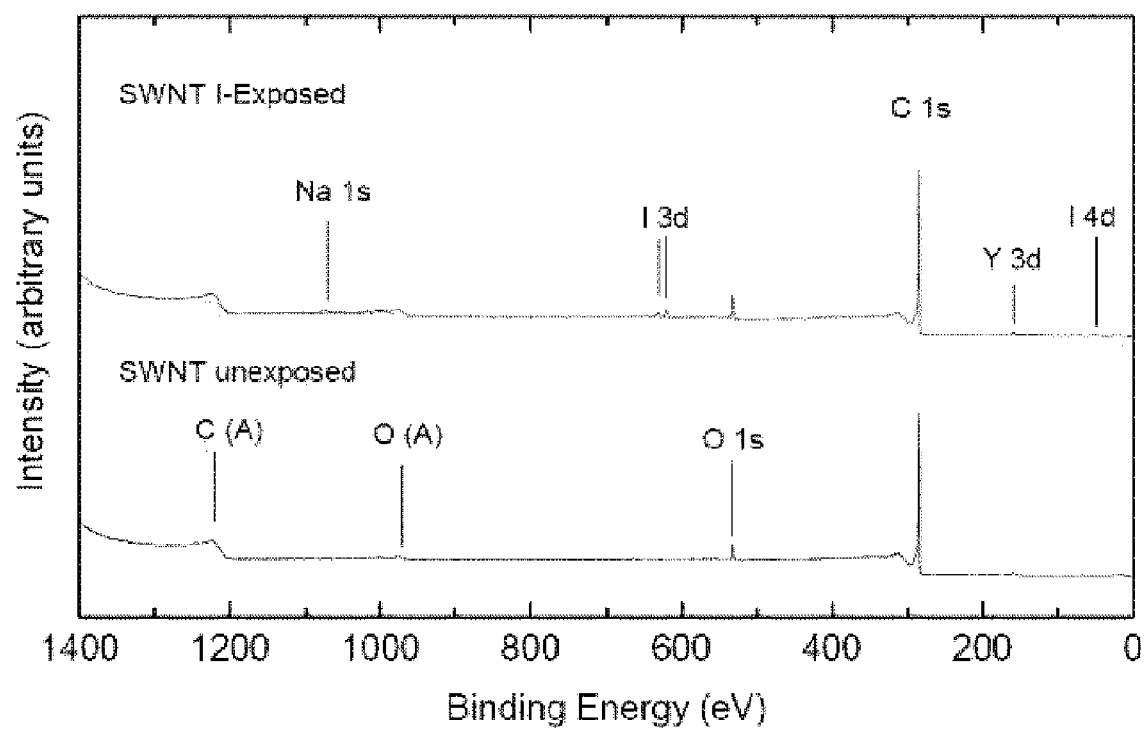

Referring to FIGS. 53 to 56, XPS spectra for unexposed and $I_2$-exposed DAG-154 and SWNT soot samples are shown. FIG. 53 depicts XPS survey spectra of unexposed and $I_2$-exposed DAG-154 soot, whilst FIG. 54 shows the XPS survey spectra of unexposed and $I_2$-exposed SWNT soot. In these figures, the suffix "(A)" denotes Auger electron transitions. Two main elements (O and C) were identified in all survey spectra with maximum O 1s and C 1 s emissions at a binding energy of 532.6 and 284.6 eV, respectively. In addition, a common impurity element Na was also detected in all samples. Other elemental impurities were present in one carbon material but were not detected in the other. For example, Ca was present in DAG-154 but not in SWNT. SWNT soot contained Ni, S and Y, which were likely used as catalysts during the synthesis process. Detection of iodine was confirmed by the presence of its main photoelectron emissions; i.e., the I 3d, I 4d and I 3p spectral lines. Table 19, below, shows the relative concentration of elements found in unexposed and $I_2$-exposed soot samples.

analyses, which suggest that SWNT soot adsorbs about twice the amount of iodine than the DAG-154 soot (see above). This difference might be due to the fact that the small amount of samples used for the XPS analysis are not representative of the bulk $I_2$-exposed sample for a full quantitative analysis.

Further chemical information can be obtained from the high energy resolution spectra collected in the range of binding energy that covers the binding energy positions of O 1s, C 1s and I 3d emissions. A detailed chemical binding environment of an element may be revealed by the determination of shift of its binding energy to that of elemental state, or the so-called chemical shift. Since an element can be in different binding environments within a chemical compound, the collected spectrum is a convolution of all elemental component contributions, plus the statistical distributions from the instrumental conditions. The deconvolution of the O 1s, C 1s and I $3d_{5/2}$ emissions has been carried out using the curve-fitting feature in the Avantage™ software package developed by VG Scientific.

Figure 55:
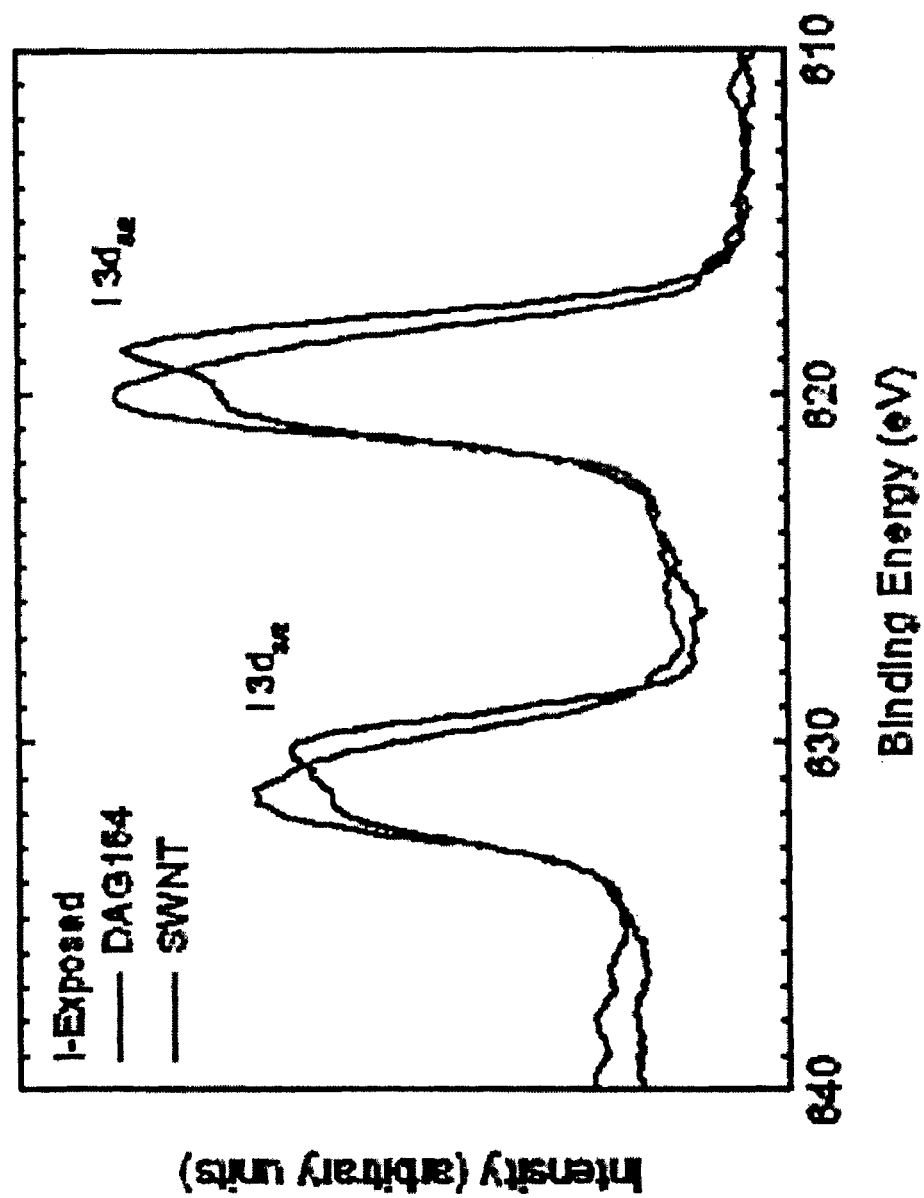

Referring to FIG. 55, high resolution I 3d spectra, in both spin-orbit splitting I $3d_{3/2}$ and I $3d_{5/2}$, collected from $I_2$-exposed DAG-154 and SWNT soot samples are shown. The I 3d spectrum of $I_2$-exposed SWNT appears as a single-peak while the I 3d spectrum of $I_2$-exposed DAG-154 suggests at least two-component peak structure. The maximum intensity of the $I_2$-exposed DAG-154 I $3d_{5/2}$ spectrum is found at about 618.7 eV, whereas a second peak is found at BE about 620 eV. These two binding energies are related alkali iodides and $I_2$, respectively. Recent works on absorption of I-containing organic compounds on metallic surfaces suggest the above binding energies to two poly-iodide species ($I_3$)— and ($I_5$)—, instead. However, the two-component interpretation completely omits the carbon-iodine bonding, which is expected to be highly present in these experiments. Other studies have suggested the C—I bonds contributing to the I $3d_{5/2}$ emission to be found at high BE shoulder in the range of 620-622.4 eV. Consequently, a separate peak could possibly be added in to high BE side of the I $3d_{5/2}$ spectrum to characterize the C—I bonds. The curve fitting is constrained by the energy resolution used for this work, i.e., about 1 eV.

Figure 56:
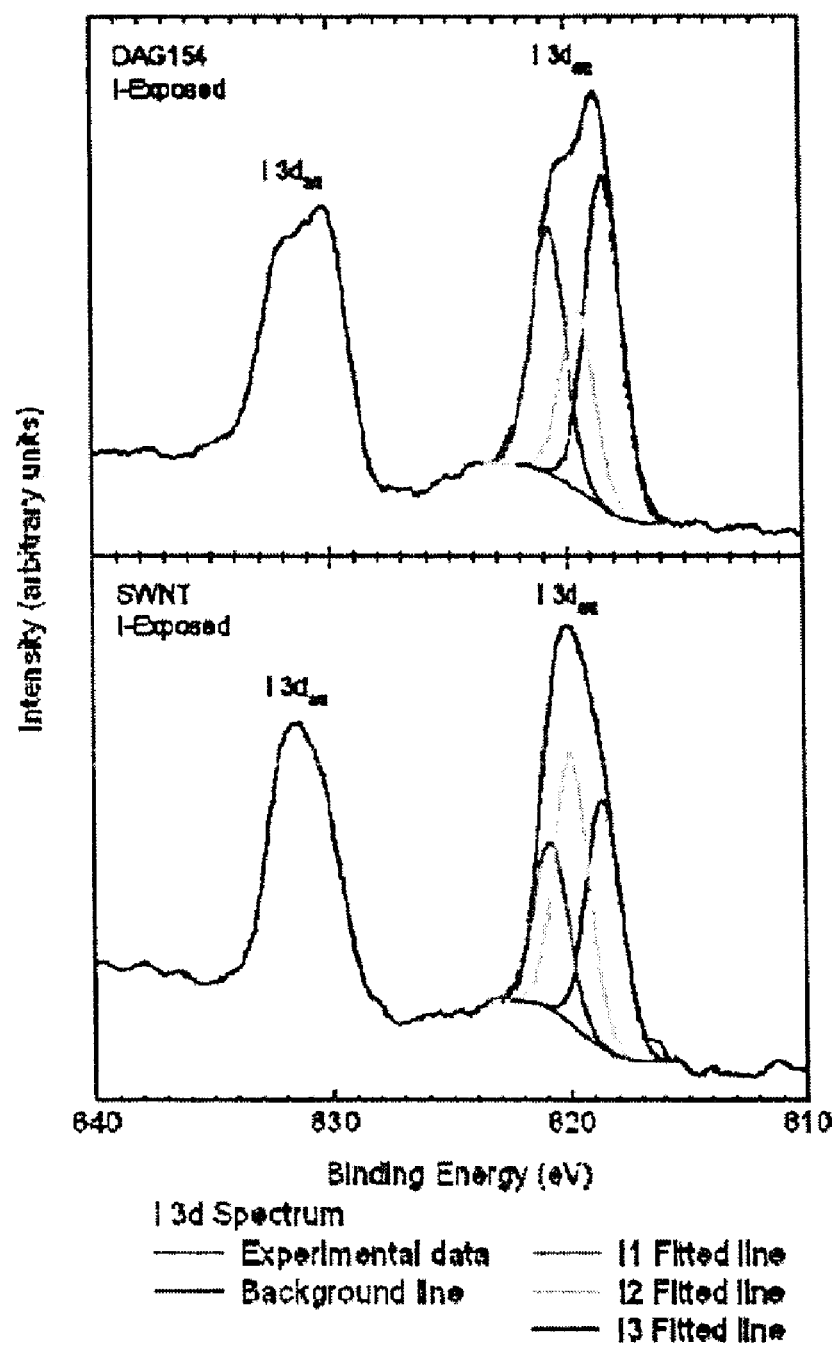

Referring to FIG. 56, a curve fitting with the three-component peak structure is shown, whilst Table 20, below, shows the parameters obtained from curve fitting. The results of the curve fitting show that similar binding energies are found for the peak components $I_1$, $I_2$ and $I_3$ on both $I_2$-Exposed DAG-154 and SWNT soot. The contribution of component $I_3$ (about 33% at BE 620.7 eV), attributed to the

TABLE 19

| Sample | | Area | Relative Concentration of Detected Elements (at. %) | | | | | | | | | Atomic Ratio |
| --- | --- | --- | --- | --- | --- | --- | --- | --- | --- | --- | --- | --- |
| | | | Na | Ni | I | O | N | Ca | C | S | Y | I/C |
| Unexposed | DAG154 | A1 | 0.11 | | | 2.69 | 0.79 | 0.08 | 96.32 | | | |
| | | A2 | 0.08 | | | 3.00 | 0.80 | 0.26 | 95.86 | | | |
| | SWNT | A1 | 0.09 | 0.11 | | 4.60 | | | 94.58 | 0.37 | 0.25 | |
| | | A2 | 0.11 | 0.1 | | 4.51 | | | 94.71 | 0.32 | 0.24 | |
| $I_2$-Exposed | DAG154 | A1 | 0.38 | | 0.53 | 3.01 | 0.58 | 0.06 | 95.45 | | | 0.0056 |
| | | A2 | 0.15 | | 0.39 | 3.47 | 0.72 | 0.18 | 95.10 | | | 0.0041 |
| | SWNT | A1 | 0.21 | 0.39 | 0.37 | 5.56 | | | 92.99 | 0.20 | 0.28 | 0.0040 |
| | | A2 | 0.10 | 0.13 | 0.31 | 6.28 | | | 92.5 | 0.45 | 0.23 | 0.0034 |

The atomic ratios of iodine to carbon (last column in Table 19, above), may suggest that the amount of absorbed iodine in DAG-154 is slightly higher than that in SWNT. This result contrasts with the results obtained by TGA C—I bonds, is similar on both $I_2$-exposed DAG-154 and SWNT soot samples. The contribution proportion of $I_1$ to $I_2$ seems to be in an opposite direction between $I_2$-exposed DAG-154 and SWNT soot samples. $I_2$-exposed DAG-154 soot presented a larger contribution of component $I_1$ than that measured for $I_2$-exposed SWNT soot. In contrast, $I_2$-exposed SWNT soot presented a larger contribution of component $I_2$ than that measured for $I_2$-exposed DAG-154 soot. The larger percentage of $I_2$ in $I_2$-exposed SWNT soot compared with that in $I_2$-exposed DAG-154 soot might be due to iodide polymerization or conversion $(I_2)+(I_3)^- \rightarrow (I_5)^-$ inside the nanotubes.

TABLE 20

| I $3d_{5/2}$ | DAG154 | | SWNT | | Peak |
|---|---|---|---|---|---|
| Components | BE (eV) | At. % | BE (eV) | At. % | Assignment |
| I1 | 618.37 | 43.82 | 618.50 | 27.45 | Alk.*, $(I_3)^-$ |
| I2 | 619.47 | 23.83 | 619.65 | 39.08 | $I_2$, $(I_5)^-$ |
| I3 | 620.73 | 32.35 | 620.80 | 33.46 | C—I |

*Alk.: Alkali iodides.

Iodine Adsorption Experiments

Referring still to the experiments, in order to confirm the results obtained in the preliminary $I_2$ adsorption experiments (see above), more advanced iodine adsorption and desorption experiments were also performed on different carbon samples. A Radioiodine Adsorption Apparatus designed by Reactor Chemistry and Corrosion Branch staff was used for these experiments.

In a typical test, three samples (in the form of coupons) were placed in a glass flow cells and exposed to a continuous flow of air containing $^{131}$I-labelled $I_2$, followed by purging with argon. The iodine activity accumulated on each sample was continuously monitored during loading and purging using a γ-counting detector. Small known fractions of the flows entering and leaving the adsorption cell were diverted to charcoal traps (referred to as the inlet and outlet trap, respectively). The $^{131}$I activities accumulated in these traps were continuously monitored to determine the iodine loading and release concentrations in the inlet gas and in the effluent. Details of the experimental set-up and procedures are given below.

An iodine concentration of about $1 \times 10^{-8}$ M was estimated. Table 21, below, shows the operating parameters used during the experiments.

TABLE 21

| Parameter | Value |
|---|---|
| Temperature | 80° C. |
| Relative Humidity | 0% (or as low as can be achieved) |
| Iodine Concentration | $1 \times 10^{-8}$ M |
| Carrier Gas | 1 L/min of Ar |
| Loading Duration | 4 hr |
| Purge After Loading | overnight and then monitor desorption of physisorbed iodine |
| Coupons | ½" × ¼" Glass Pyrex |

Iodine adsorption experiments were conducted on ½"× ¼" glass coupons previously coated with SWNT, DAG-154 and $C_{60}$ slurries. The weights of the carbon-based coatings were measured to evaluate iodine adsorption as function of the total mass of the carbon material. Table 22, below, shows the weights of the carbon coatings attached to the glass coupons, along with the average and standard deviation.

$C_{60}$ coatings presented the lowest weight. This may be mainly due to the poor dissolution and dispersion of $C_{60}$ soot during the preparation of the slurry (see above). Only a very small amount of $C_{60}$ powder was retained in the coating while the majority precipitated during the coating step.

TABLE 22

| SWNT | | DAG-154 | | $C_{60}$ | |
|---|---|---|---|---|---|
| Sample ID | Weight (g) | Sample ID | Weight (g) | Sample ID | Weight (g) |
| I2-07 | 0.0020 | I2-16 | 0.0262 | I2-10 | 0.0007 |
| I2-08 | 0.0016 | I2-17 | 0.0242 | I2-11 | 0.0005 |
| I2-09 | 0.0013 | I2-18 | 0.0224 | I2-12 | 0.0006 |
| Average | 0.0016 | Average | 0.0243 | Average | 0.0006 |
| Std dev | 0.0004 | Std dev | 0.0019 | Std dev | 0.0001 |

SWNT coatings also presented a lower carbon mass as compared to DAG-154 coatings. This may be due to the much lower density of SWNT than that of DAG-154 soot.

Only two samples of SWNT-, two of DAG-154- and one of $C_{60}$-coatings produced reliable results. An experiment including one sample of each coating was incomplete due to a power outage, whilst another $C_{60}$ sample did not produce reliable results.

Figure 57:
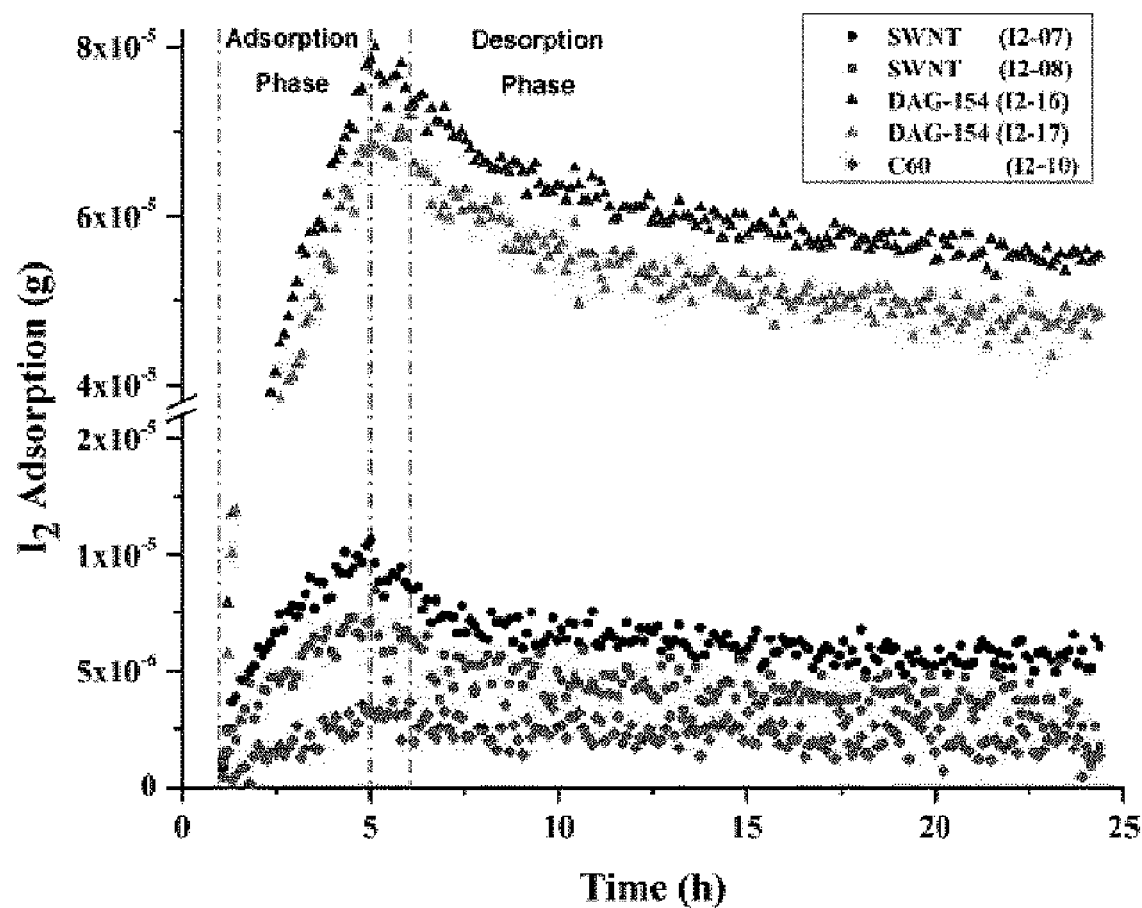
Figure 58:
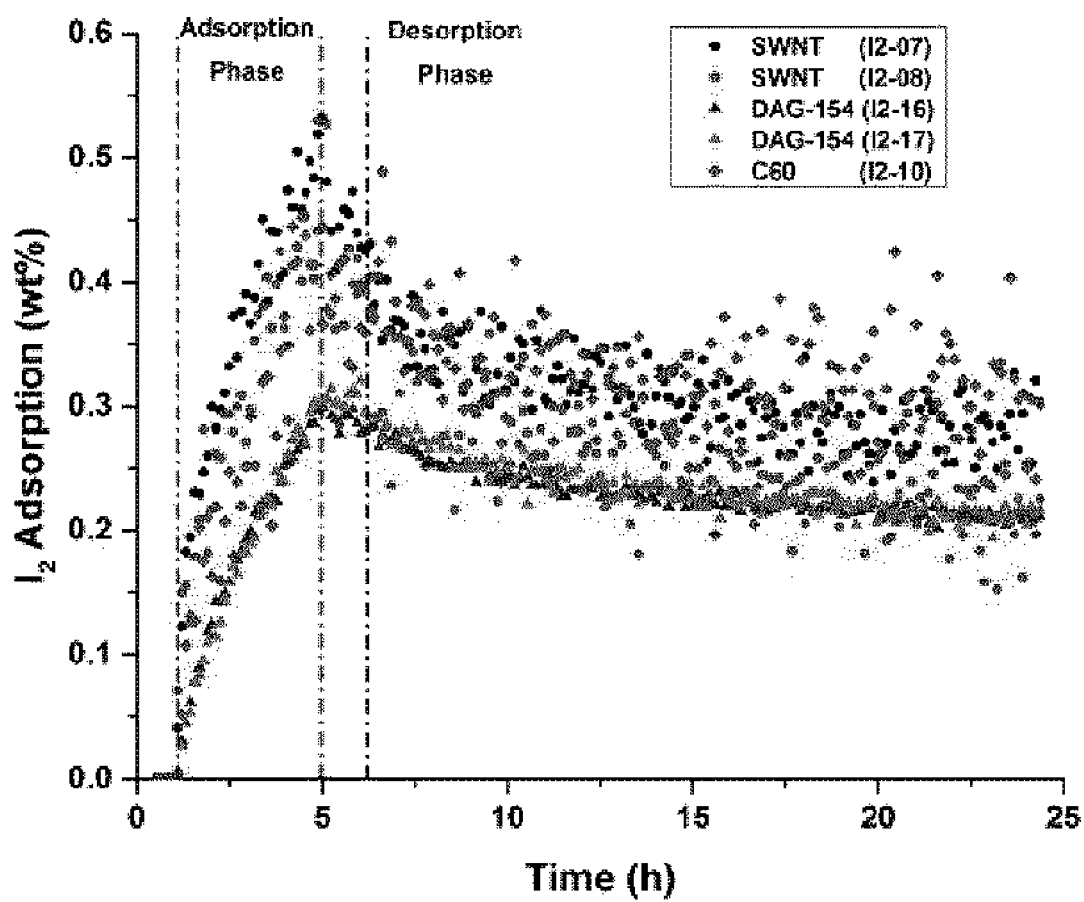

Referring to FIGS. 57 and 58, results of the $^{131}$I-labelled $I_2$ adsorption experiments are shown. FIG. 57 depicts the progression of total iodine adsorption/desorption, as function of time. DAG-154 coatings demonstrated the ability to adsorb larger amounts of iodine than SWNT and $C_{60}$ coatings. This may be due to the larger carbon mass present in DAG-154 coatings as compared to SWNT and $C_{60}$ coatings.

Taking into account the amount of carbon present in the coatings, the percent of adsorbed/desorbed iodine was estimated. FIG. 58 shows the progression of iodine adsorption/desorption process, in terms of iodine weight percent, as function of time. A higher concentration of iodine was adsorbed in SWNT than in DAG-154 coatings. The maximum iodine concentration after 4 hours of adsorption was about 0.5 and 0.3 wt % for SWNT and DAG-154 coatings, respectively. These results may confirm the results obtained in the preliminary iodine adsorption experiments performed in the Carbolite tube furnace (see above). SWNT coating may able to adsorb about twice the amount of iodine than DAG-154 coating, at the conditions of the experiments.

The rate of iodine adsorption in soot samples, at constant temperature, was estimated assuming the following equation:

$$I + S \rightarrow I_{ad}$$

Where I is an iodine gaseous molecule, S is the soot and Iad is the adsorbed complex. The corresponding kinetic equation is:

$$r_{ad} = \frac{d[S]}{dr} = -k_{ad}[S]$$

Where $r_{ad}$ is the rate of iodine adsorption in soot (g $I_2$/g soot/h), [S] is the $I_2$ adsorption capacity of the soot (g $I_2$/g soot), t is the time (h) and $k_{ad}$ is the adsorption kinetic constant ($h^{-1}$).

Using the following boundary conditions:

$t = t_o$ $[S] = [S]_o$ $t = t$ $[S] = [S]$

Then $$\int_{[S]_o}^{[S]} \frac{d[S]}{[S]} = -k_{ad} \int_{t_o}^{t} dt$$

The integrated iodine adsorption rate is:

$$\ln\left(\frac{[S]}{[S]_o}\right) = -k_{ad}(t - t_o)$$

If $$[S] = [S]_o - [I_{ad}]$$

Then $$\frac{[S]}{[S]_o} = 1 - \frac{[I_{ad}]}{[S]_o}$$

Substituting $$\frac{[S]}{[S]_o} = 1 - \frac{[I_{ad}]}{[S]_o} \text{ in } \ln\left(\frac{[S]}{[S]_o}\right) = -k_{ad}(t - t_o)$$

$$\frac{[I_{ad}]}{[S]_o} = 1 - \exp[-k_{ad}(t - t_o)] \text{ or}$$

$$[I_{ad}] = [S]_o(1 - \exp[-k_{ad}(t - t_o)])$$

The kinetic parameters were estimated using the initial portion of the adsorption/desorption data and fitting the values to $[I_{ad}]=[S]_o(1-\exp[-k_{ad}(t-t_o)])$. Table 23, below, shows the values of the kinetic parameters $[S]_o$ and $k_{ad}$, along with their corresponding standard error, the determination and correlation coefficient.

TABLE 23

| Material | Sample ID | $[S]_o$ (g $I_2$/g soot) | $k_{ad}$ ($h^{-1}$) | Standard Error | Determination Coefficient ($R^2$) | Correlation Coefficient (R) |
|---|---|---|---|---|---|---|
| SWNT - 1 | (I2-07) | $5.04 \times 10^{-3}$ | 0.767 | 0.0599 | 0.954 | 0.977 |
| SWNT - 2 | (I2-08) | $4.49 \times 10^{-3}$ | 0.718 | 0.0789 | 0.914 | 0.956 |
| DAG-154 - 1 | (I2-16) | $3.78 \times 10^{-3}$ | 0.362 | 0.0165 | 0.995 | 0.998 |
| DAG-154 - 2 | (I2-17) | $4.39 \times 10^{-3}$ | 0.253 | 0.0177 | 0.994 | 0.997 |
| $C_{60}$ | (I2-10) | $7.14 \times 10^{-3}$ | 0.231 | 0.1116 | 0.778 | 0.882 |

Upon comparison of the adsorption kinetic constants, SWNT coatings showed a higher iodine adsorption rate than DAG-154 coatings. The estimated adsorption capacity $[S]_o$ at four hours for SWNT and DAG-154 coatings were about $4.77 \times 10^{-3}$ g $I_2$/g soot (about 0.5% wt) and $4.08 \times 10^{-3}$ g $I_2$/g soot (about 0.4% wt).

The adsorption kinetic constant for SWNT coating was about 0.763 $h^{-1}$, whilst DAG-154 coatings presented an adsorption kinetic constant of about 0.308 $h^{-1}$.

Although the surface area of the coatings was not determined, it is speculated that the differences in the $I_2$ adsorption rates observed in DAG-154 and SWNT coatings might be related to a larger surface area present in SWNT coatings. Carbon black produced at high temperature may present a low surface area due to the graphitization of some particles, which reduce the total porosity of the powder. In this case, overlapped flake-like graphitized particles observed in DAG-154 coatings might present lower specific surfaces than amorphous carbon particles.

Based on the $I_2$ adsorption and characterization results, it is thought that the efficacy of the DAG-154 carbon coating to mitigate SCC in Zircaloy sheaths may be due to a combined effect of amorphous carbon particles, flake-like graphitized particles and adsorbed organic impurities. Amorphous carbon presents localized π electrons and contains a high concentration of dangling bonds, which cause deviations in the C—C distances, as well as deviations in the bond angles. Dangling bonds may be responsible for chemisorption of fission products, similar to the C—I bounds identified by XPS analyses. In turn, graphite consists of hexagonal arrays of carbon atoms grouped in planar layers composed of strongly bonded carbon atoms. Overlapped flake-like graphitized particles might present lower specific surfaces than amorphous carbon particles. However, overlapped flake-like graphitized particles form a physical barrier that may enhance the retention of fission products at the interior of the Zircaloy sheath. Organic impurities may provide additional chemically active sites where fission products can react and be retained.

Similarly, the higher $I_2$ adsorption rates observed by SWNT coatings might enhance the efficacy of the carbon coating to mitigate SCC in Zircaloy sheaths. This efficacy may be due to the large surface area attributable to the interior cavity of the tubes and the space between the individual nanotubes at the interior of the bundle. These larger passageways might enhance iodine diffusion into the void volumes. In addition, a number of possible binding sites are available in SWNT coatings. These binding sites include: (a) the presence of amorphous carbon particles (b) the space between the individual nanotubes at the interior of the bundle, (c) the empty cavity (which is accessible provided the ends are uncapped and unblocked), and (d) the cylindrical outer surface of the individual nanotubes that lie at the external surface of the bundles (or outer surface sites). Dangling bonds of the amorphous particles and the large cylindrical outer surface of the individual nanotubes may be responsible of chemisorption of fission products, similar to the C—I bounds identified by XPS analyses. In turn, the empty cavity of the nanotubes and the space between the individual nanotubes at the interior of the bundle enhance the surface area of the coating and may contribute to the adsorption of $I_2$, as discussed in above. The larger percentage of $I_2$ component of iodine emission spectra might be due to iodide polymerization or conversion $(I_2)+(I_3)^- \rightarrow (I_5)^-$ inside the nanotubes.

Using the techniques described herein, carbon-based slurries were successfully fabricated using different kind of carbon nanostructures, including carbon black, graphite (synthetic), $C_{60}$ and SWNT. The slurries could be applied by brush, dip, roller, or spray. Optionally, the carbon-based slurries may be always agitated thoroughly just prior to use due to their inherent thixotropic property.

In order to test the ability of the slurries to produce homogenous coatings, Zircaloy sheaths and pieces of stainless steel mesh were successfully coated using the different types of carbon-based slurries. Although some carbon-based slurries appeared to contain some particle agglomerates and viscous, the coatings presented a homogeneous appearance after baking, as shown in experimental results. The coated Zircaloy sheaths passed the compression and scratch tests. The average thickness of the carbon black, graphite (synthetic) and SWNT coatings was about 1.3 μm whilst the thickness of DAG-154 (used as reference) was about 2.4 μm. Characterization of the coatings by XRD revealed that carbon black M-280 displays the lowest degree of graphitization among all the powders, while Nuclear Grade Graphite, shows the highest, followed by graphite (synthetic). The results also suggest that DAG-154 is composed of a mixture of amorphous and highly disordered graphitized particles typical of carbon blacks produced at very high temperature. This result was confirmed by TEM-EDS where the estimated d1 value for DAG1-54 was larger than that expected for graphite. SEM and TEM micrographs revealed that DAG-154 coating is composed of very small flake-like carbon particles layered on top of one another. The size of the flake-like particle was estimated to be on the order of 0.6 μm.

GC-MS analyses of toluene extractions of carbon powders and soot from the coatings revealed that the different coatings contain a large number of adsorbed organic compounds likely produced during the decomposition of the binder during the baking process of carbon coatings. GC-MS also showed that SWNT coating generated less organic contaminants than the coatings produced with other carbon slurries. This may be due to the fact that compared to the other carbon slurries, the preparation of the SWNT slurry required the use of smaller amount of ethyl cellulose binder. Although hydrogen content was not determined, GC-MS analyses suggest that carbon coatings may contain a high concentration of hydrogen due to the large number of organic contaminants produced during the baking process and remained adsorbed in the soot.

Preliminary iodine adsorption experiments were performed on SWNT and DAG-154 soot using a tube furnace and the resulting $I_2$-exposed soot was analyzed by TGA. The TGA results suggest that SWNT soot is able to adsorb about twice the amount of iodine than the DAG-154 soot, at the conditions of the experiment; i.e. $I_2$ carrier gas flow rate of 60 sccm and furnace temperature of 100° C. Overall, SWNT soot adsorbed about 15 wt %, whilst DAG-154 soot adsorbed 7.5 wt % of $I_2$.

More advanced iodine adsorption experiments were performed on various carbon coated coupons using a custom-designed Radioiodine Adsorption Apparatus. The results showed that, a higher concentration of iodine, in terms of iodine weight percent, was adsorbed in SWNT than in DAG-154 coatings. The maximum iodine concentration after 4 hours of adsorption was about 0.5 and 0.3 wt % for SWNT and DAG-154 coatings, respectively. SWNT coatings presented a higher iodine adsorption rate than DAG-154 coatings. The adsorption kinetic constant were about 0.763 $h^{-1}$ and 0.308 $h^{-1}$ for SWNT and DAG-154 coatings, respectively. These results confirm the results obtained in the preliminary $I_2$ adsorption experiments. SWNT samples were able to adsorb almost twice the $I_2$ amount than DAG-154 samples.

Detailed XPS spectral analyses suggest that at least two chemically different species of iodine were likely involved in its absorption into both the DAG-154 and SWNT carbon materials. Contributions of these iodine species were resolved by using curve fitting to the I $3d_{5/2}$ spectra, which revealed a complex process of the iodine absorption.

It is thought that the differences in the $I_2$ adsorption rates observed in DAG-154 and SWNT coatings might be related to a larger surface area present in SWNT coatings due to the surface attributable to the interior cavity of the tubes and the space between the individual nanotubes at the interior of the bundle. Overlapped flake-like graphitized particles observed in DAG-154 coatings might present lower surface areas than SWNT coatings. The high iodine adsorption rate and capability observed in SWNT coatings might help improve fuel performance and SCC mitigation at the extended burnups proposed for advanced fuels used in APHWR.

For example, the following potential applications can be envisaged for the SWNT-based slurry: SWNT-based slurry might be used to coat fuel powder during the fabrication of nuclear fuel to produce a new kind of advanced fuel that can enhance pellet heat transfer, in situ absorption of fission products and mitigation of stress-corrosion cracking; SWNT-based slurry might be used to coat the interior surface of steel containers used to store spent fuel with goal of protecting the walls against corrosion; SWNT-based slurry might be used as carbon substrate to prepare catalysts used in hydrogen isotopes (hydrogen, deuterium and tritium) separation processes—molecular dynamic simulations have shown that SWNT can be used in the isotopic separation of hydrogen due to their empty cavity; SWNT-based slurry might be used as carbon substrate to prepare catalysts for other industrial applications; SWNT-based slurry might be used for applications in filtering and cleaning in, e.g., removing toxic gases.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A nuclear fuel element for use in a nuclear reactor, the nuclear fuel element comprising:
   a plurality of metal fuel sheaths extending along a longitudinal fuel element axis and spaced apart from each other, the plurality of fuel sheaths comprising a first fuel sheath having an inner surface, an opposing outer surface and a hollow interior configured to receive nuclear fuel material; and
   a carbon coating on the inner surface of the first fuel sheath, the carbon coating comprising more than 99.0% wt of a carbon material including between 20% wt and 45% wt of carbon nanotubes, 3-6 wt % fullerenes ($C_{60}+C_{70}$), 1-4 wt % nano-onions and graphene (graphitic particles); 45-60% wt carbon black and catalyst and less than about 0.01% wt of organic contaminants.

2. The nuclear fuel element of claim 1, wherein the carbon material comprises more than 20% wt of single walled carbon nanotubes.

3. The nuclear fuel element of claim 1, wherein the carbon material comprises a mix of carbon nanotubes, fullerenes ($C_{60}+C_{70}$), nano-onions, graphene (graphitic particles) and amorphous carbon.

4. The nuclear fuel element of claim 1, wherein the carbon coating has a thickness of between 1μmη to 30 pm.

5. The nuclear fuel element of claim 1, wherein the carbon material has an iodine absorption capacity of at least $4.77 \times 10^{-3}$ g $I_2$/g carbon material.

6. The nuclear fuel element of claim 2, wherein the single walled carbon nanotubes have an average diameter of between about 1.2-1.4 nm.

7. The nuclear fuel element of claim 1, wherein the carbon coating is formed by drying a carbon slurry deposited on the inner surface and wherein before drying the carbon slurry comprised:
   a) between about 0.1% wt and about 16.0% wt of a carbon material comprising carbon nanotubes;
   b) between about 0.1% wt and about 4.0% wt of a binder material;
   c) at least about 80% wt of a solvent;
   d) between about 0.05% wt and about 6.0% wt of a dilutent; and
   e) isopropanol.

8. The nuclear fuel element of claim 1, wherein the carbon material has a density of between about 1.25 g/cm$^3$ and about 1.45 g/cm$^3$.

9. The nuclear fuel element of claim 1, wherein the carbon material has an iodine absorption capacity of at least about at least 0.5% wt of the carbon material.

10. The nuclear fuel element of claim 7, wherein before drying the carbon nanotube slurry comprised between about 0.1% wt and about 2.4% wt of the carbon material.

11. The nuclear fuel element of claim 7, wherein before drying the carbon nanotube slurry comprised between about 0.1% wt and about 1.0% wt of the binder material.

12. The nuclear fuel element of claim 7, wherein before drying the carbon nanotube slurry comprised at least about 95% wt of the solvent.

13. The nuclear fuel element of claim 7, wherein before drying the carbon nanotube slurry comprised between about 0.05% wt and about 1.5% wt of a dilutent.

14. The nuclear fuel element of claim 7, wherein before drying the carbon nanotube slurry comprised about 0.8% wt carbon nanotubes.

15. The nuclear fuel element of claim 7, wherein before drying the carbon nanotube slurry the solvent comprised isopropanol.

16. The nuclear fuel element of claim 7, wherein before drying the carbon nanotube slurry the dilutent comprised at least one of n-butanol, hexylene glycol and propylene glycol.

17. The nuclear fuel element of claim 7, wherein before drying the carbon nanotube slurry comprised a viscosity of the slurry of between about 17 and about 27 mPas.

18. The nuclear fuel element of claim 7, wherein before drying the carbon nanotube slurry the viscosity of the slurry was between 18 and 22 mPas.

19. The nuclear fuel element of claim 7, wherein before drying the carbon nanotube slurry a ratio of the carbon material to the solvent is between about 0.005 and about 0.2.

20. The nuclear fuel element of claim 19, wherein before drying the carbon nanotube slurry the ratio of the dilutent to the solvent is between about 0.005 and about 0.08.

* * * * *

UNITED STATES PATENT AND TRADEMARK OFFICE
CERTIFICATE OF CORRECTION

PATENT NO. : 11,932,540 B2  
APPLICATION NO. : 16/765987  
DATED : March 19, 2024  
INVENTOR(S) : German Cota-Sanchez Page 1 of 1

It is certified that error appears in the above-identified patent and that said Letters Patent is hereby corrected as shown below:

In the Claims

<u>At Column 48</u>  
In Claim 4, Line 61 delete "1μηη to 30 pm" and insert -- 1μm to 30μm --.

Signed and Sealed this  
Eleventh Day of February, 2025

Coke Morgan Stewart  
*Acting Director of the United States Patent and Trademark Office*